(12) United States Patent
Okamoto et al.

(10) Patent No.: US 6,988,571 B2
(45) Date of Patent: Jan. 24, 2006

(54) CRAWLER TRACTOR

(76) Inventors: Eiichi Okamoto, 1-32, Chayamachi, Kita-ku, Osaka-shi, Osaka 530-0013 (JP); Masakazu Komatsu, 1-32, Chayamachi, Kita-ku, Osaka-shi, Osaka 530-0013 (JP); Yukio Kubota, 1-32, Chayamachi, Kita-ku, Osaka-shi, Osaka 530-0013 (JP); Susumu Nochi, 1-32, Chayamachi, Kita-ku, Osaka-shi, Osaka 530-0013 (JP); Susumu Akashima, 1-32, Chayamachi, Kita-ku, Osaka-shi, Osaka 530-0013 (JP); Takashi Uno, 1-32, Chayamachi, Kita-ku, Osaka-shi, Osaka 530-0013 (JP); Gaku Higashiguchi, 1-32, Chayamachi, Kita-ku, Osaka-shi, Osaka 530-0013 (JP); Shinsuke Tani, 1-32, Chayamachi, Kita-ku, Osaka-shi, Osaka 530-0013 (JP); Kazuo Yamamoto, 1-32 Chayamachi, Kita-ku. Osaka-shi, Osaka 530-0013 (JP)

( * ) Notice: Subject to any disclaimer, the term of this patent is extended or adjusted under 35 U.S.C. 154(b) by 18 days.

(21) Appl. No.: 10/473,797

(22) PCT Filed: Apr. 3, 2002

(86) PCT No.: PCT/JP02/03361

§ 371 (c)(1),
(2), (4) Date: Dec. 18, 2003

(87) PCT Pub. No.: WO02/081289

PCT Pub. Date: Oct. 17, 2002

(65) Prior Publication Data
US 2004/0149462 A1 Aug. 5, 2004

(30) Foreign Application Priority Data

| Apr. 4, 2001 | (JP) | 2001-106050 |
| Apr. 4, 2001 | (JP) | 2001-106051 |
| Apr. 5, 2001 | (JP) | 2001-107425 |
| Apr. 9, 2001 | (JP) | 2001-109464 |
| Apr. 9, 2001 | (JP) | 2001-110462 |
| Apr. 18, 2001 | (JP) | 2001-120261 |
| May 18, 2001 | (JP) | 2001-150021 |

(51) Int. Cl.
*B62D 49/00* (2006.01)
*B62D 11/18* (2006.01)
*B60K 41/00* (2006.01)
*B60K 17/04* (2006.01)
*B60T 7/00* (2006.01)

(52) U.S. Cl. ............ 180/6.48; 180/6.7; 180/307; 180/367; 180/378; 180/400; 60/490; 74/730.1; 74/473.16; 477/68; 477/111; 475/83; 172/47; 172/292

(58) Field of Classification Search ............ 180/378, 180/307, 367, 6.48, 6.2, 6.7, 400; 60/487, 60/490; 74/730.1, 473.16; 172/47, 292; 477/52, 68, 111; 475/83
See application file for complete search history.

(56) References Cited

FOREIGN PATENT DOCUMENTS

| JP | 48-41388 Y1 | 12/1973 |
| JP | 50-8812 Y1 | 3/1975 |
| JP | 1-106663 | 7/1989 |
| JP | 2-306830 A | 12/1990 |
| JP | 3-130954 | 12/1991 |
| JP | 4-317843 A | 11/1992 |
| JP | 8-142701 A | 6/1996 |
| JP | 08-242601 | 9/1996 |
| JP | 08-280206 | 10/1996 |
| JP | 10-054462 | 2/1998 |
| JP | 11-59478 A | 3/1999 |
| JP | 2000-158959 A | 6/2000 |
| JP | 2000-211546 A | 8/2000 |
| JP | 2001-90803 A | 4/2001 |
| WO | WO 00/35736 A1 | 6/2000 |

OTHER PUBLICATIONS

International Search Report issued Jul. 9, 2002 for Appln. No. PCT/JP02/03361, 3 pages.

*Primary Examiner*—Christopher J. Novosad
(74) *Attorney, Agent, or Firm*—Sterne, Kessler, Goldstein & Fox P.L.L.C.

(57) ABSTRACT

The purpose of the invention is to enable a crawler tractor to brake and stop certainly without applying a load to an engine and a driving mechanism, and without complicated operation. An operation link links a conic linkage (53) which links a steering wheel (7) with a main speed change lever (55) of the crawler tractor, and with an operation mechanism of a brake pedal (54). A neutral return mechanism for the operation link is provided. The operation link neutral return mechanism comprises a hook-like cam lever (61). When the brake pedal is depressed, the main speed change lever is moved to its neutral position before braking force occurs, and then, the brake is actuated. Accordingly, engine brake is used effectively, and the brake can be miniaturized.

15 Claims, 56 Drawing Sheets

(a)

(b)

(c)

(A)

(B)

CRAWLER TRACTOR

BACKGROUND OF THE INVENTION

1. Field of the Invention

The present invention relates to a crawler tractor used for agricultural work and the like. More particularly, it relates to a driving mechanism, an HST and a brake mechanism concerning speed change, traveling and steering of the crawler tractor.

2. Related Art

Conventionally, there is a well-known agricultural working vehicle (crawler tractor) provided with a hydraulic stepless transmission for traveling and a hydraulic stepless transmission for turning as one typical hydraulic-driving agricultural working machine having left and right independent crawler type traveling devices.

It is important for improving operativity of the crawler tractor to ensure transmission/isolation of driving force and braking. Therefore, a crawler tractor is provided with a neutral-position holding mechanism for ensuring neutral location of the HST for traveling and the HST for turning.

As described in the Japanese Patent Laid Open Gazette Hei. 8-242601, for enhancing certainty of cutting off transmission of driving force to crawler traveling devices at the time of stopping the vehicle, with respect to some crawler tractors, an additional clutch device is disposed on a driving power train and a hydraulic circuit is provided for controlling the clutches. With respect to other crawler tractors, a neutral return mechanism for a steering device is disposed in the vicinity of the HST for turning and a steering shaft connected to the steering device is connected to the HST for turning through an universal joint or the like so as to transmit steering operation.

With regard to the above-mentioned hydraulic circuit, there is a crawler tractor constructed such that an oil cooler for cooling pressure oil supplied into a transmission casing is disposed in front of a radiator and the oil cooler is cooled by cooling wind generated from a fan driven by an engine. Also, as shown in the Japanese Patent Laid Open Gazette Hei. 10-54462, there is a crawler tractor such that pressure oil supplied from a charge pump is cooled by an oil cooler and then the fluid is supplied to each HST.

As disclosed in the Japanese Patent Laid Open Gazette Hei. 8-280206, for example, there is a well-known construction for connecting a sub control valve for controlling a working machine connected to a crawler tractor, wherein the sub control valve is detachable, and when the sub control valve is attached, hydraulic ports are connected with respective ports of the sub control valve through hydraulic pipings, and when the sub control valve is not attached, metal is disposed so as to cover an upper surface of a cylinder casing and the ports are connected mutually through oil passages provided within the metal.

However, with regard to many of the conventional crawler tractors, an inscribed gear is used as one of gears constituting a planetary gearing of a differential mechanism for independent left and right crawler type traveling devices. Accordingly, the planetary gearing becomes diametrically large.

Besides, for providing a steering brake to the left and right axles, left and right brake mechanisms are required, and they are large-sized so as to brake a large torque. Such a mechanism results in not only restriction of design of the crawler tractor but also increase of full length of a linkage, thereby hindering improvement of operativity at the time of braking.

Furthermore, conventional mechanisms for holding the HST for traveling and the HST for turning in neutral and a conventional mechanism for holding a steering device in neutral are complicated in construction and require much effort for assembling thereof and the like, thereby hindering reduction of costs for their production.

Besides, a conventional main circuit of the HST for traveling is not provided with a valve for releasing pressure from the HST for traveling. Accordingly, pressure is accumulated in the HST for traveling, thereby making an output shaft hard to rotate, requiring a large power for starting thereof, and hindering smooth change of speed or gears.

With regard to cooling of pressure oil, if an oil cooler for cooling pressure oil used for a transmission is disposed alongside of a capacitor for an air-conditioner and a radiator of an engine, cooling efficiency may fall. Furthermore, maintenance work may become complicated.

With regard to the conventional construction of hydraulic piping, it takes a long time for attaching the piping. Every when the oil pressure is selectively extracted to either front or rear side, it is necessary to close hydraulic ports on an unused side.

SUMMARY OF THE INVENTION

In a crawler tractor according to the invention, power from an engine is transmitted into a transmission casing disposed at a rear portion of the vehicle body and varied in speed, and a traveling power take-off section transmits the speed-varied power to a traveling device. The traveling power take-off section is disposed in a lower portion of the transmission casing, and a brake mechanism is provided in the traveling power take-off section. Accordingly, a space in the transmission casing can be used effectively. Furthermore, the brake mechanism is disposed near a brake pedal.

In a crawler tractor according to the invention, power from an engine is transmitted into a transmission casing through a hydrostatic stepless transmission for traveling, and a traveling power take-off section transmits the power varied in speed in the transmission casing to a traveling device. When a brake pedal is depressed, a swash plate of the hydrostatic stepless transmission for traveling returns to a neutral position and then a parking brake provided in the traveling power take-off section is actuated. Accordingly, the capacity of the brake may be small and the brake device may be compacted.

In a crawler tractor disposed in a crawler tractor according to the invention, power from an engine is transmitted to a sub transmission in a transmission casing, and a traveling power take-off section transmits power to a traveling device. A braking device is provided in the traveling power take-off section in a lower portion of the transmission casing and in the vicinity of the sub transmission. Therefore, a linkage between the brake device and the transmission can be simplified.

According to the invention, a conic linkage links a steering device with a main speed change lever, and an operation link is provided for connecting a brake pedal operation mechanism with the conic linkage. The operation link is provided with a neutral return mechanism, which is disposed in a lower portion of a section incorporating the conic linkage. The neutral return mechanism is disposed on the way of the linkage connecting the main speed change lever with the steering wheel, thereby being simplified. A play of the linkage is equally shared between the main speed change lever and the steering wheel so as to improve their operativity.

According to the invention, a conic linkage links a steering device with a main speed change lever, an operation link is provided for connecting a brake pedal operation mechanism with the conic linkage, and a neutral return mechanism for the operation link is provided in the operation link. The neutral return mechanism for the operation link comprises a hook-like cam. Accordingly, the neutral return mechanism is simplified and facilitates for easy adjustment of the neutral return mechanism. Such a simple and easy neutral return mechanism improves operativity and durability thereof.

According to the invention, a conic linkage links a steering device with a main speed change lever, an operation link is provided for connecting a brake pedal operation mechanism with the conic linkage, and a neutral return mechanism for the operation link is provided in the operation link. A hook-like cam is arranged on the way of a link between the conic linkage and the main speed change lever. Therefore, a play of the linkage is not disposed eccentrically, thereby reducing an error in a mechanism for operation thereof.

According to the invention, a conic linkage links a steering device with a main speed change lever, an operation link is provided for connecting a brake pedal operation mechanism with the conic linkage, and a neutral return mechanism for the operation link is provided in the operation link. When an operation for braking is performed, a brake begins to work after a swash plate control arm of an HST is positioned in the vicinity of its neutral position. Therefore, when the brake operation is performed, a brake caused by the HST is applied and then a brake is actuated so as to stop. Accordingly, the vehicle is always braked when the brake operation is performed. The time lug between the two brake systems improves a feeling of braking operation.

According to the invention, an operation link links a main speed lever operation mechanism with a brake pedal operation mechanism, and a neutral return mechanism for the operation link is provided in the operation link. A servo valve is disposed between the brake pedal operation mechanism and a swash plate control arm of an HST. Operation of the brake pedal is transmitted to the swash plate control arm of a HST through the servo valve tardily. Therefore, the feeling in operation is improved and a hard brake is prevented.

According to the invention, in a steering mechanism, a conic linkage links a steering device with a main speed change lever, and a rotation restriction cam is provided in a lower portion of a steering shaft connected to a steering wheel. The cam is provided with a portion for abutting against a neutral-returning member and with a portion for abutting against a rotation-restricting stopper. Therefore, a space in an upper portion of a steering column is efficiently usable.

According to the invention, in a steering mechanism, a conic linkage links a steering device with a main speed change lever, and a cam is formed to gradually expand in its radial direction as the cam goes apart from a neutral position thereof. The cam is provided at an end thereof with a portion for abutting against a stopper for restriction of rotation. Therefore, a mechanism for neutral-returning of the steering device is simplified, and the cam is also simplified.

According to the invention, a steering mechanism comprises a conic linkage linking a steering device with a main speed change lever. A stopper and a neutral-returning member arranged symmetrically with respect to an axial center of a cam. Therefore, the single stopper is provided to the cam so as easily to restrict rotational degree of the cam. Also, the mechanism for restricting rotation of the cam is enhanced in durability.

In a crawler tractor according to the invention, power form an engine is transmitted to an HST for traveling and speed change operation is done by the HST for traveling. A mechanism for releasing residual pressure comprises a valve for releasing residual pressure which is provided to a main circuit of the HST for traveling. Accordingly, pressure is released from the HST for traveling so as to facilitate easy actuation of an output shaft for traveling and easy restart of an engine. Also, the gear change of a sub transmission is done smoothly.

In a crawler tractor according to the invention, power form an engine is transmitted to an HST for traveling and speed change operation is done by the HST for traveling. A mechanism for releasing residual pressure comprises a valve for releasing residual pressure which is provided to a main circuit of the HST for traveling. The valve for releasing residual pressure is interlockingly connected with a brake pedal. Therefore, an engine is easily started and load applied on the engine and a drive mechanism is lightened.

In a crawler tractor according to the invention, power form an engine is transmitted to an HST for traveling and speed change operation is done by the HST for traveling. A mechanism for releasing residual pressure comprises a valve for releasing residual pressure which is provided to a main circuit of the HST for traveling. The valve for releasing residual pressure is an electro-magnetic valve linked with a key switch. Accordingly, an additional operation for releasing the residual pressure is unnecessary. When the starter actuates, pressure in the HST is always low so as to improve the start of the engine.

In a crawler tractor according to the invention, power form an engine is transmitted to an HST for traveling, speed change operation is done by the HST for traveling, the power from the engine is also transmitted to an HST for turning, and steering operation is done by transmitting output of the HST for turning to a differential mechanism. A clutch is disposed between the HST for turning and a transmission shaft for transmitting driving force to the differential mechanism. Such a simple construction is provided for shutting off driving force from the HST for turning. Therefore, loss of driving force at the time of stopping the vehicle can be reduced, thereby improving fuel economy of the crawler tractor.

In a crawler tractor according to the invention, power form an engine is transmitted to an HST for traveling, speed change operation is done by the HST for traveling, the power from the engine is also transmitted to an HST for turning, and steering operation is done by transmitting output of the HST for turning to a differential mechanism. An input shaft of the HST for turning projects from a casing of the HST for turning, and a pulley is equipped on the input shaft. By such a simple construction, a PTO section is provided at a front portion of the vehicle body. Therefore, manufacturing costs is reduced, and the PTO section is compacted, so as to improve the flexibility of design.

DETAILED DESCRIPTION OF THE INVENTION

Best Mode for Carrying out the Invention

The invention will be described in detail according to attached drawings.

First, description will be given of a general construction of a crawler tractor as an embodiment having a steering device according to the invention.

Figure 1:
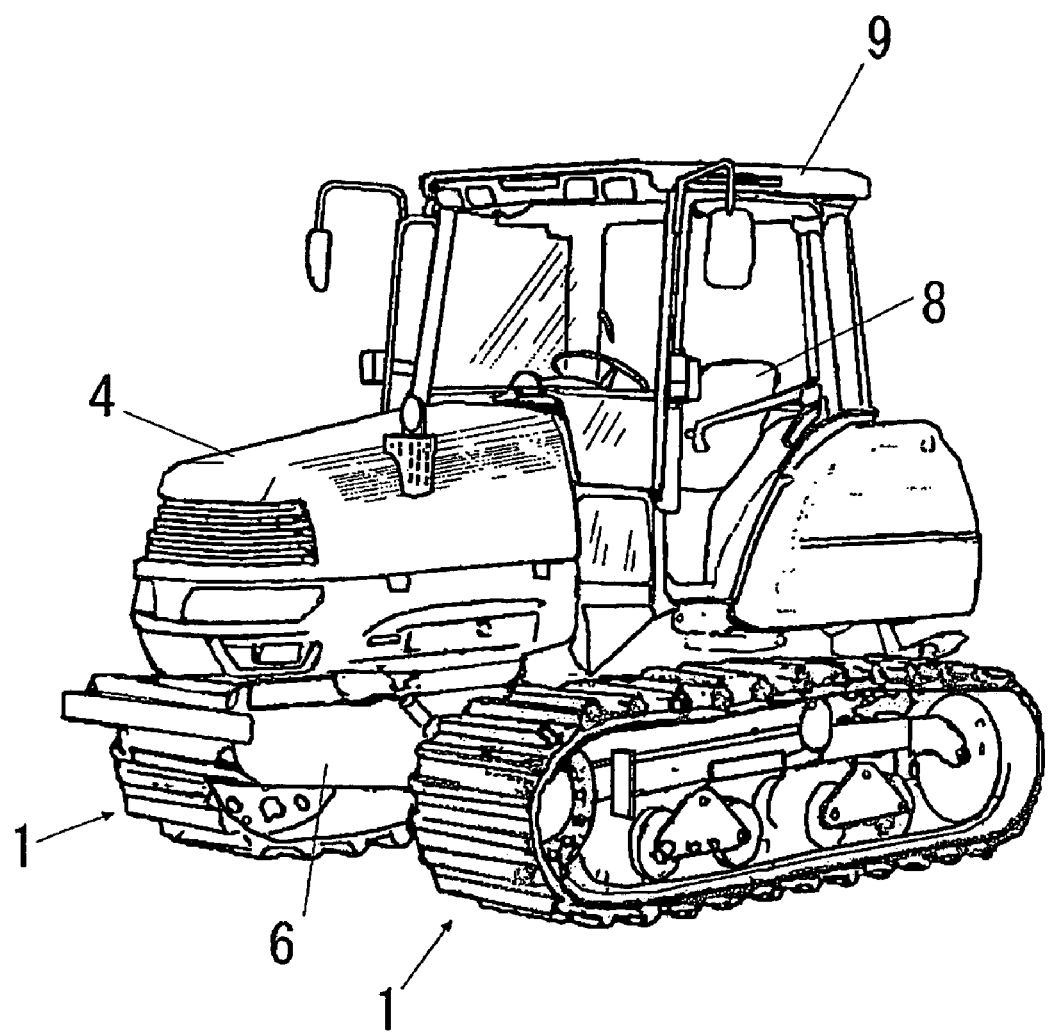
FIG. 1 is a perspective front view of a crawler tractor.
Figure 2:
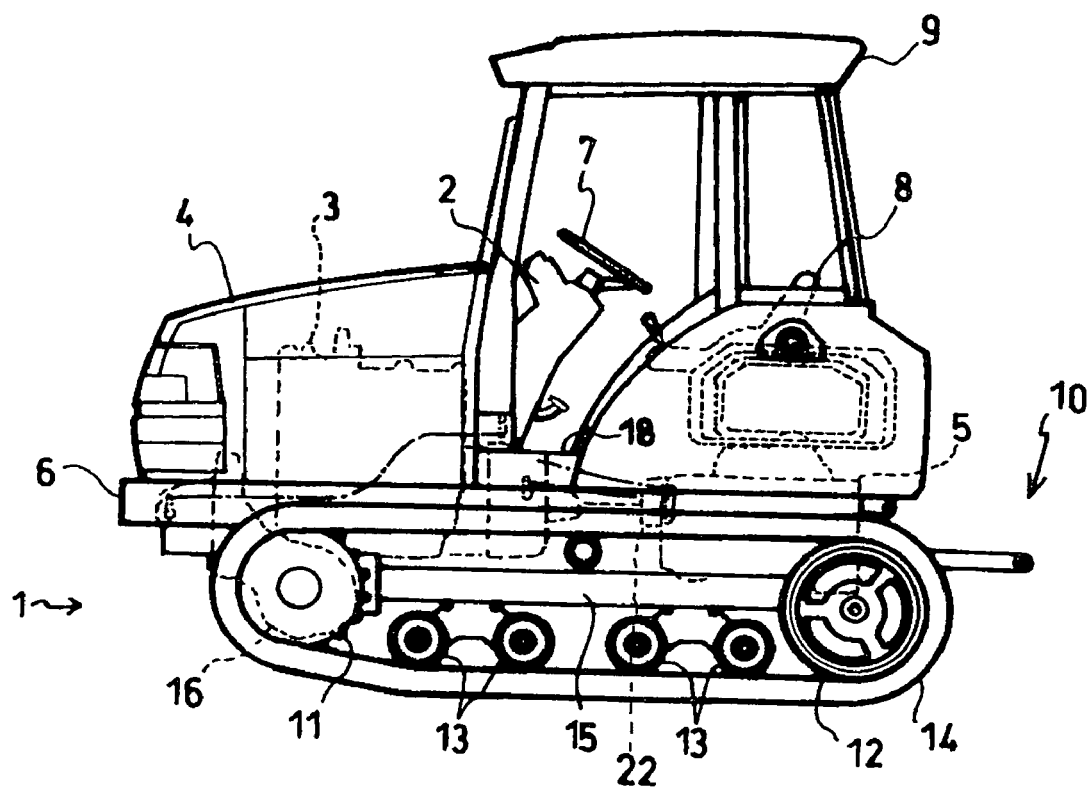
FIG. 2 is an entire side view of the crawler tractor.

As shown in FIGS. 1 and 2, an engine 3 is arranged above front portions of crawler type traveling devices 1. A rear transmission casing 5 is arranged above rear portions of the device 1. The engine 3 is covered with a bonnet 4 and fixed at a lower portion thereof between left and right main frames 6.

A steering column 2 is disposed behind the bonnet 4, and a steering wheel 7 is arranged above the steering column 2. A seat 8 is disposed behind the steering wheel 7, and a step 18 is arranged between lower portions of the steering column 2 and the seat 8, thereby constructing a driver's compartment, which is covered with a cabin 9.

The vehicle is provided at the rear end thereof with a three point linkage 10 for supporting various kinds of work machines.

The crawler type traveling devices 1 are supported by respective crawler frames 15. The crawler frames 15 have front end portions, to which a front transmission casing 16 supporting driving sprockets 11 is fixed. Each crawler frame 15 rotatably supports an idler 12 at a rear end portion thereof, and rollers 13 between the drive sprocket 11 and the idler 12. A crawler belt 14 is looped over the drive sprocket 11, the idler 12 and the rollers 13.

Figure 3:
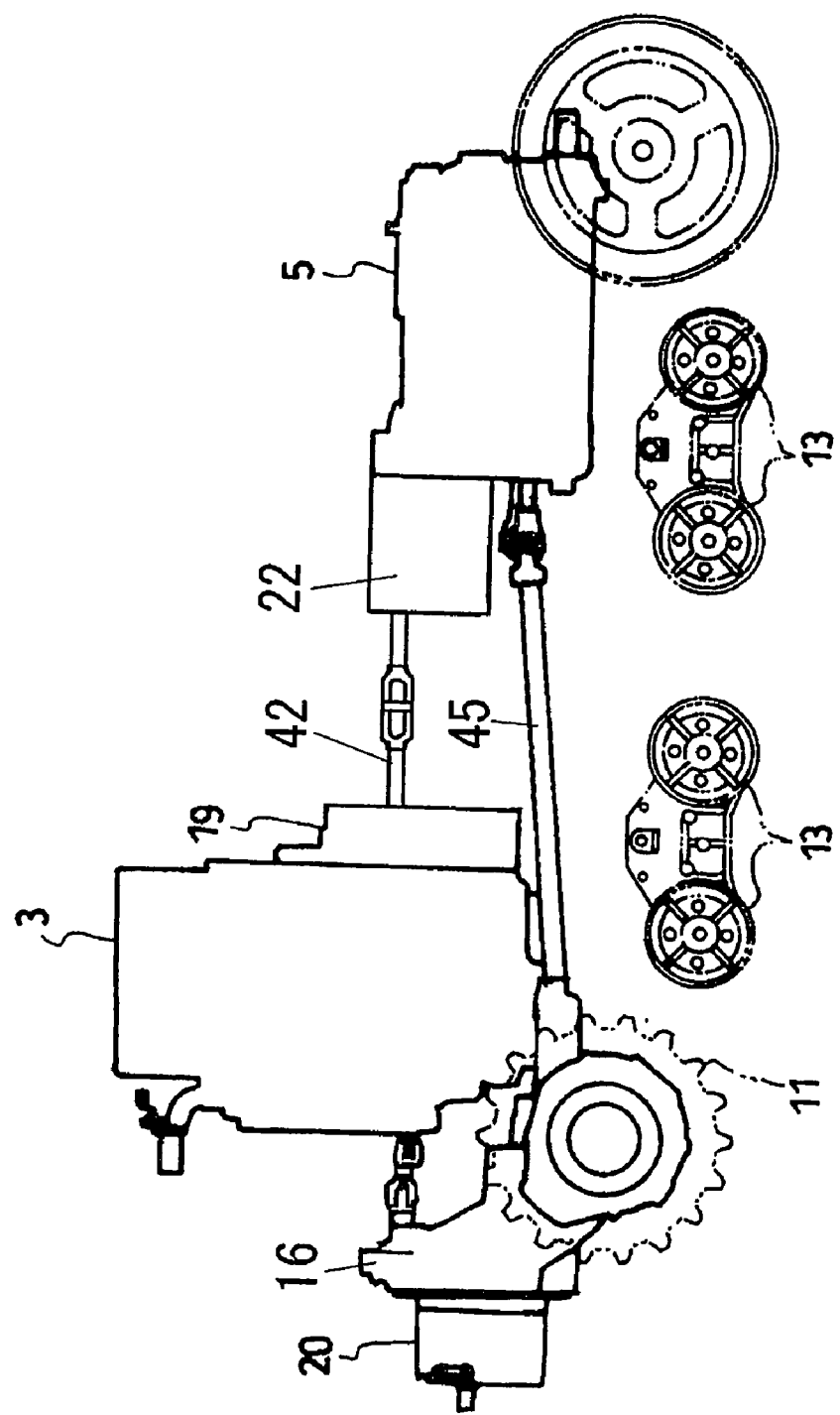
FIG. 3 is a side view showing arrangement of an engine, HSTs and a transmission casing.
Figure 4:
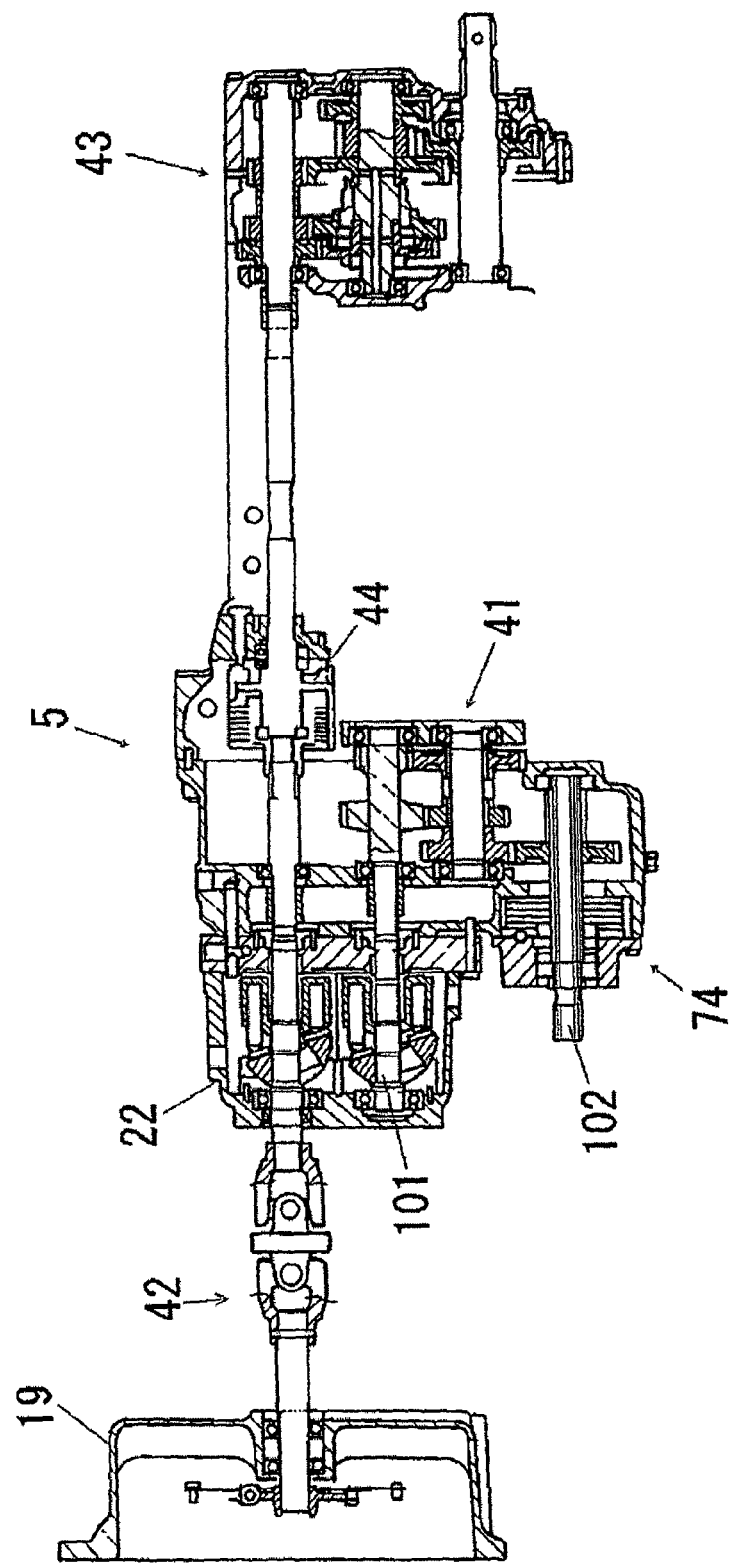
FIG. 4 is a sectional side view showing a construction of the rear transmission casing.

Description will now be given of a power transmission system of the crawler tractor in accordance with FIGS. 3 and 4.

A clutch casing 19 is attached to the rear portion of the engine 3. A damped output shaft 42 is extended rearward from the clutch casing 19 and connected to an input shaft of a hydraulic stepless transmission for traveling (hereafter, referred to as an HST for traveling) 22 attached to the front portion of the rear transmission casing 5.

The rear transmission casing 5 contains a sub transmission 41, a PTO transmission 43 and others. Driving force from the HST for traveling 22 is transmitted to the sub transmission 41. The PTO transmission 43 is connected to the input shaft of the traveling HST 22 through a clutch 44. A lower front portion of the rear transmission casing 5 serves as a traveling power take-off section in which an output shaft 102 is disposed.

In front of the engine 3 is disposed the front transmission casing 16 having a hydraulic stepless transmission for turning (hereafter, referred to as an HST for turning) 20 attached to the front surface thereof. The front transmission casing 16 is supported by the front portion of the main frames 6 so as to be arranged in the front portion of the vehicle body.

The HST for turning 20 is driven by driving force from the engine 3. The drive sprockets 11 are driven by resultant output force of output force from the HST for turning 20 and output force from the above-mentioned sub transmission 41.

The output rotation of the HST for traveling 22 on its motor side is varied by the sub transmission 41, and then inputted to a differential gearing through a transmission shaft 45.

Figure 55:
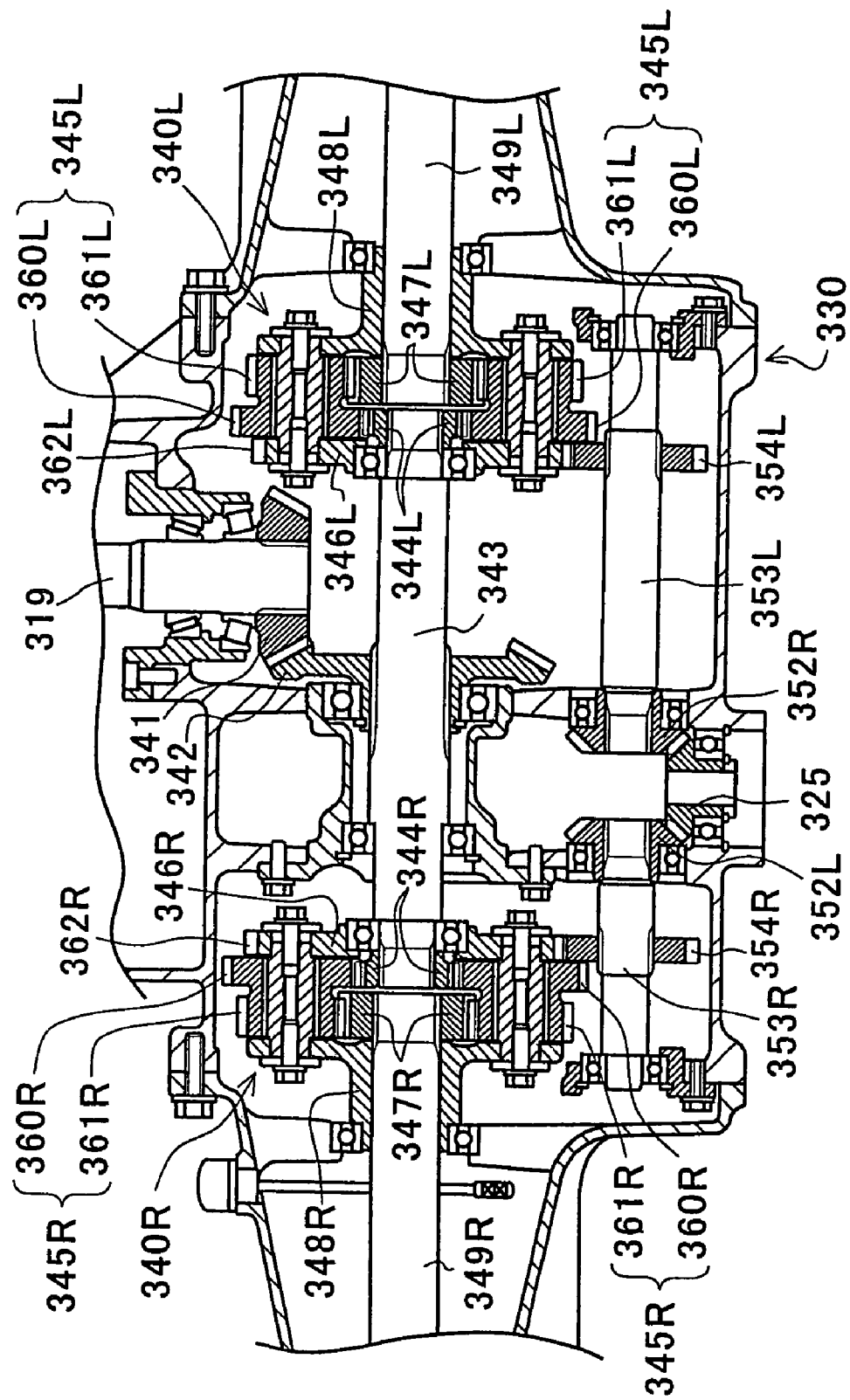
FIG. 55 is a sectional plan view showing a construction of the differential mechanism.

The differential gearing will now be described in accordance with FIG. 55.

In the rear transmission casing 5, the output shaft 102 transmits power from the engine 3 through a universal joint and the transmission shaft 45 to an input shaft 319 of the differential gearing in a differential casing 330. Driving force of the input shaft 319 is transferred to an input shaft 343 through bevel gears 341 and 342.

The rotational output of the output shaft 343 is divided into left and right planetary gear mechanisms 340L and 340R constituting the differential gearing. The left and right planetary gear mechanisms 340L and 340R comprise sun gears 344L and 344R, planetary gears 345L and 345R, carriers 346L, 346R, 348L and 348R, output gears 347L and 347R, etc.

The rotation of the input shaft 343 drives the sun gears 344L and 344R fixed on the left and right ends of the input shaft 343 in the same direction and at the same speed. Each of the planetary gears 345L is shaped into two gears 360L and 361L stuck to each other on a common rotational axis. The planetary gears 345R are formed substantially similarly with the planetary gears 345L. The gears 360L and 360R engage with the respective sun gears 344L and 344R, and the gears 361L and 361R with the respective output gears 347L and 347R.

Each of the planetary gears 345L is rotatably supported at one end thereof by a carrier 346L rotatably provided on the input shaft 343, and at the other end thereof by a carrier 348L rotatably provided on a drive output shaft 349L. The planetary gears 345L are rotatably supported between the carriers 346L and 348L, and revolved together with the carriers 146L and 148L around the rotational axis of the input shaft 343 and the drive output shafts 349L and 349R.

The assembly of planetary gears 345R is substantially similar with that of planetary gears 345L.

A gear 362L is formed on the outer peripheral surface of the carrier 346L and engages with a gear 354L. A divisional shaft 353L penetrates the gear 354L at an intermediate portion thereof. A bevel gear 352L is fitted onto one end of the delivery shaft 353L and engages with a bevel gear 325 fitted on a differential transmission shaft 224.

Similarly with the carrier 346L, the carrier 346R is formed on the outer peripheral surface thereof with a gear 362R, which engages with a gear 354R. A divisional shaft 353R penetrates the gear 354R at an intermediate portion thereof. A bevel gear 352R is fitted onto one end of the divisional shaft 353R and also engages with the bevel gear 325.

With regard to the above construction, it is assumed that the steering wheel 7 is kept in its neutral position. In this case, the HST for turning 20 is stationary so that the bevel gear 325 fixed on the differential transmission shaft 224, and the bevel gears 352L and 352R and the gears 354L and 354R fixed on the respective divisional shafts 353L and 353R remain stationary, thereby braking the left and right carriers 346L and 346R engaging with the respective gears 354L and 354R. Accordingly, the carriers 146L and 146R remain substantially stationary without rotating around the input shaft 343.

In this situation, rotation of the sun gears 344L and 344R is transferred into the planetary gears 345L and 345R rotatably supported on the stationary carriers 346L and 348L.

Therefore, the output gears 347L and 347R engaging with the gears 361L and 361R of the planetary gears 345L and 345R are rotated so as to rotate the left and right drive output shafts 349L and 349R.

Namely, while the steering wheel 7 remains in its neutral position, the differential gearing receives driving force from the engine 3 through only the transmission casing 5 and the input shaft 319, thereby rotating the left and right drive output shafts 349L and 349R at the same speed in the same direction.

On the other hand, when the steering wheel 7 is rotated for turning of the vehicle, the differential transmission shaft 224 of the HST for turning 20 is rotated in correspondence to the rotational degree of the steering wheel 7.

At this time, the bevel gear 325 is rotated so as to rotate the bevel gears 352L and 352R fixed on the divisional shafts 353L and 353R at the same speed in opposite directions through the bevel gear 325.

Accordingly, the left and right carriers 3146L and 346R engaging with gears 354L and 354R are rotated on the outer periphery of the input shaft 343 at the same speed in opposite directions. The planetary gears 345L are rotated integrally with the carriers 346L and 348L, and the planetary gears 345R integrally with the carriers 346R and 348R, so that the planetary gears 345L and 345R revolve around the input shaft 343 at the same speed in opposite directions.

If either the planetary gears 345L or 345R are rotated so that their relative rotation to the corresponding carrier 346L or 346R is opposite to their relative rotation to the input shaft 343, the sum of the two relative rotational speeds results in the rotational speed of the corresponding output gear 349L or 349R. If the two relative rotations are performed in the same direction, the remainder of subtraction between the two relative rotational speeds results in the rotational speed of the corresponding output gear 349L or 349R.

Namely, the resultant output of output from the engine 3 through the transmission casing 5 and output from the engine 3 through the HST for turning 20 causes a difference between the rotational speeds of the left and right drive output shafts 349L and 349R, thereby generating difference of rotation between the drive sprockets 11 of the left and right crawler type traveling devices, whereby the traveling vehicle turns left or right.

With regard to the HST for traveling 22, an output shaft 101 of the HST for traveling 22 is driven by the rotation of the input shaft of the HST for traveling 22. The drive rate and rotational direction of the output shaft 101 is controlled by controlling angle of a swash plate of a hydraulic pump of the input shaft side.

Driving force of the output shaft 101 is transferred to the sub transmission 41, varied in speed by the sub transmission 41, and transferred to the output shaft 102 in the traveling power take-off section. The above-mentioned transmission shaft 45 is connected to the output shaft 102 in the traveling power take-off section.

A brake mechanism 74 is constructed in the vicinity of the output shaft 102 so as to brake the output shaft 102. The output shaft 102 is connected to a sun gear for driving the drive sprockets 11 through the transmission shaft 45. Braking the output shaft 102 results in braking the drive sprockets 11.

The lower portion of the transmission casing below the sub transmission 41 therein serves as the power take-off section in which the brake mechanism 74 is provided. The HST for traveling 22 is arranged in front of the sub transmission 41, and the brake mechanism 74 is disposed under the HST for traveling 22.

The arrangement of the brake mechanism 74 serving as a parking brake in the lower portion of the rear transmission casing 5 is available for the brake mechanism 74 to approach a later-discussed brake pedal 54, so that a linkage, etc. therebetween becomes simple and it becomes so short as to reduce its friction loss and clearance, thereby facilitating operavility of the vehicle.

Furthermore, due to the structure peculiar to the crawler tractor, an advantageously large space is reserved under the cabin between the HST for traveling 22 and the engine 3. Specifically, the space may be left as it is so as to facilitate for maintenance. Otherwise, any additional equipment such as a mechanism or a hydraulic valve for controlling a working machine may be disposed in the space without changing the appearance of the vehicle.

Figure 5:
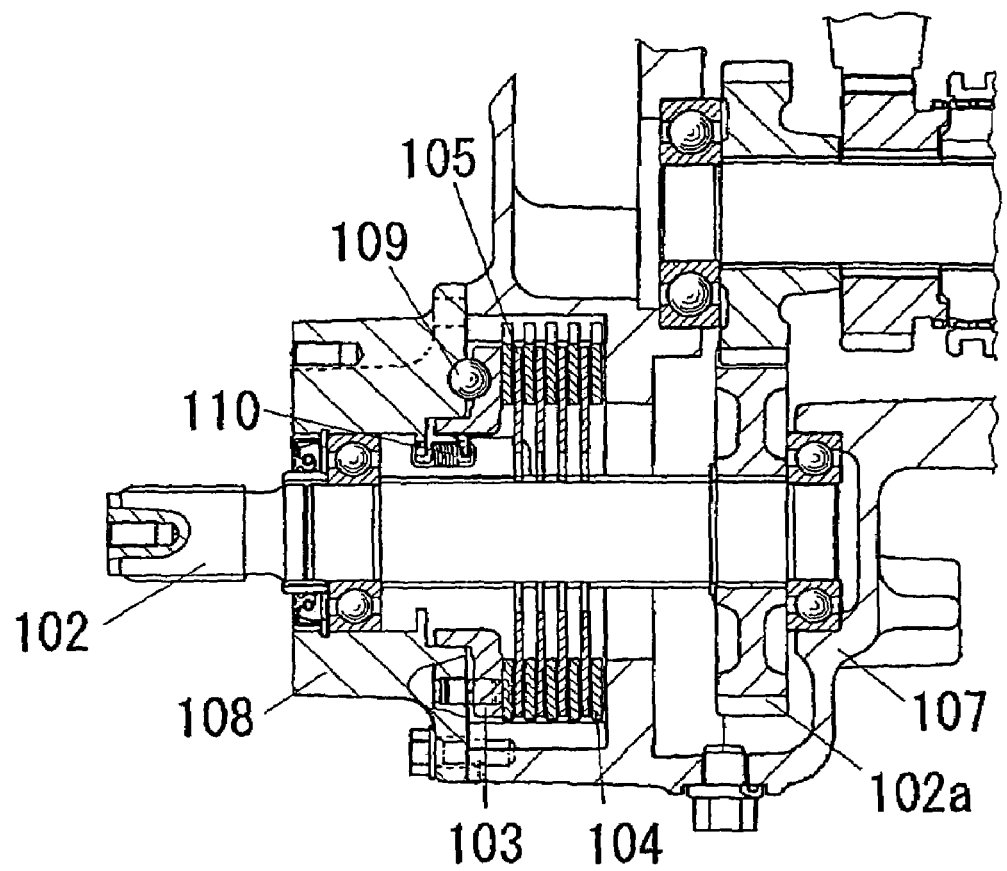
FIG. 5 is a sectional side view showing a construction of a brake mechanism.
Figure 6:
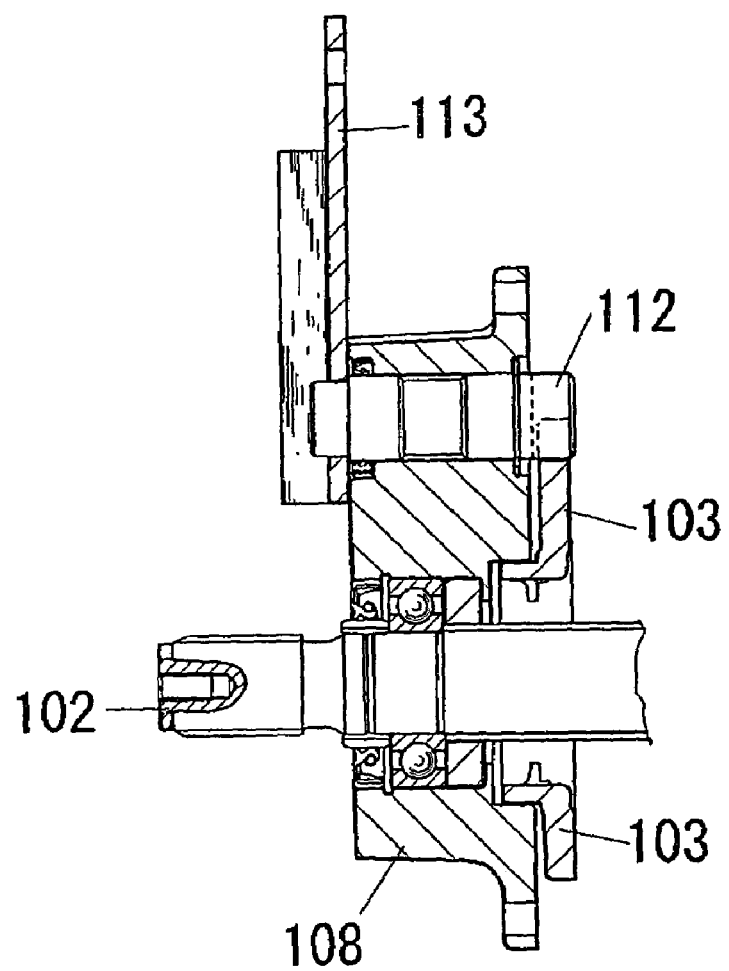
FIG. 6 is a sectional plan view showing the construction of the brake mechanism.

Description will be given on the brake mechanism 74 in accordance with FIGS. 5, 6 and 56.

The output shaft 102 is rotatably held by a transmission casing 107 and a brake cover 108 through a bearing, and a gear 102a is fixedly fitted on a rear end of the output shaft 102. The gear 102a engages with a gear of the sub transmission 41 so that driving force from the sub transmission 41 is transferred to the output shaft 102. The brake cover 108 is arranged in front of the brake mechanism 74 and fitted to the transmission casing 107 so as to cover the brake mechanism 74.

A pressure plate 103, and alternate multiple brake plates 105 and friction plates 104 are arranged around the output shaft 102.

A front portion of the pressure plate 103 is fitted to an inside portion of the brake cover 108 so as to be restricted in its sliding direction by the brake cover 108. A spring 110, which is anchored at one of its ends to the brake cover 108, is connected to the pressure plate 103 so as to bias the pressure plate 103 forwardly.

A ball 109 is disposed between the pressure plate 103 and the brake cover 108, and engaged in a slot 103b formed by the pressure plate 103 and the brake cover 108.

In the pressure plate 13, the slot 103b is formed like an arc centered on the output shaft 102. The depth of the slot 103b contacting with the ball 109 is reduced according to rotation of the pressure plate 103.

Figure 56:
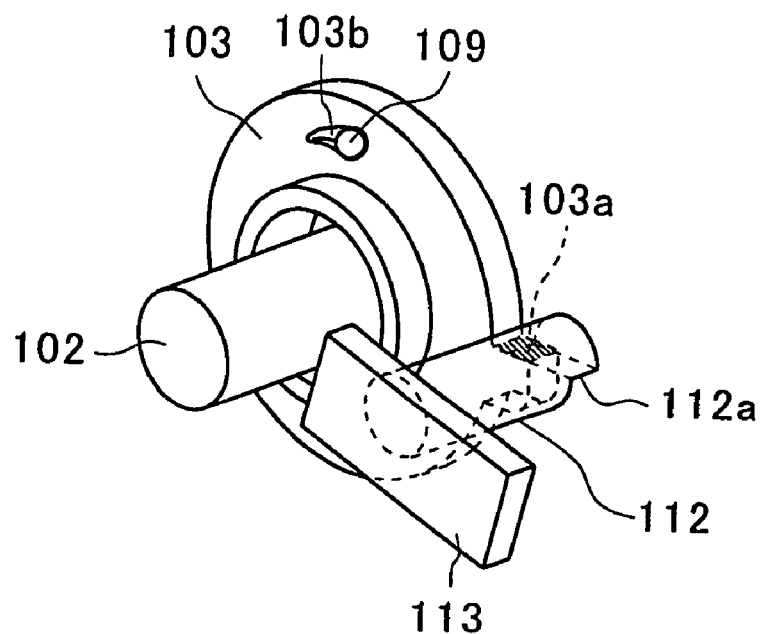
FIG. 56 is a schematic diagram showing rotation action of a pressure plate.
Figure 56:
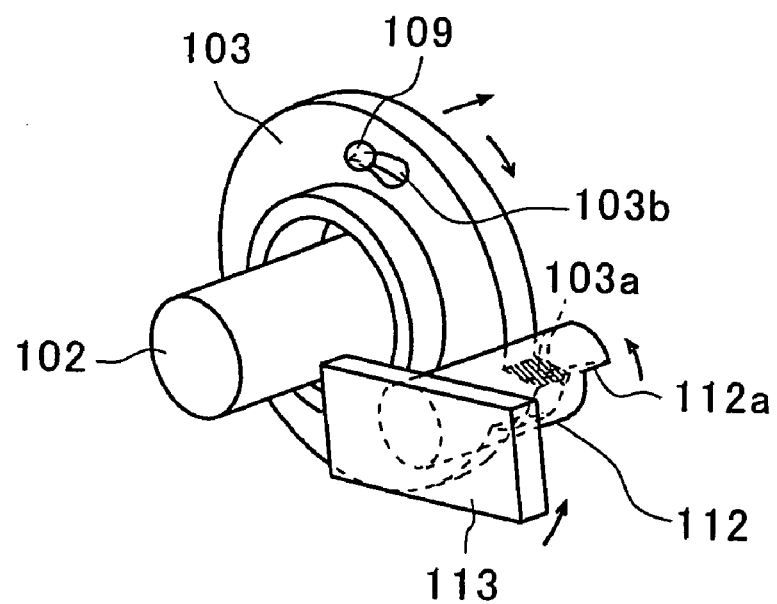

Accordingly, as shown in FIG. 56, by depressing the later-discussed brake pedal 54, the linkage mechanism is operated so that an actuation arm 113 is rotated centering around a steering input shaft 112 projecting from the actuation arm 113. A notch is provided on an end of the steering input shaft 112. When viewed in the axial direction of the steering input shaft 112, the notch is semicircular, and a contact surface 112a is formed as a chord of the semicircular shape so as to abut against a contact surface 103a formed on the pressure plate 103. When the steering input shaft 112 is rotated, an edge of the contact surface 112a close to the output shaft 102 is moved downward so as to push down the contact surface 103a of the pressure plate 103, thereby rotating the pressure plate 103 centering around the output shaft 102. Accordingly, the slot 103b formed in the pressure plate 103 moves so as to gradually move the ball 109 from the deep portion to the shallow portion in the slot 103b. The ball 109 is engaged in the slot 103b so as not to move relative to the brake cover 108, and the pressure plate 103 is slidable in the axial direction of the output shaft 102 toward/away from the brake cover 108. As a result, the pressure plate 103 rotates and slides in the direction to press the friction plates 104 against the brake plates 105.

The friction plates 104 and the brake plates 105 are disposed alternately behind the pressure plate 103. The peripheral portions of the friction plates 104 engage with the transmission casing 107, and the brake plates 105 with the output shaft 102.

The friction plates 104 are not rotatable relative to the transmission casing 107 but are slidable in the longitudinal direction of the transmission casing 107. On the other hand, the brake plates 105 are not rotatable relative to the output shaft 102 but are slidable in the longitudinal direction of the transmission casing 107.

The friction plates 104 and the brake plates 105 are disposed between the pressure plate 103 and a rib of the transmission casing 107. By sliding the pressure plate 103 backward with respect to the transmission casing 107, the friction plates 104 are pressed against the brake plates 105, thereby generating force for braking the output shaft 102.

Accordingly, the braking force is applied on the output shaft 102 so as to actuate as a parking brake.

Since the brake mechanism 74 is disposed in the traveling power take-off section, i.e., the lower portion of the rear transmission casing 5, the distance between the brake pedal 54 and the brake mechanism 74 is so short as to provide a compact linkage therebetween facilitating for its simple design and operativity.

Figure 7:
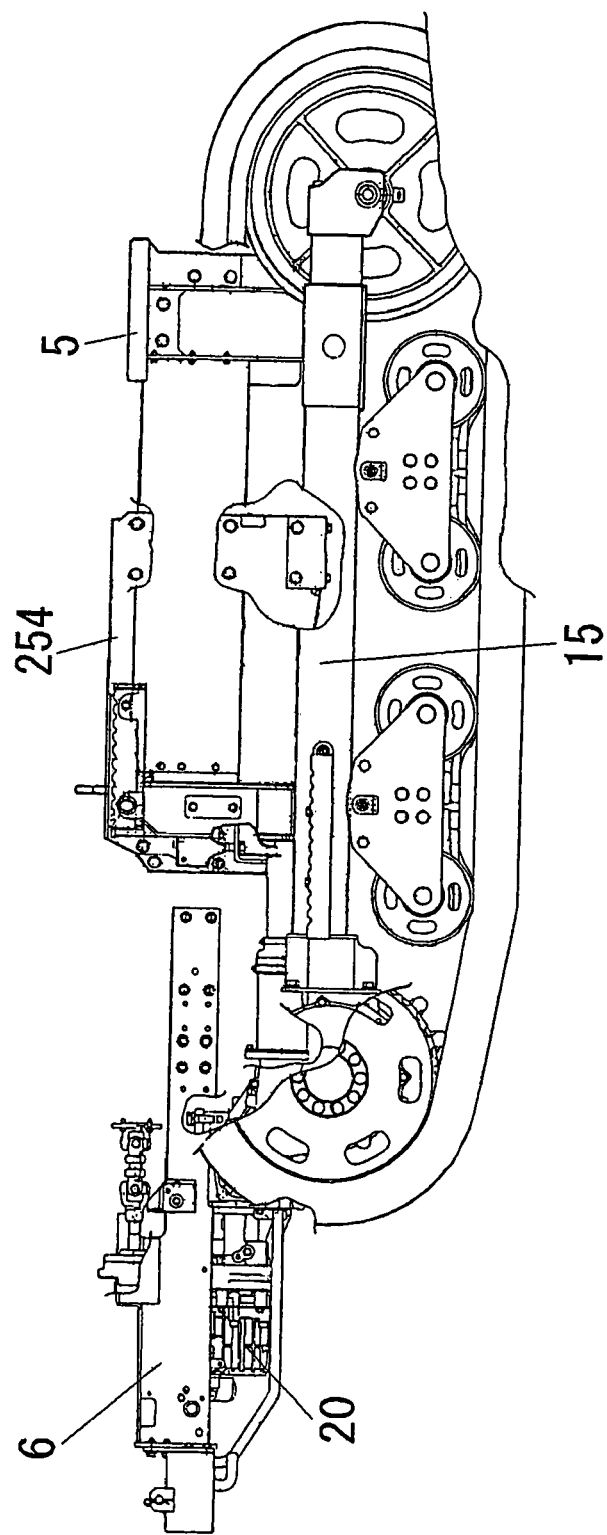
FIG. 7 is a side view showing a frame construction of the crawler tractor.
Figure 8:
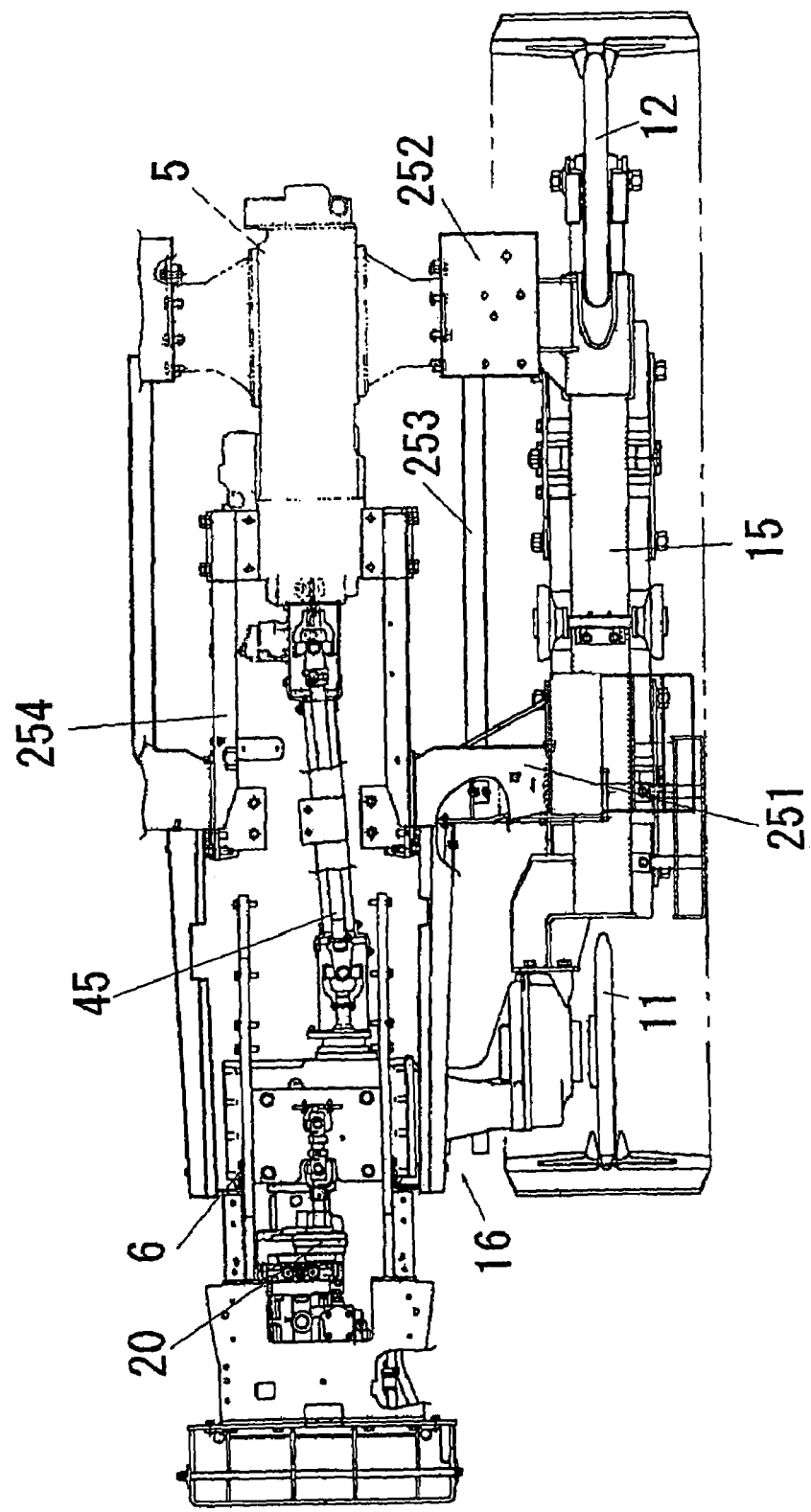
FIG. 8 is a plan view showing the frame construction of the crawler tractor.

Next, description will be given of a frame construction of the crawler tractor in accordance with FIGS. 7 and 8.

The main frames 6 are disposed in the front portion of the vehicle body, and the engine 3 is disposed on the main frames 6. The HST for turning 20 is disposed between the main frames 6. The front transmission casing 16 is connected to the main frames 6, and the drive sprockets 11 are disposed on outsides of the front transmission casing 16.

The front ends of the crawler frames 15 are connected to the outer surfaces of the front transmission casing 16. The crawler frames 15 are also connected to the clutch casing 19 with frames 254 through support frames 251. Furthermore, the rear ends of the crawler frames 15 are connected to the rear transmission casing 5 through rear support frames 252.

The frames 254 cover the left and right sides of the HST for traveling 22 and the transmission shaft 45. Side frames 253 are disposed on the respective outer surfaces of the frames 254, and connect the support frames 251 with the rear support frames 252.

Figure 9:
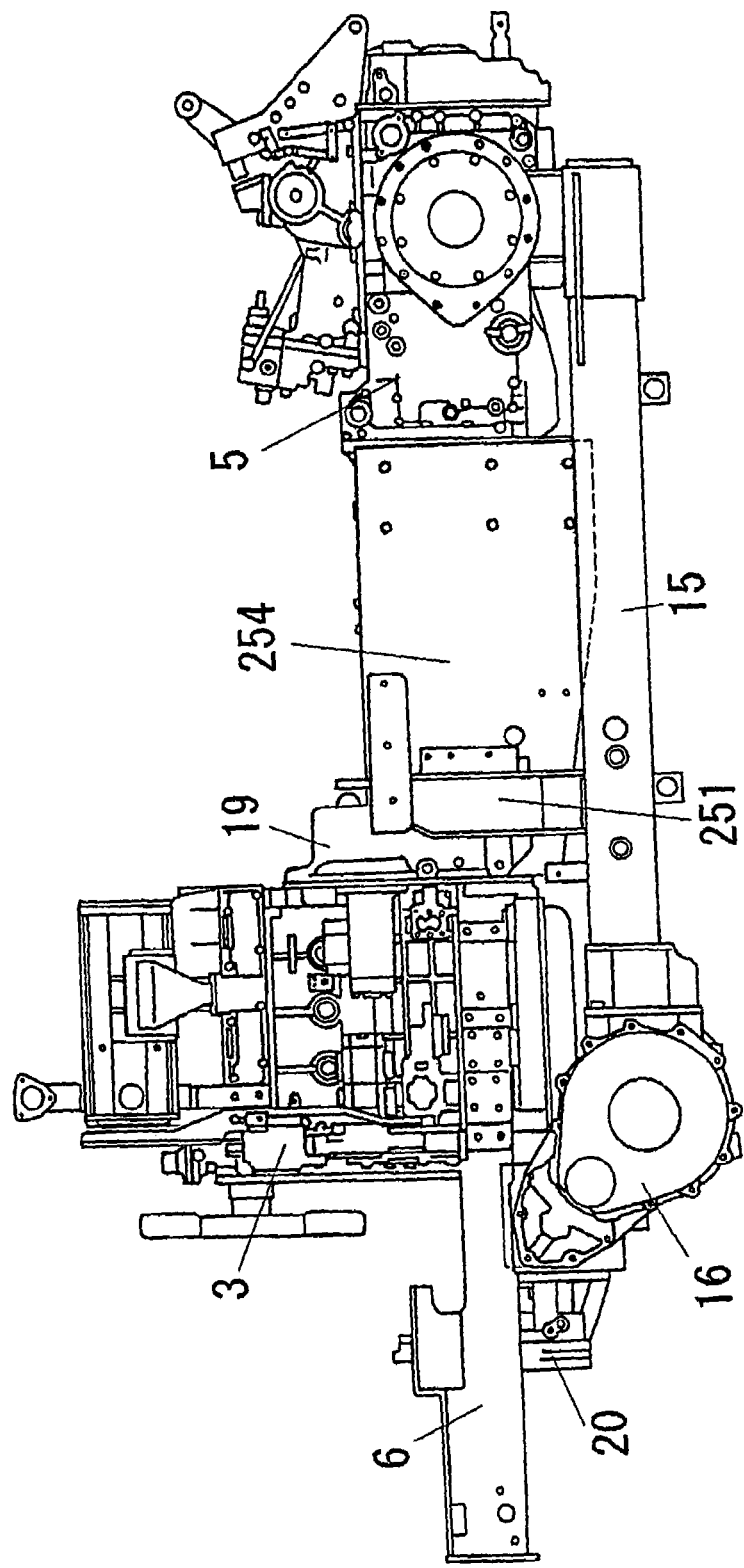
FIG. 9 is a side view showing a connection construction of the engine and the rear transmission casing.
Figure 10:
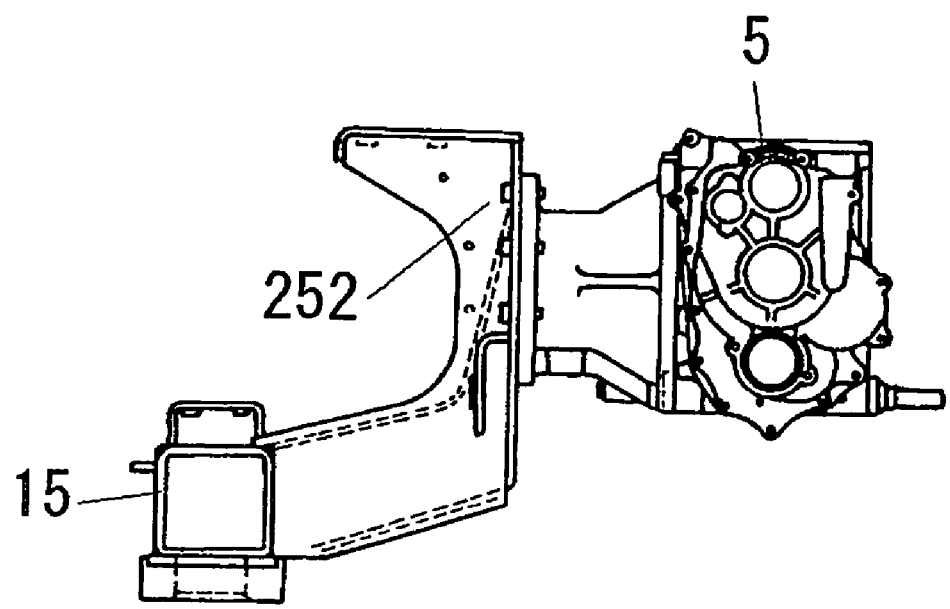
FIG. 10 is a front view showing the connection construction of the engine and the rear transmission casing.
Figure 11:
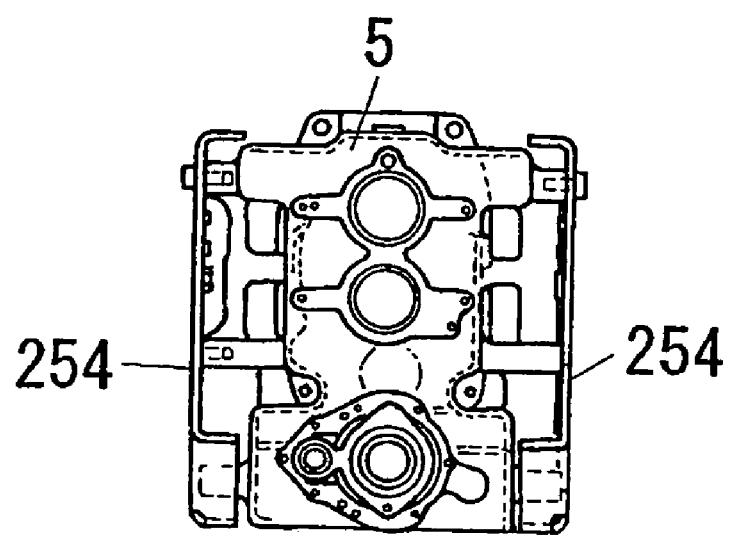
FIG. 11 is a front view showing a construction of the rear transmission casing and a connection frame.

Next, description will be given of the construction of the frames 254 according to FIGS. 9 to 11.

The frames 254, which are C-like shaped when viewed in front, connect the clutch casing 19 and the rear transmission casing 5 to each other. As the above mentioned, the engine 3 is laid on the main frames 6, and the clutch casing 19 is attached to the rear portion of the engine 3.

The frames 254 are connected to the left and right surfaces of the clutch casing 19, and the rear transmission casing 5 is connected to the rear portions of the frames 254.

Since the frames 254 connect the clutch housing 19 and the rear transmission casing 5 on their left and right sides, the engine 3 is integrated with the rear transmission casing 5 through the frames 254.

Due to the above-mentioned frame construction, the HST for traveling 22 is provided with a vertical opening which is advantageous for maintainability and cooling effect. For example, with regard to this embodiment, by removing a cover of a floor step in the cabin, the HST for traveling 22 can be maintained from its upper side. Since the frames 254 is clamped to the rear transmission casing 5 and the clutch casing 19 with bolts, the frames 254 can be removed easily by removing the bolts.

Further, this frame construction has sufficient strength against torsion and vertical weighting in spite of its lightweight.

Figure 12:
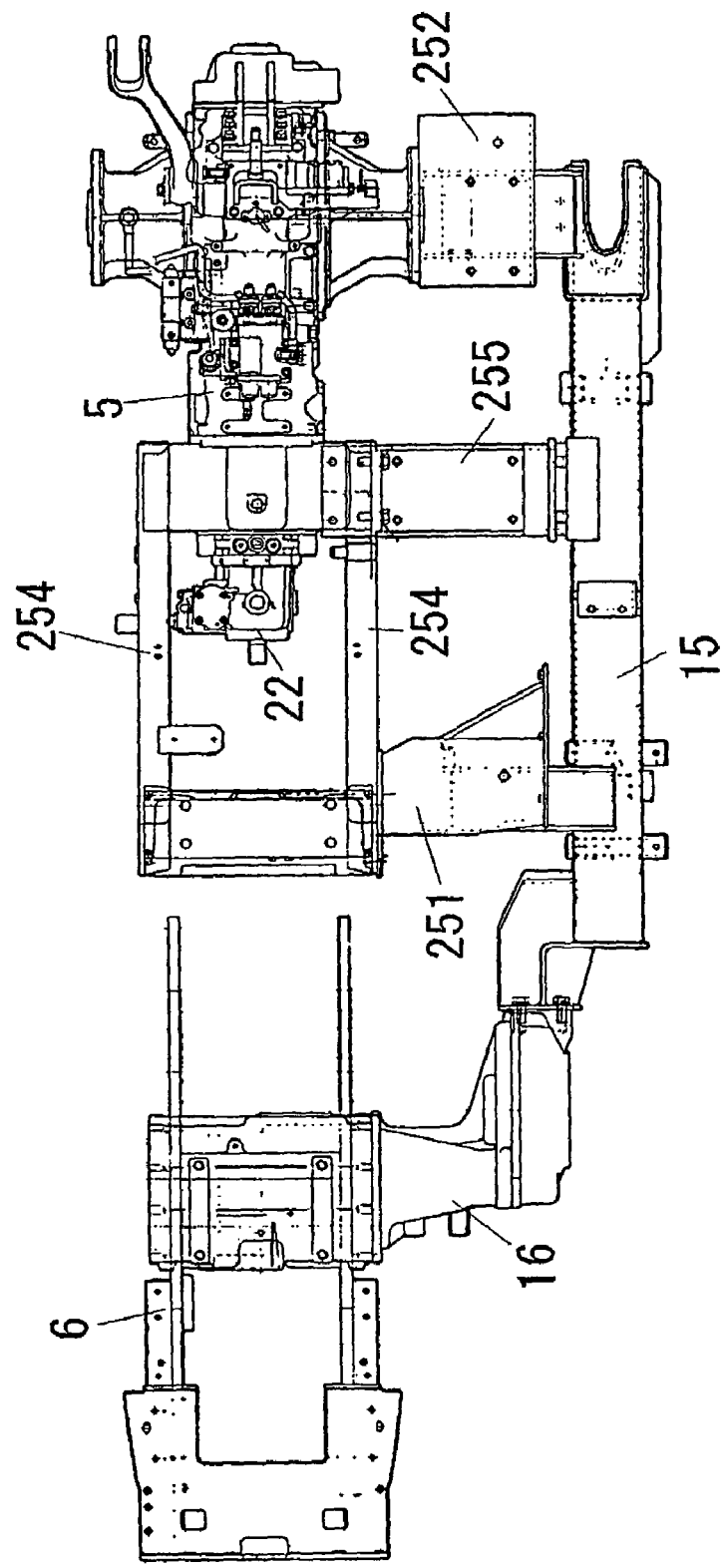
FIG. 12 is a plan view showing another frame construction of the crawler tractor.
Figure 13:
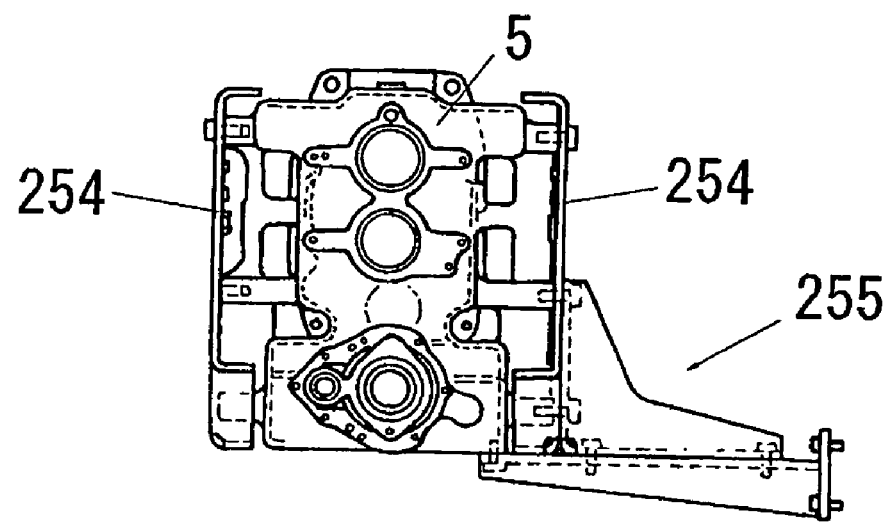
FIG. 13 is a front view showing a connection construction of the connection frame and a center support frame.

Furthermore, as an embodiment shown in FIGS. 12 and 13, the frames 254 may be connected at the rear portions thereof to the respective crawler frames 15 through center support frames 255, thereby enhancing frame rigidity of the crawler tractor.

With regard to this embodiment, the support frame 251, the center support frame 255 and the rear support frame 252 are arranged at substantially regular intervals so as to enhance their rigidity for supporting the crawler frame 15.

Figure 14:
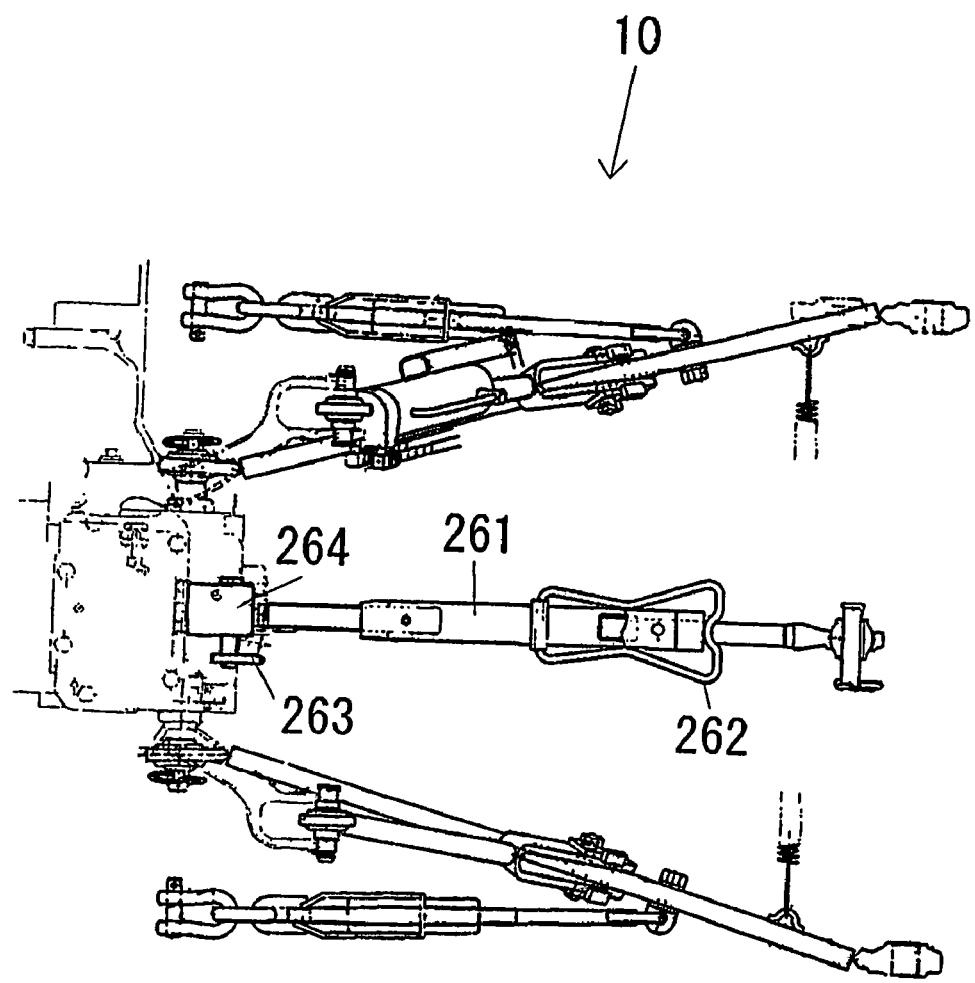
FIG. 14 is a plan view showing a construction of an attaching linkage.
Figure 15:
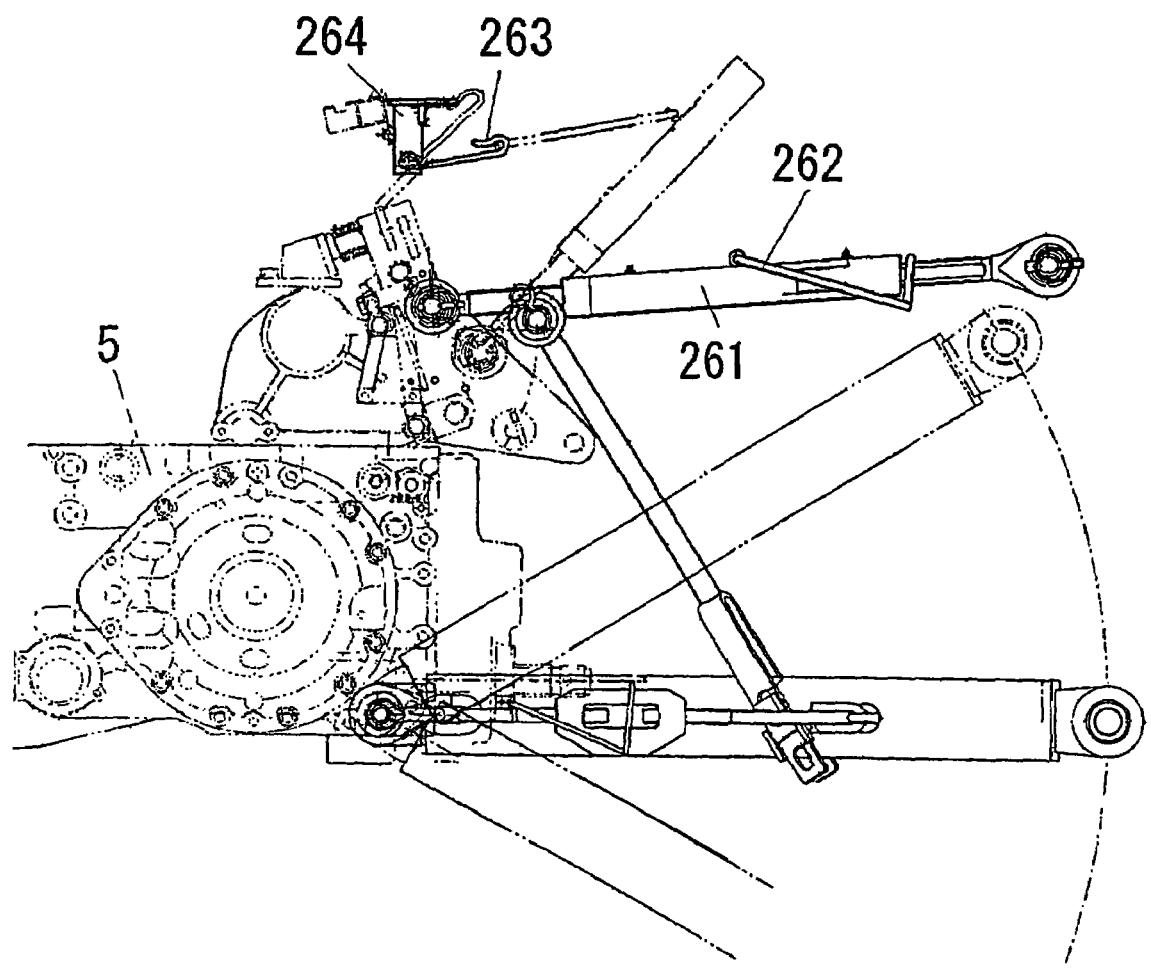
FIG. 15 is a side view showing the construction of the attaching linkage.
Figure 16:
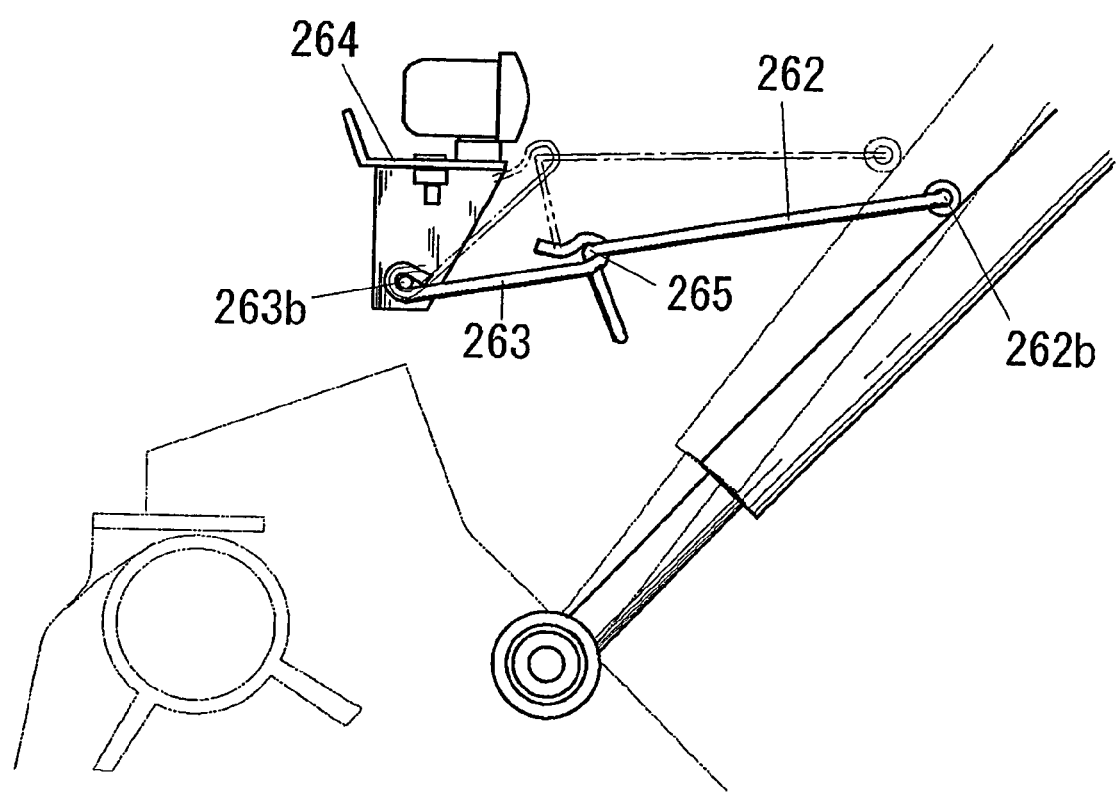
FIG. 16 is a side view showing an anchored state of a top link.
Figure 17:
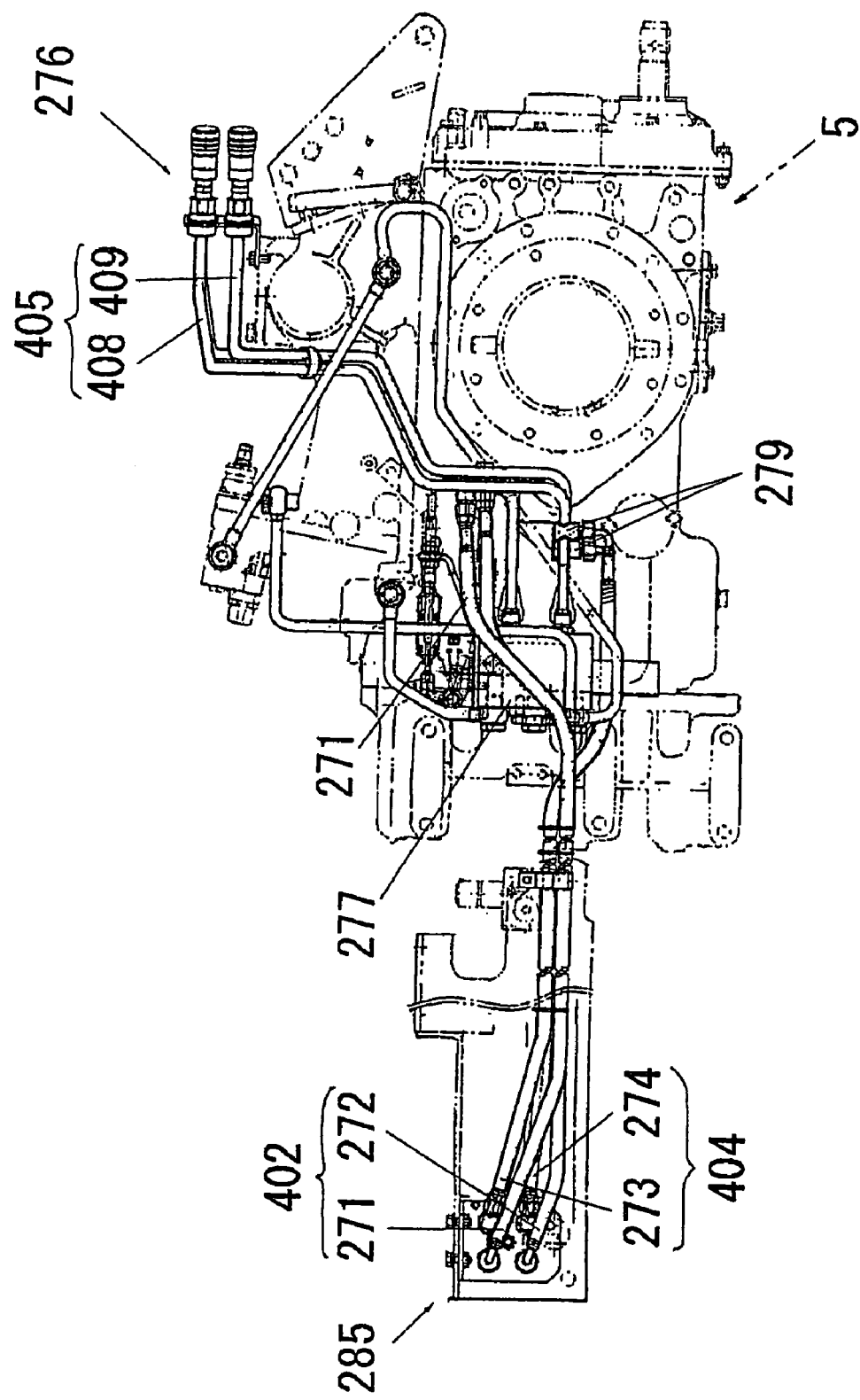
FIG. 17 is a side view showing a construction of hydraulic piping from a sub control valve.
Figure 18:
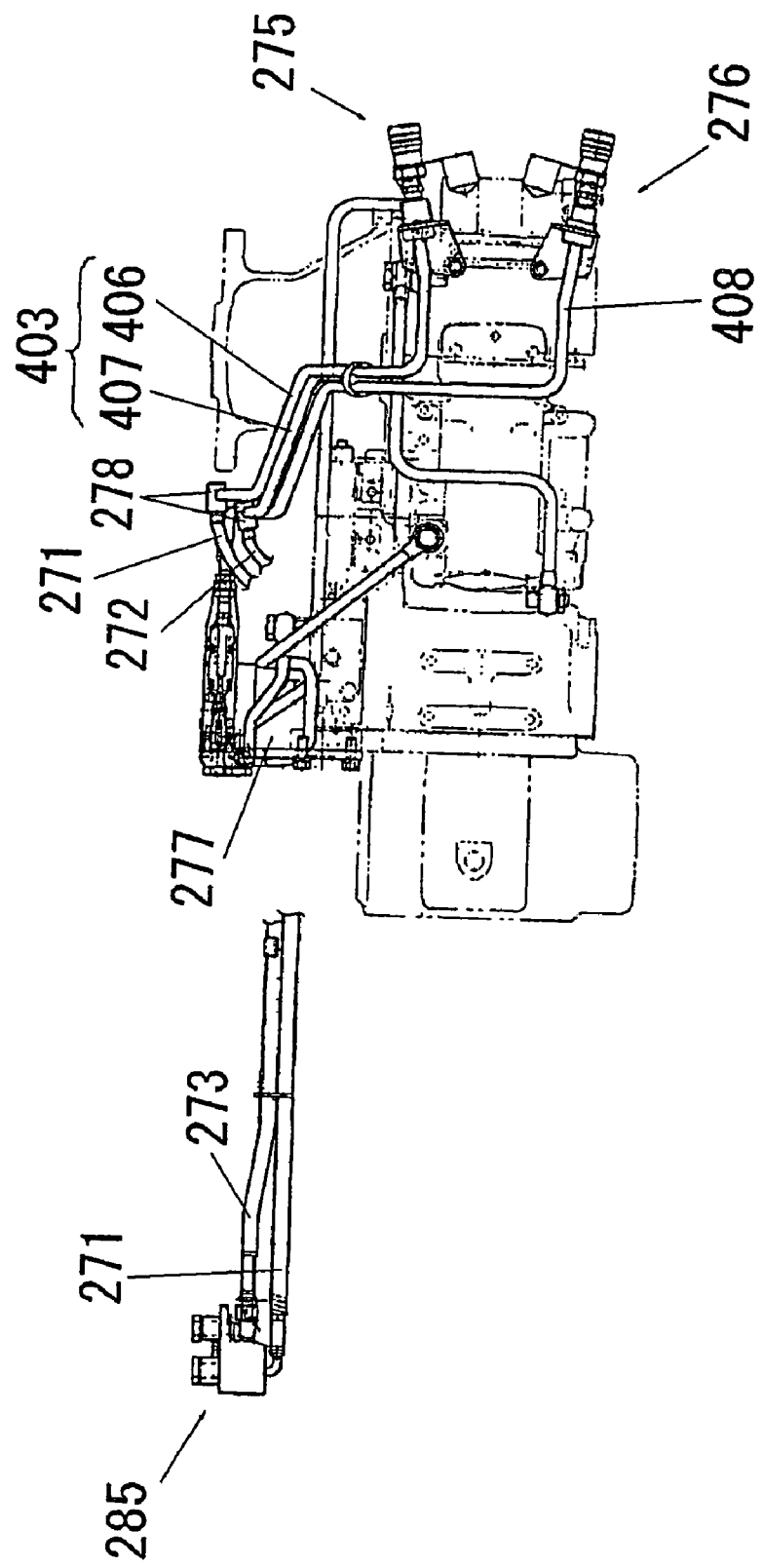
FIG. 18 is a plan view showing the construction of hydraulic piping from the sub control valve.
Figure 19:
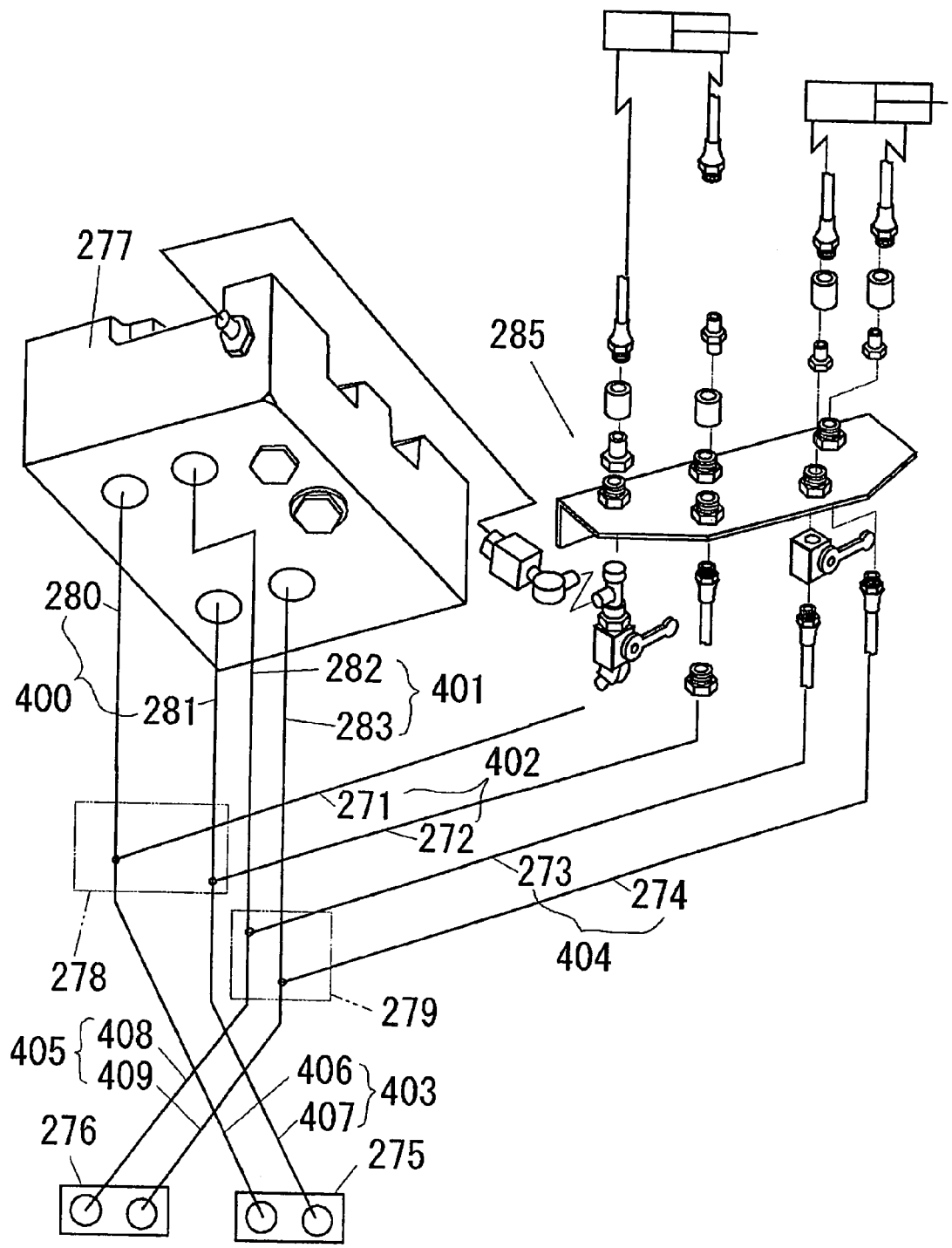
FIG. 19 is a schematic diagram showing a connection construction of the sub control valve.

Next, description will be given of a construction for holding the top link in the linkage 10 for lifting a working machine in accordance with FIGS. 14 to 16.

The top link 261 is rotatably supported above the rear portion of the rear transmission casing 5 so that the rear end of the top link 261 is vertically rotatable. A stopper 264 is disposed above the supported portion of the top link 261, and a hook 263 is rotatably supported on a side surface of the stopper 264. The hook 263 is open upwardly backward.

A handle 262 is disposed on the upper surface of the top link 261, and is longitudinally rotatable relative to the top link 261.

When a work machine is removed from the linkage 10, the top link 261 is raised to be held.

The handle 26 is hooked on the hook 263 for holding the raised top link 261. Namely, the top link 261 is rotated upwardly, and then the handle 262 is pushed down ahead and engaged with the hook 263.

At this time, a rotation fulcrum 263b of the hook 263, a rotation fulcrum 262b of the handle 262, and a point 265 where the handle 262 is engaged with the hook 263 are aligned on a straight line. Also, the rotational axis of the hook 263 and the rotational axis of the handle 263 are parallel.

Accordingly, when the top link 261 is rotated vertically by a shock in traveling of the vehicle or another, the hook 263 and the handle 262 are rotated, and the line, which passes along the rotation fulcrum 263b, the engaging point 265 and the rotation fulcrum 262b, is bent. Namely, the shock is absorbed and distributed by rotation of the handle 262 and the hook 263.

Since the hook 263 is provided in the vicinity of the stopper 264, the rotational degree of the hook 264 is restricted by the stopper 264. Accordingly, the top link 261 is prevented from interfering with circumferential parts and being damaged. Furthermore, since a portion of the stopper 263 for abutting against the hook 264 is disposed above the hook 264, parts disposed above the stopper 264 are protected from the hook 263.

When the handle 262 is going to be removed from the hook 263, the top link 261 is rotated upwardly so that the hook 263 abuts against the stopper 264. Then, by rotating the top link 261 further upwardly, the handle 262 is slid forwardly against the hook 263. Accordingly, the handle 262 is disengaged from the hook 263.

Then, the hook 263 is rotated downwardly, and the handle 262 is pushed down rearwardly. The top link 261 is moved down so as to be released from its held state.

A disc spring or the like is disposed on the rotational axis of the hook 263 so as to press the hook 263 perpendicularly to the rotational direction of the hook 263, so as to generate friction force for holding the rotated hook 263 at the place.

Therefore, even if the top link 261 is rotated upwardly by a shock in traveling of the vehicle or another and the hook 263 is disengaged from the handle 262, the hook 263 is held in its upwardly rotated place. Accordingly, when the top link 261 is rotated downwardly, the hook 263 and the handle 262 are engaged again.

Namely, unless the hook 263 is rotated downwardly, the engaging state of the top link 261 is sustained.

Next, description will be given of hydraulic piping construction in accordance with FIGS. 17 to 20.

The crawler tractor is provided with a hydraulic pump for supplying pressure oil to the working machine connected to the front or rear portion of the vehicle body. Pressure oil is supplied from the hydraulic pump to front and rear connection ports (specifically, a front hydraulic port 285, and couplers 275 and 276) through a sub control valve (hereafter, referred to as a SCV) 277.

The SCV 277 is disposed sidewise from the rear transmission casing 5. With regard to this embodiment, there are two hydraulic systems directly controlled by the SCV 277. The systems are a first system 400 comprising pipings 280 and 281, and a second system 401 comprising pipings 282 and 283.

Figure 20:
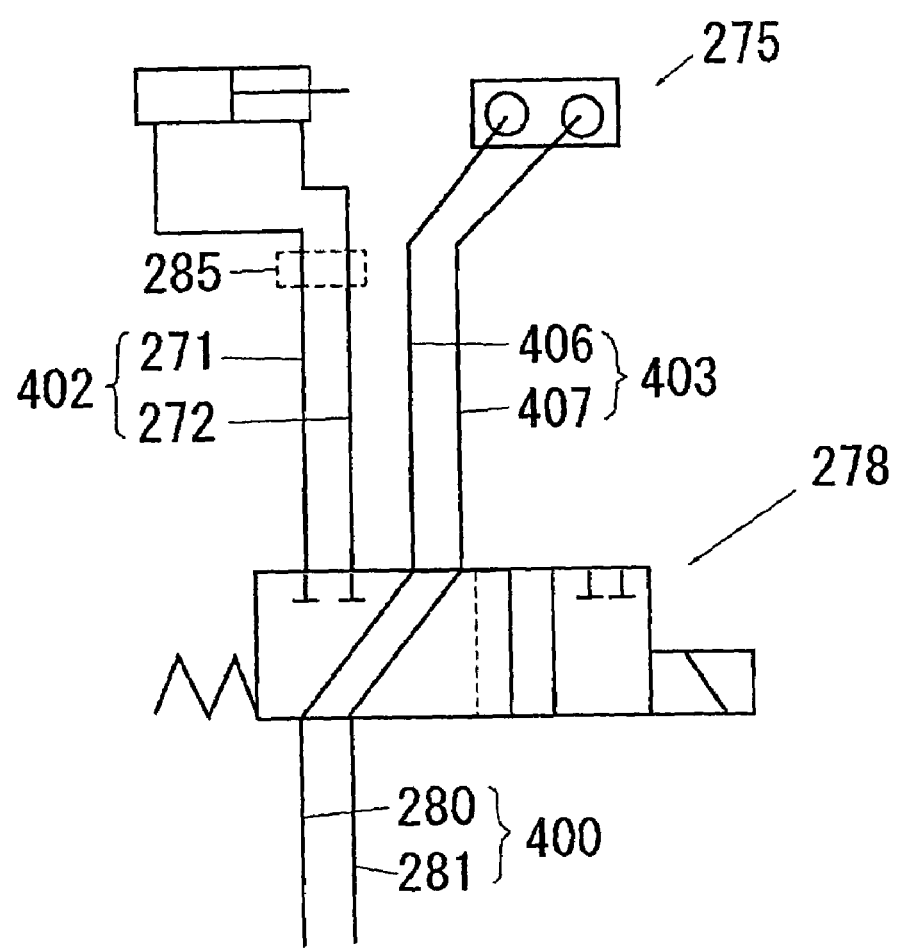
FIG. 20 is a schematic diagram showing a construction of electromagnetic switching valves.

As shown in FIG. 20, the first system 400 is connected to an electromagnetic switching valve 278, and is constructed so as to selectively supply pressure oil to either a front first system 402 or a rear first system 403. The front first system 402 comprises pipings 271 and 272. The front first system 402 is connected at one end thereof to the electromagnetic switching valve 278, and at the other end thereof to the front hydraulic port 285. The rear first system 403 comprises pipings 406 and 407. The rear first system 403 is connected at one end thereof to the electromagnetic switching valve 278, and at the other end thereof to the coupler 275.

According to the above construction, two hydraulic systems: one for a front-loaded working machine; and the other for a rear-loaded working machine, are selectively controlled by operation of the SCV 277 for pressure oil supply to the first system 400 combined with switching operation of the electromagnetic switching valve 278.

On the other hand, the hydraulic route construction on the downstream of the second system 401 is substantially similar with the hydraulic circuit construction on the downstream of the above-mentioned first system 400.

The second system 401 is connected to an electromagnetic switching valve 279, and is constructed so as to selectively supply pressure oil to either a front second system 404 or a rear second system 405. The front second system 404 comprises pipings 273 and 274. The front second system 404 is connected at one end thereof to the electromagnetic switching valve 279, and at the other end thereof to a front hydraulic port 285. The rear second system 405 comprises pipings 408 and 409. The rear second system 405 is connected at one end thereof to the electromagnetic switching valve 279, and at the other end thereof to the coupler 276.

According to the above construction, two hydraulic systems: one for a front-loaded working machine; and the other for a rear-loaded working machine, are selectively controlled by operation of the SVC 277 for pressure oil supply to the second system 401 combined with switching operation of the electromagnetic switching valve 279.

Namely, the maximum number of controllable hydraulic circuit systems by operative combination of the SCV 277 with the electromagnetic switching valves 278 and 279 is four, that is, the maximum two systems for a front working machine and the maximum two systems for a rear working machine.

In this embodiment, the two electromagnetic switching valves 278 and 279 are provided on the downstream of the SCV 277. Alternatively, such an electromagnetic switching valve may be added so as to increase the number of controllable hydraulic systems by the single SCV 277.

Figure 21:
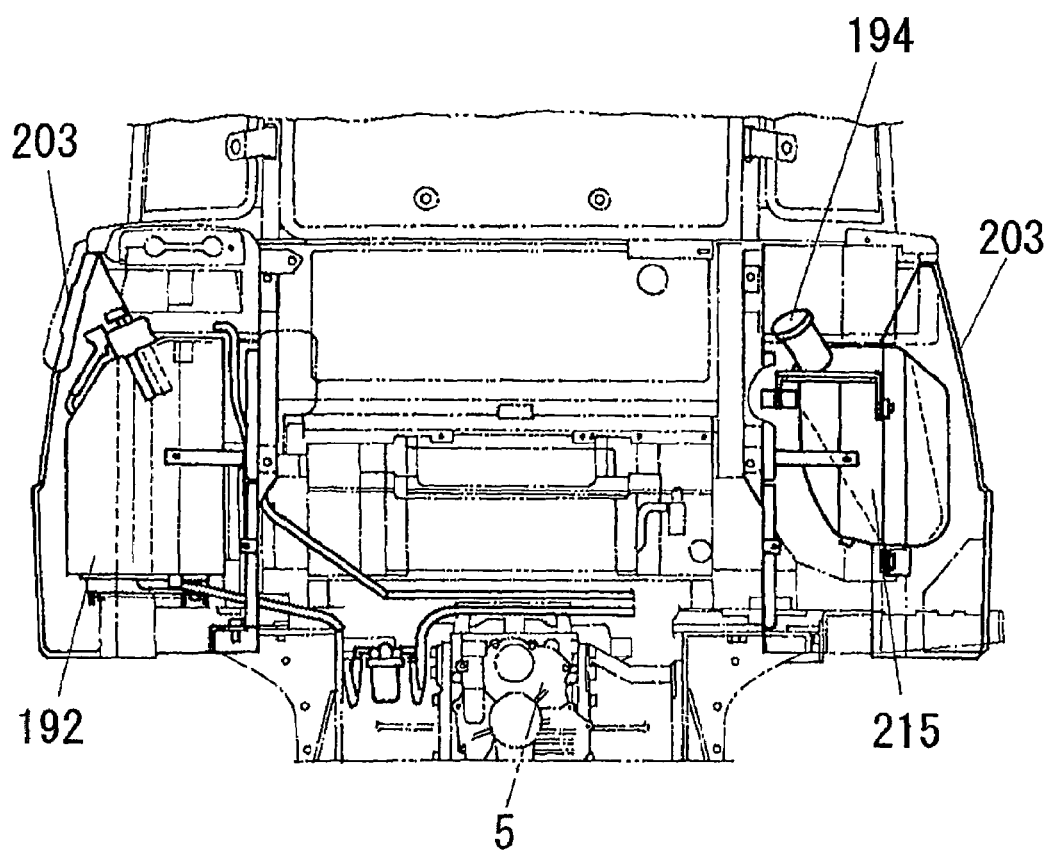
FIG. 21 is a rear view showing an arrangement of a fuel tank and a pressure oil tank.
Figure 22:
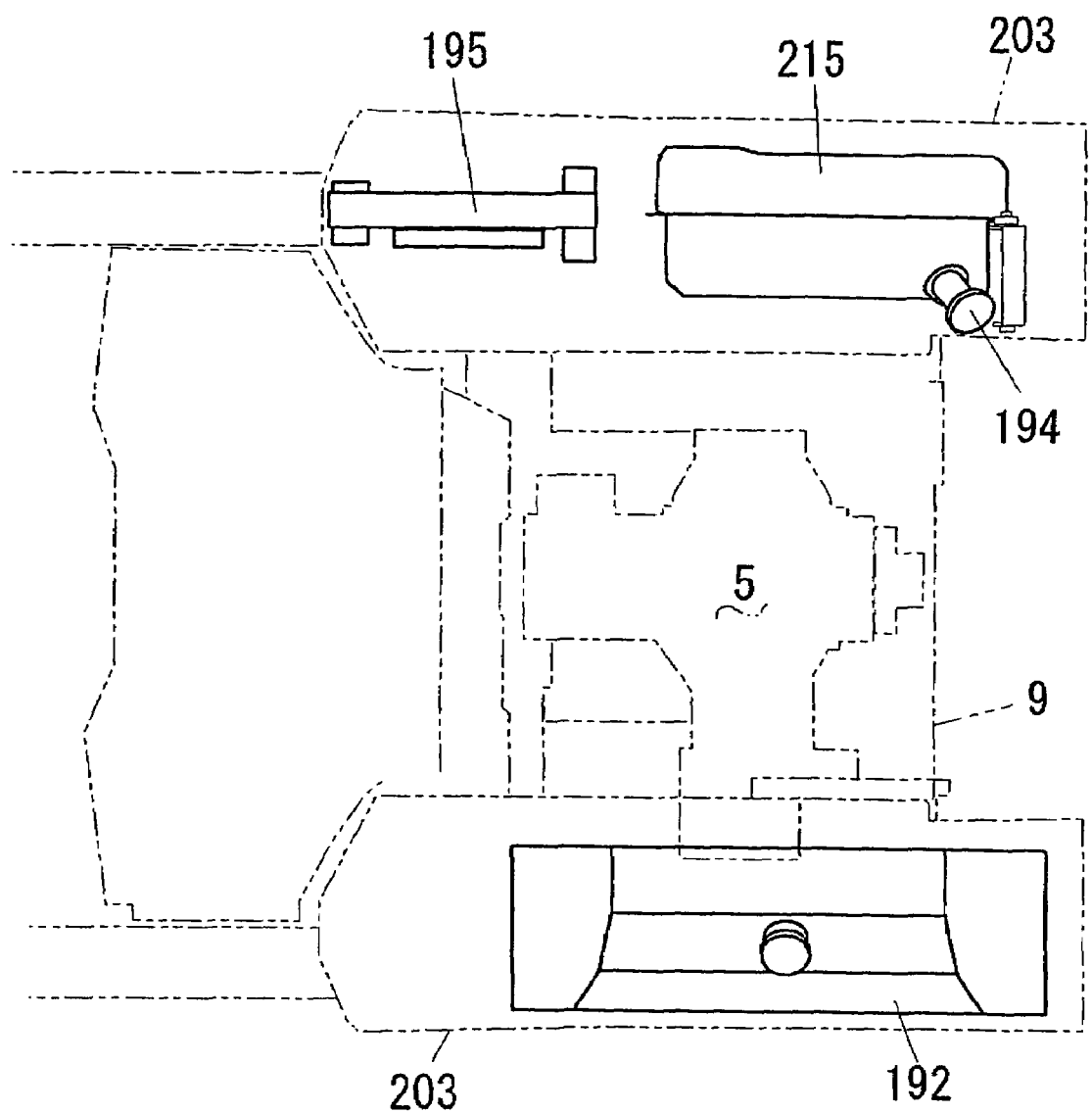
FIG. 22 is a plan view showing the arrangement of the fuel tank and the pressure oil tank.

Next, description will be given of an arrangement of a fuel tank and an oil tank in accordance with FIGS. 21 and 22.

Rear fenders 203 are disposed on left and right sides of the lower rear portion of the cabin 9 so as to cover the lower rear side of the cabin 9. A fuel tank 192 is disposed in the left rear fender 203. A pressure oil tank 215 for HST is disposed in the right rear fender 203. An oil cooler 195 is disposed in front of the pressure oil tank 215.

A refueling opening of the fuel tank 192 is disposed outward for facilitating fuel-supply to the fuel tank 192.

An auxiliary base on which an oil feeding tank and others are mounted will be described in accordance with FIGS. 23 and 24.

An auxiliary base 197 is disposed in the lower portion of the fender 203 with the fuel tank 192 therein. The auxiliary base 197 is horizontally rotatably supported at a front portion thereof on a pivot 199. A release lever 198 is attached to the rear portion of the auxiliary base 197, and is engaged with the auxiliary base 197 when the auxiliary base 197 is stored.

A hook is provided on the release lever 198. The hook is engaged with a stopper 196 fixed to the vehicle body so as to keep the auxiliary base 197 in the stored state.

When the auxiliary base 197 is going to be used, the lever 198 is pulled so as to disengage the hook from the stopper 196. Then, the auxiliary base 197 is pulled out rotating around the pivot 199.

Since the auxiliary base 197 receives frictional force only from the pivot 199, it can be pulled out smoothly. Accordingly, expansion of the auxiliary base 197 can be done easily. Furthermore, the auxiliary base 197 may be constructed compact.

A refueling opening 201 is provided in the upper portion of the fender 203 on the left side of the vehicle body, and fuel is supplied to the fuel tank 192 through the refueling opening 201. The auxiliary base 197 is disposed rearward from the refueling opening 201 so that the front portion of the auxiliary base 197 is disposed in the vicinity of the refueling opening 201 in the longitudinal direction.

Figure 23:
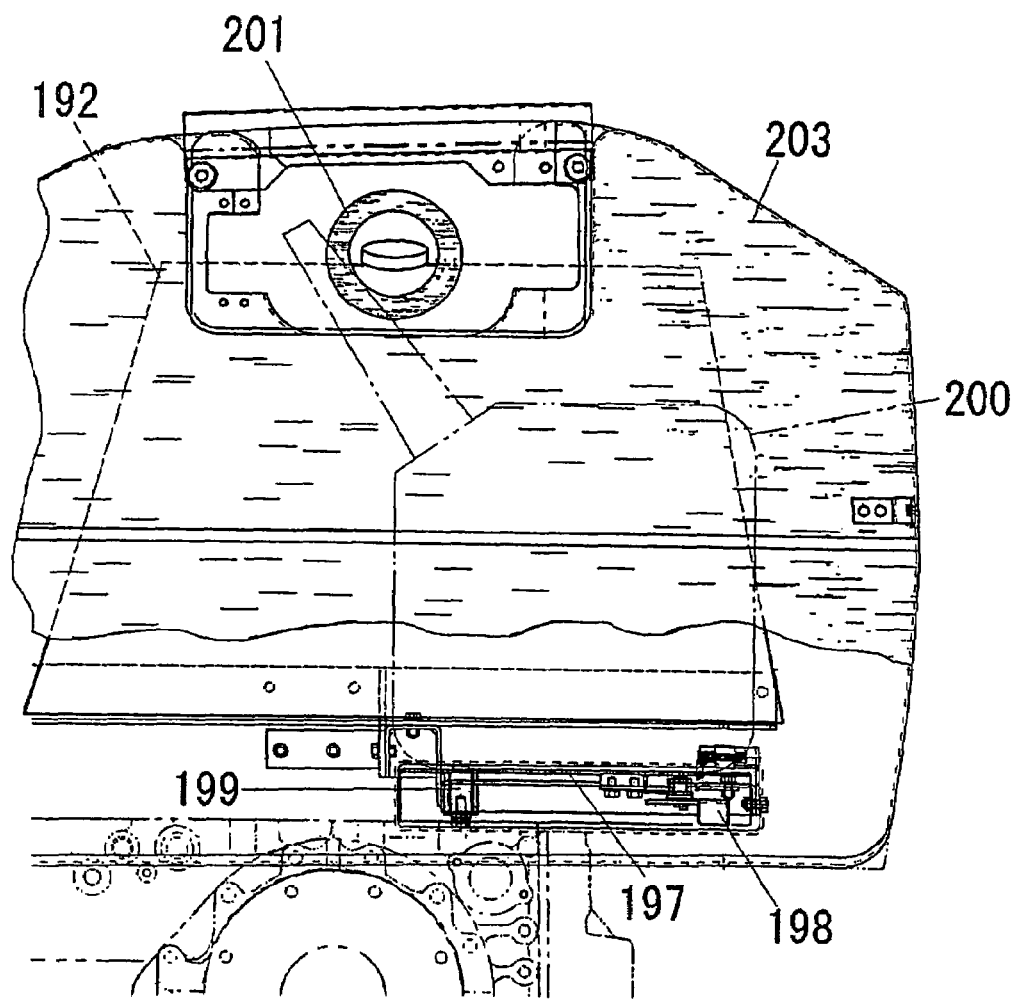
FIG. 23 is a side view showing a construction of an auxiliary base disposed in the vicinity of the fuel tank.
Figure 24:
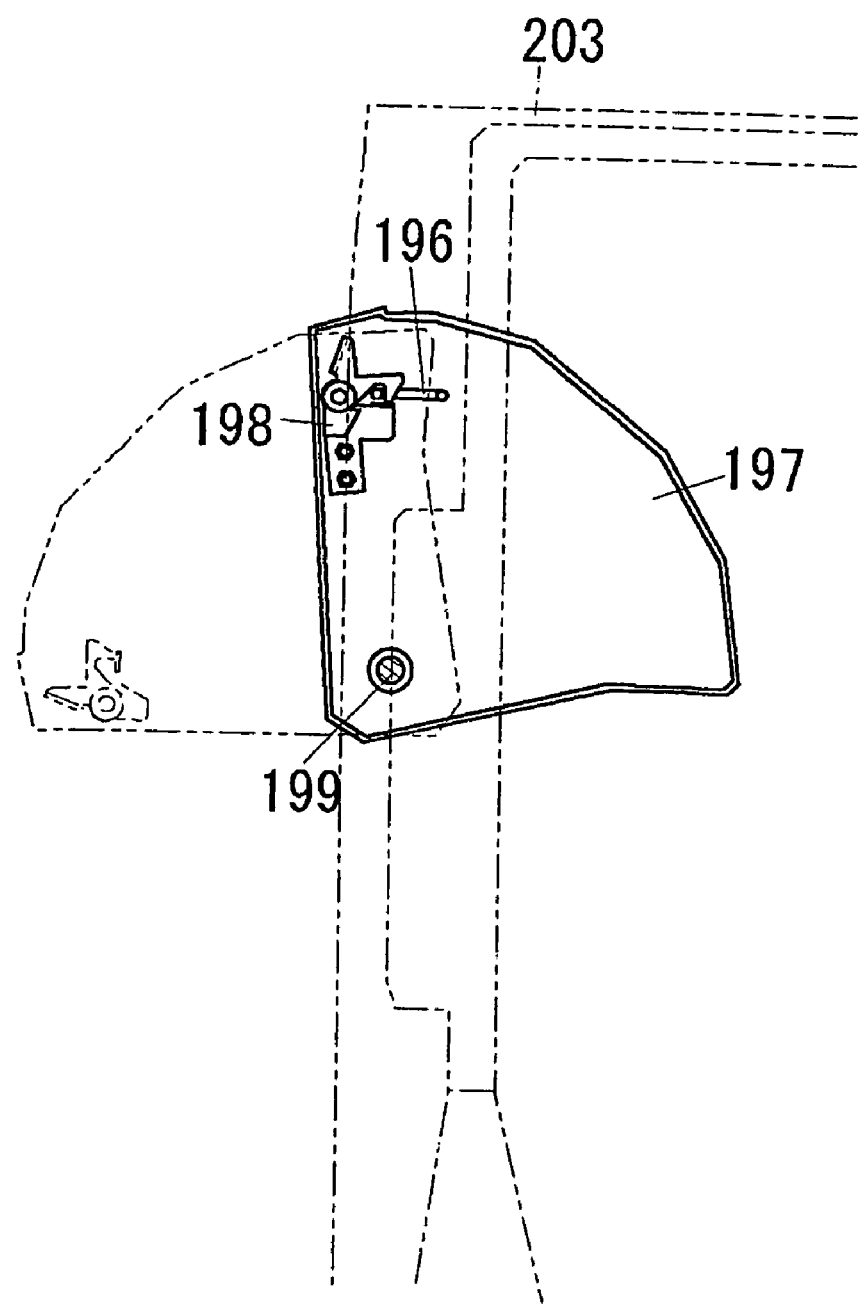
FIG. 24 is a bottom view showing a construction of the auxiliary base.

Accordingly, as shown in FIG. 23, when an oil-feeding tank 200 is placed on the auxiliary base 197, an opening of the oil-feeding tank 200 is positioned in the vicinity of the refueling opening 201 so as to be easily inserted into the refueling opening 201.

Figure 25:
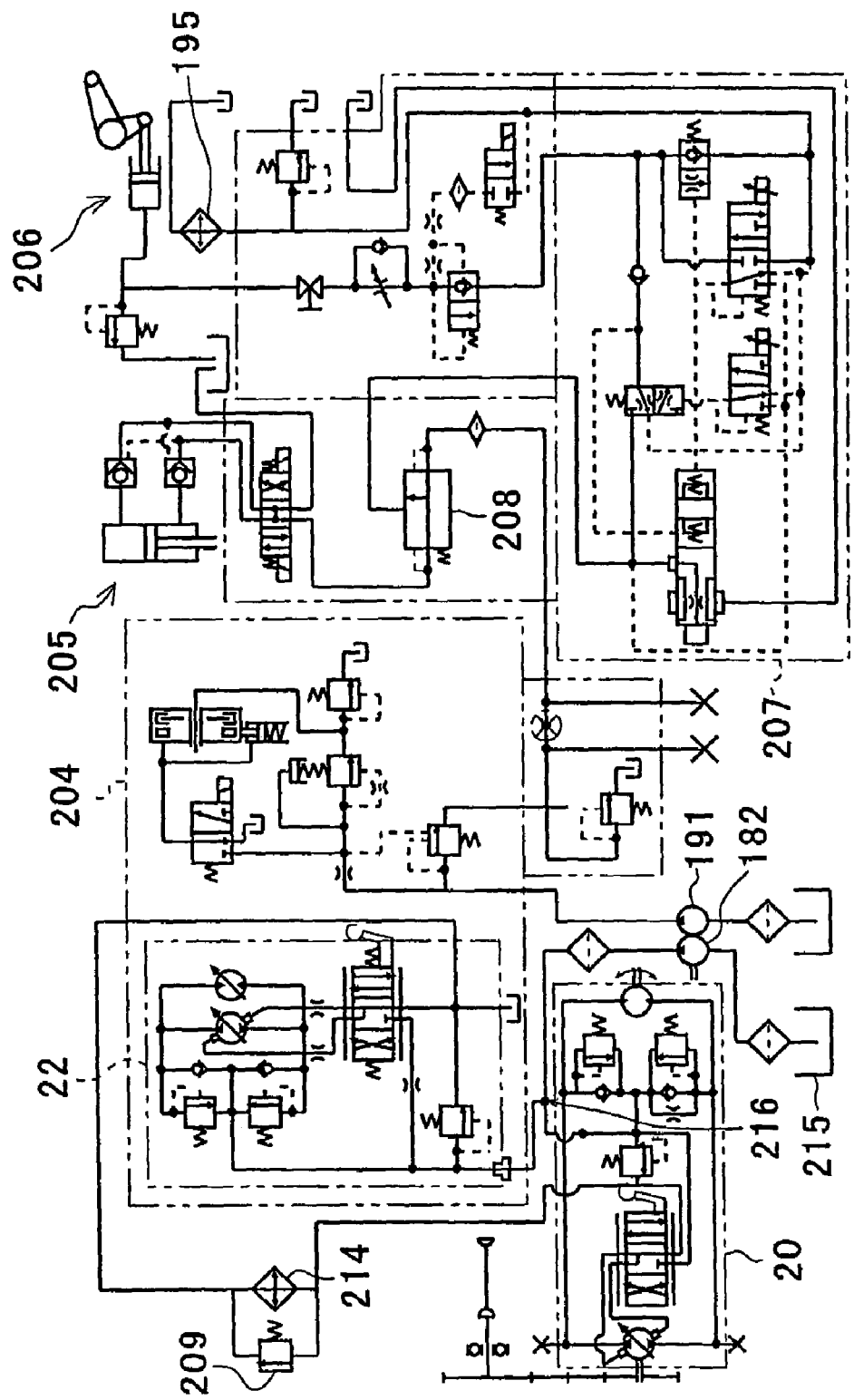
FIG. 25 is a drawing showing a construction of a hydraulic circuit.
Figure 26:
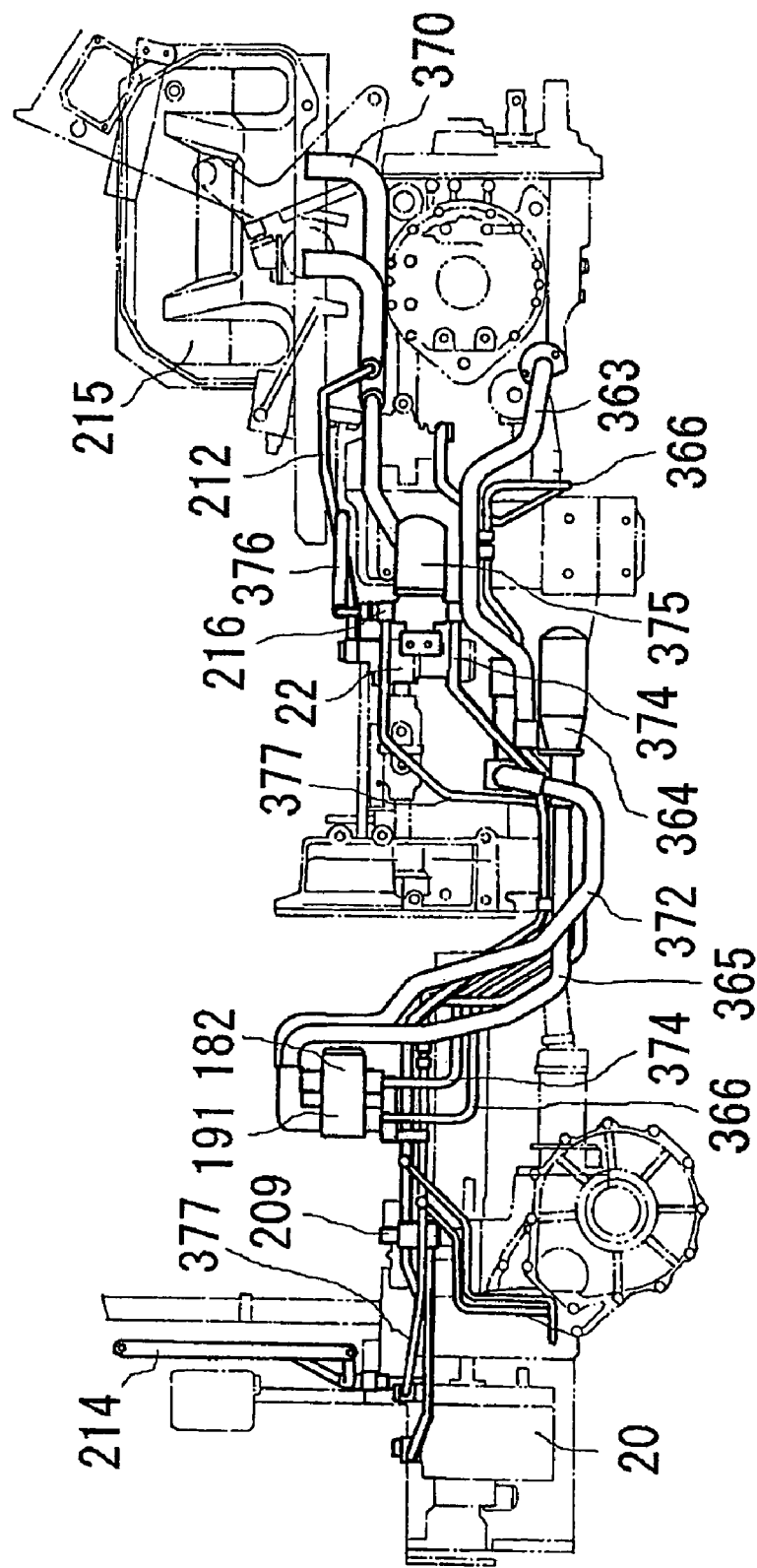
FIG. 26 is a side view showing a construction of hydraulic piping.
Figure 27:
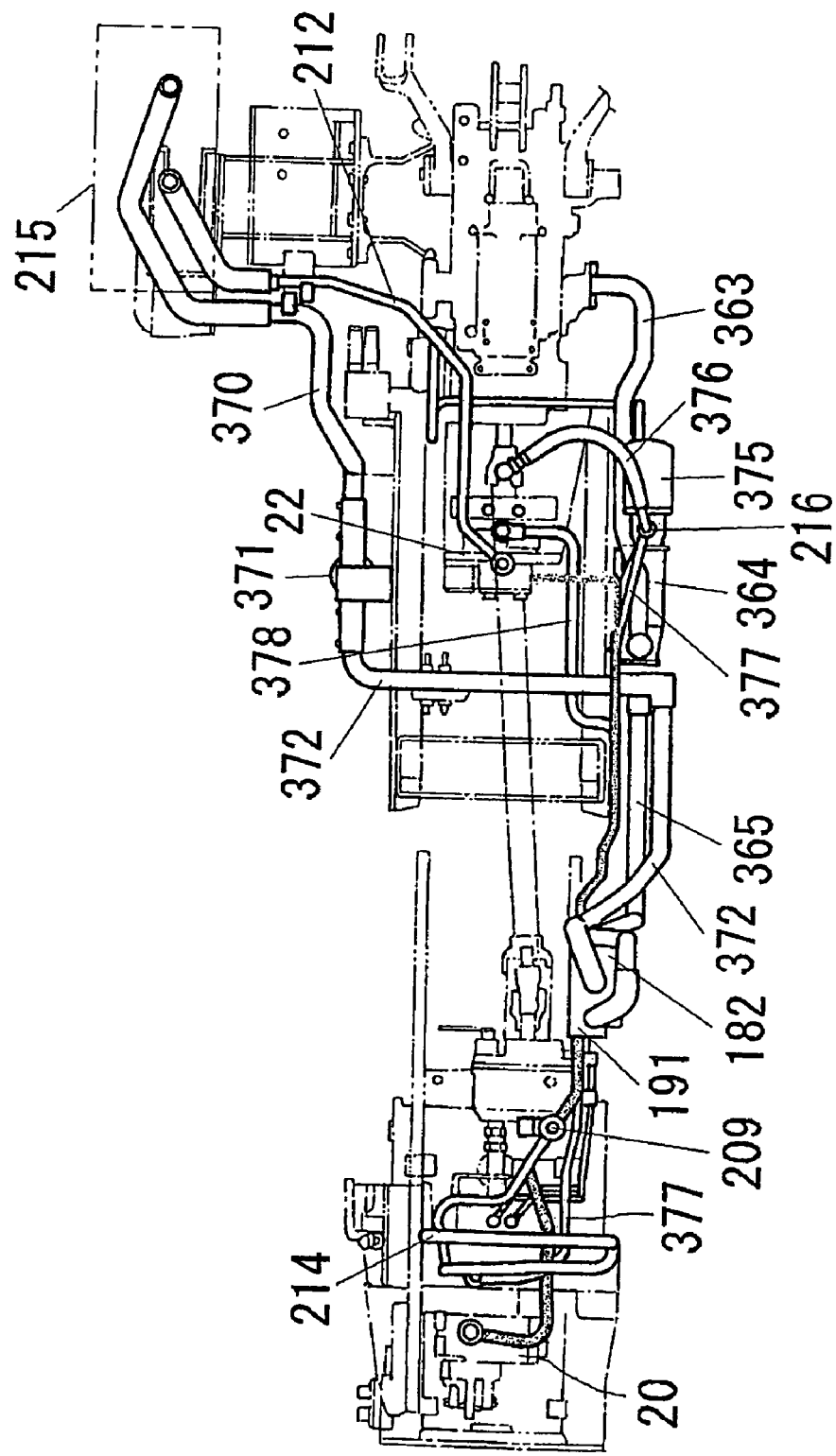
FIG. 27 is a plan view showing the construction of the hydraulic piping.
Figure 28:
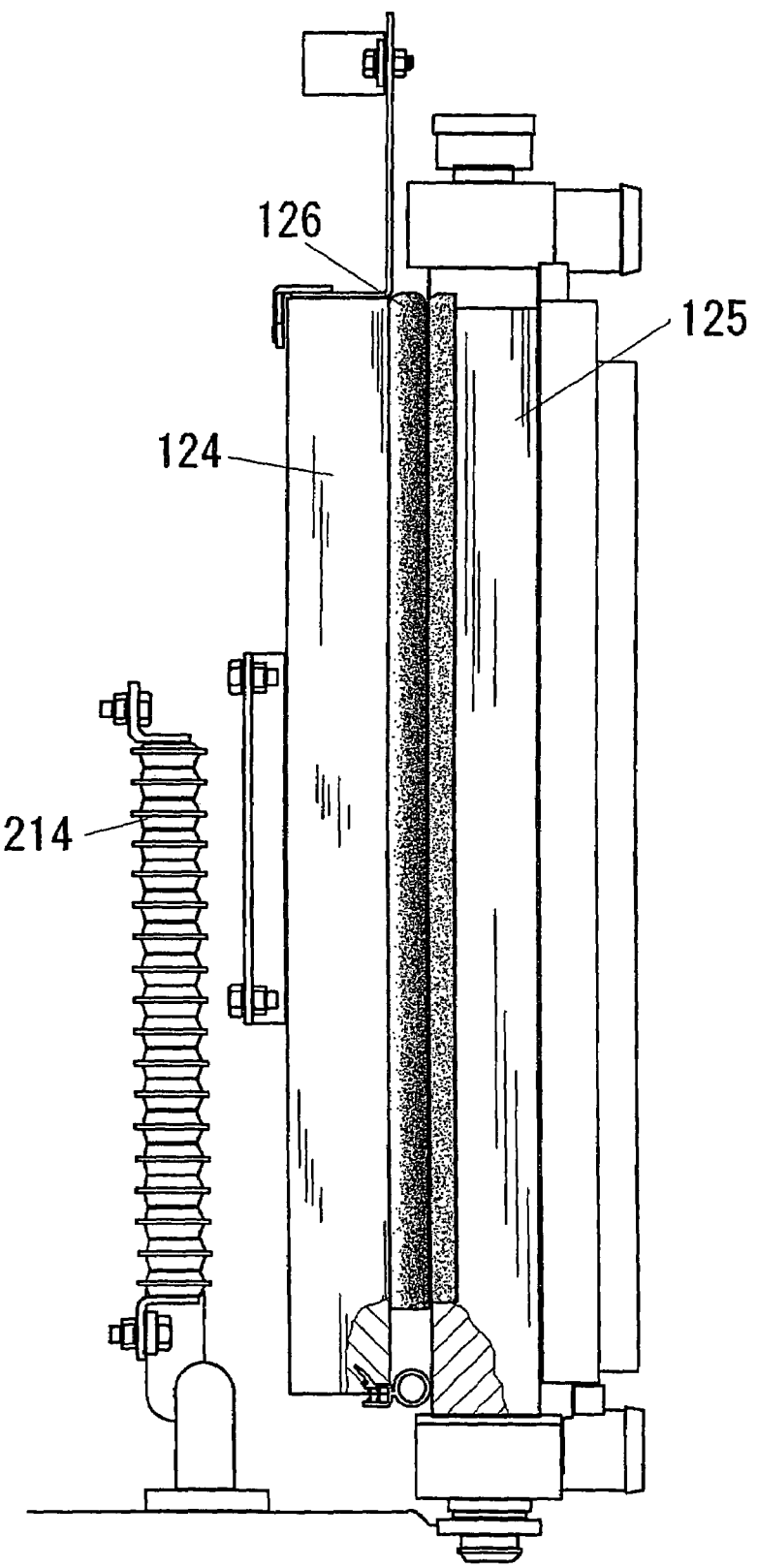
FIG. 28 is a side view showing an arrangement of a capacitor for air-conditioner and a radiator.
Figure 29:
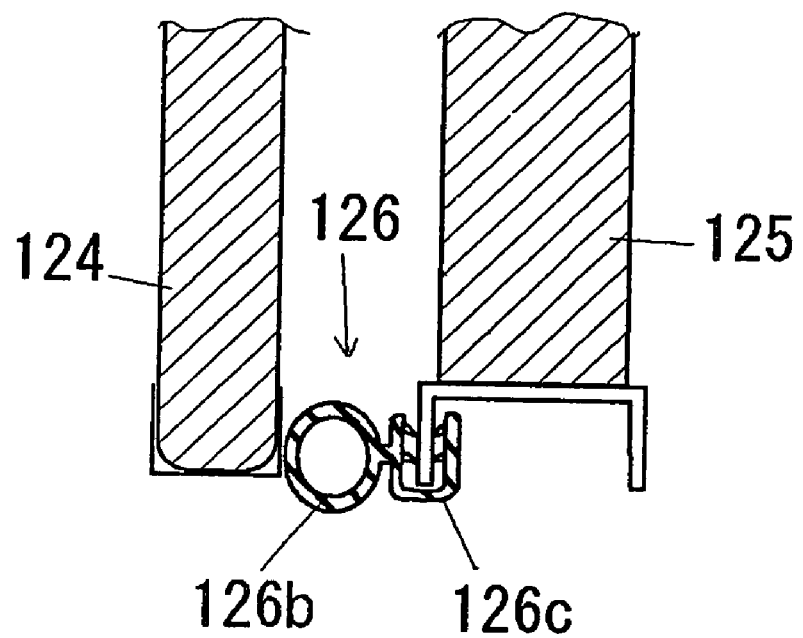
FIG. 29 is a sectional plan view showing a construction of a seal member.
Figure 30:
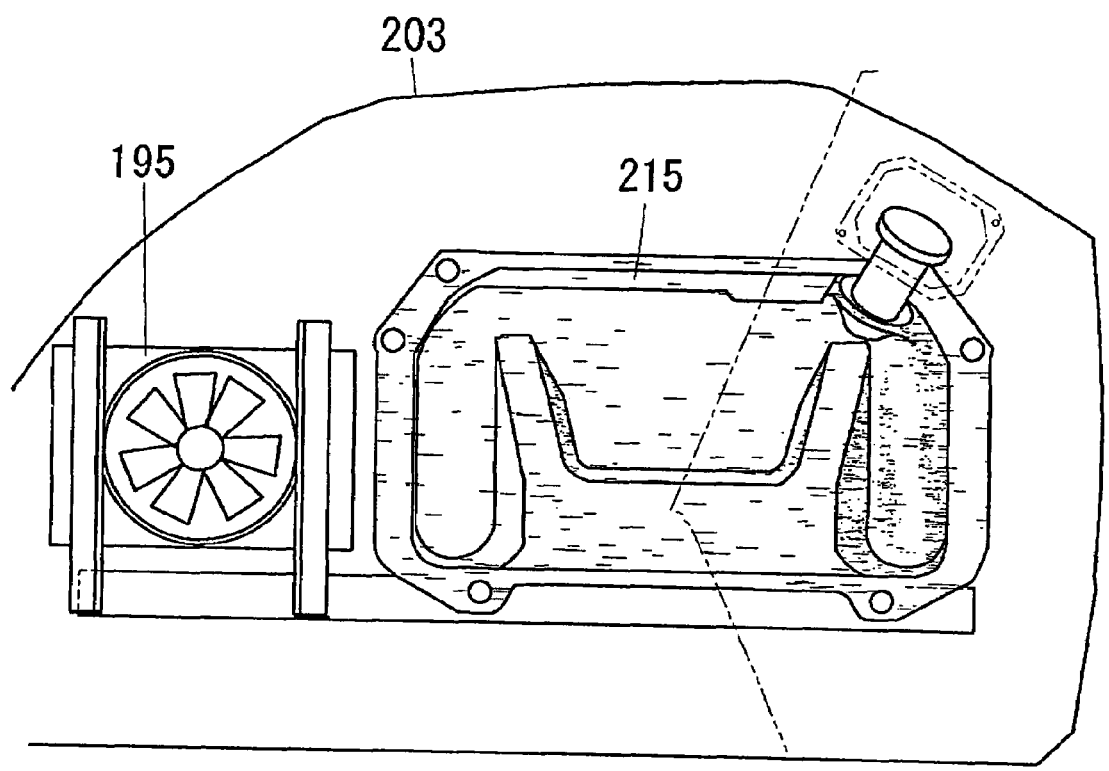
FIG. 30 is a side view showing an arrangement of an oil cooler and the pressure oil tank.

Next, description will be given of the construction of hydraulic circuits of the crawler tractor in accordance with FIGS. 25 to 27.

Hydraulic circuits of the crawler tractor are broadly divided into two circuits. One is a circuit for driving the transmission and the working machine, and controlling the attitude of the crawler tractor. The other is a circuit for actuating the HST for turning 20 and the HST for travelling 22. Hydraulic pumps 182 and 191 for supplying pressure oil (lubricating oil) to these hydraulic circuits are actuated by driving force of the engine 3.

Pressure oil (lubricating oil) drawn up by the hydraulic pump 191 from the bottom of the rear transmission casing 5 through a piping 363, a filter 364 and a piping 365 is supplied to a clutch actuation circuit of a transmission 204 in the rear transmission casing 5 through a piping 366, and further supplied to a flow dividing valve 208. A level control mechanism 205 and a lift control mechanism 207 are connected to the flow dividing valve 208 so as to be supplied with pressure oil therefrom. A lift actuating mechanism 206 and the oil cooler 195 are connected to the downstream of the lift control mechanism 207 so as to be supplied with pressure oil. Pressure oil cooled by the oil cooler 195 is returned to the rear transmission casing 5.

On the other hand, pressure oil drawn up by the hydraulic pump 182 from the pressure oil tank 215 through a piping 370, a filter 371 and a piping 372 is branched at a branch point 216 through a piping 374 and a filter 375. A part of the pressure oil is supplied from the branch point 216 to the HST for traveling 22 through a piping 376. Return pressure oil of the HST for traveling 22 is returned to the pressure oil tank 215 through a common returning piping 212.

The remainder of the pressure oil is supplied from the branch point 216 to the HST for turning 20 through a piping 377. Return pressure oil of the HST for turning 20 is cooled by an oil cooler 214 provided in the front portion of the crawler tractor, and then is returned to the pressure oil tank 215 through a piping 378 and the common returning piping 212.

According to this construction, it is not necessary to provide separate oil coolers for cooling the HST for turning 20 and the HST for traveling 22, thereby reducing weight of the crawler tractor. Also, the oil passages is constructed so simply as to reduce cost of the crawler tractor.

A bypass switch 209 comprising relief valves and others is provided in a return pressure oil passage from the HST for turning 20 in parallel to the oil cooler 214.

The circuit through the bypass switch 209 bypasses the oil cooler 214. If the oil cooler 214 is clogged, the flux of pressure oil supplied to the HST for turning 20 is reduced so as to spoil a good performance of the crawler tractor in turning. Therefore, in the case that the oil cooler 214 is clogged or pressure oil have such low temperature as to require no further cooling, pressure oil is returned to the pressure oil tank 215 through the bypass circuit bypassing the oil cooler 214, thereby constantly keeping the good performance of the crawler tractor in turning.

Using the clogging oil cooler 214 for a long time is not desirable in the viewpoint of durability of the HST for turning 20 and the HST for traveling 22. Therefore, a sensor or the like is preferably provided to the bypass switch 209 so as to easily detect the condition of the bypass switch 209.

With regard to this embodiment, the oil cooler 214 is arranged in the front portion of the crawler tractor, and the oil cooler 195 is arranged in the rear fender 203 disposed in the rear portion of the crawler tractor, but the construction is in no way limited to this. They may be interchanged or changed in location in consideration of heat radiated therefrom when they are cooled.

A construction in the vicinity of the oil cooler 214 of this embodiment will be described in accordance with FIGS. 28 to 31.

A capacitor for air-conditioner 124 is disposed behind the oil cooler 214, and a radiator 125 is disposed behind the capacitor for air-conditioner 124.

A fan (not shown) is disposed behind the radiator 125 so as to take in air from the front and exhaust it to back.

A seal member 126 is equipped between the radiator 125 and the capacitor for air-conditioner 124. The seal member 126 is equipped on the circumferential portion of the radiator 125 and abuts against the circumferential portion of the capacitor for air-conditioner 124. Accordingly, the capacitor for air-conditioner 124 is sealed with the contact portion of the radiator 125 so as to prevent air between the radiator 125 and the capacitor for air-conditioner 124 from flowing out, so that quantity of air flowing into the capacitor for air-conditioner 124 is increased to enhance cooling efficiency of the capacitor for air-conditioner 124.

The seal member 126 comprises a tubular contact portion 126b and a sectionally C-like attached portion 126c. Accordingly, the contact portion 126b is easily deformable when pushed, and has high adherence. The seal member 126 may be made of elastic material such as gum so as to facilitate for attachment and detachment of the attached portion 126c. Easy removable weather strip may be used as the seal member 126.

As mentioned above, the seal member 126 enhances adherence of the radiator 125 with the capacitor for air-conditioner 124. The long-term used seal member 126 is easily detached so that dust may be easily cleared out therefrom. Accordingly, the maintainability is improved, overheat is prevented, and lives of the parts are prolonged.

Next, description will be given of arrangement of the oil cooler 195 of this embodiment.

As mentioned above, the oil cooler 195 is disposed in front of the pressure oil tank 215, in the rear fender 203. Since the lower portion of the rear fender 203 is opened, airflow is generated in the rear fender 203 by the movement of the crawler so as to prevent the temperature therein from easily arising. Since the oil cooler 195 is disposed in the lower portion of the rear fender 203, air is supplied from the outside to the oil cooler 195. The pressure oil tank 215 arranged in front of the oil cooler 195 protects the oil cooler 195 from splashes of mud.

An electric fan attached to the oil cooler 195 takes in the air from outside of the vehicle body, and exhausts it into the inside of the vehicle body, thereby preventing noise of the fan from easily leaking out.

A switch is disposed in the transmission casing so as to control the fan. The switch is turned on when oil temperature rises, and turned off when oil temperature falls.

Since the oil cooler 195 is disposed near the rear transmission casing 5 so as to facilitate for shortening pipings thereto and for its compact design.

The oil cooler 195 arranged as mentioned above has enhanced cooling effect so as to improve durability of the fan of the oil cooler 195 and save energy required for its cooling. The rear fender 203 covering the oil cooler 195 and the pressure oil tank 215 keeps good appearance and reduces noise.

Figure 31:
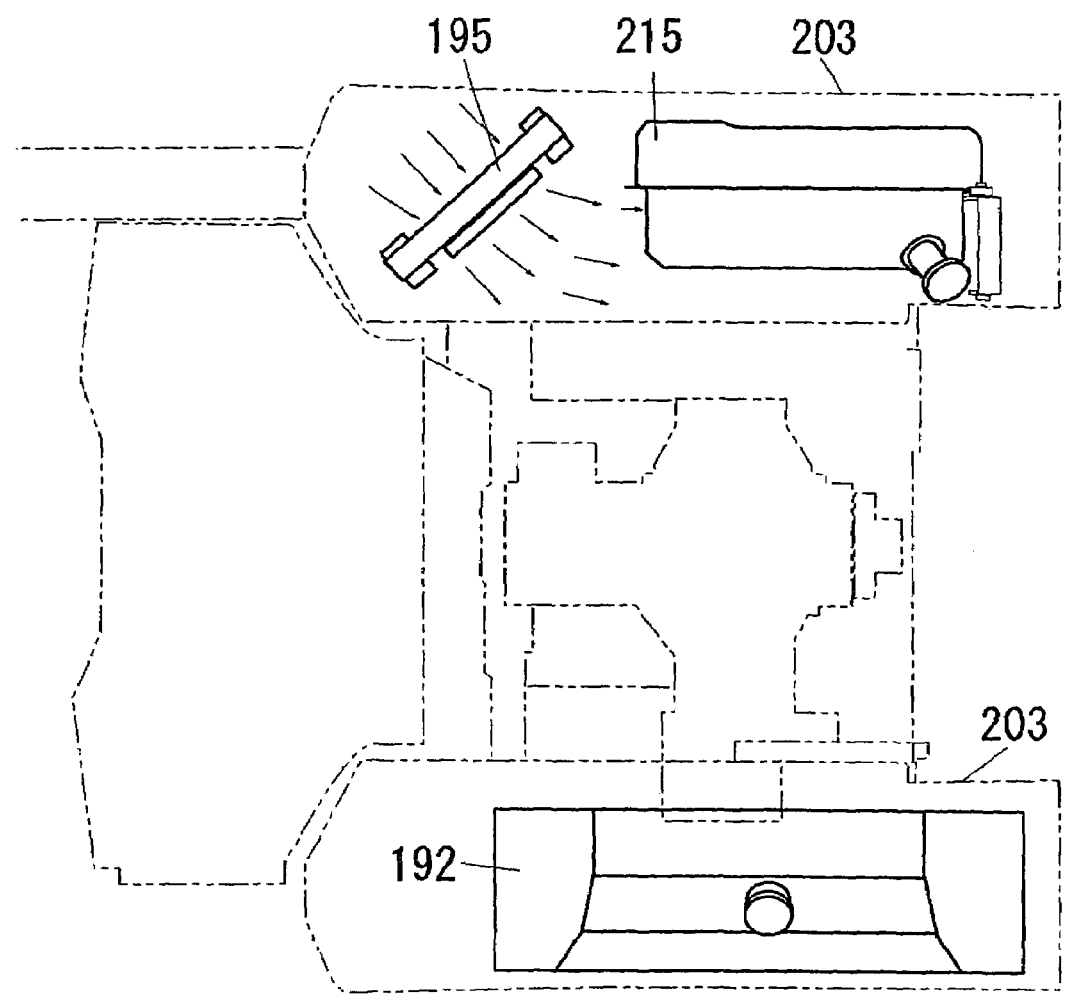
FIG. 31 is a plan view showing another embodiment about arrangement of the oil cooler.

A sufficiently large space is ensured in the rear fender 203 so as to enhance the flexibility of arrangement of the oil cooler 195. Accordingly, as shown in FIG. 31, the air-exhaust side of the oil cooler 195 is directed to the pressure oil tank 215.

By directing the air exhausted from the oil cooler 195 to the pressure oil tank 215, the pressure oil tank 215 is cooled by the exhausted air.

Figure 32:
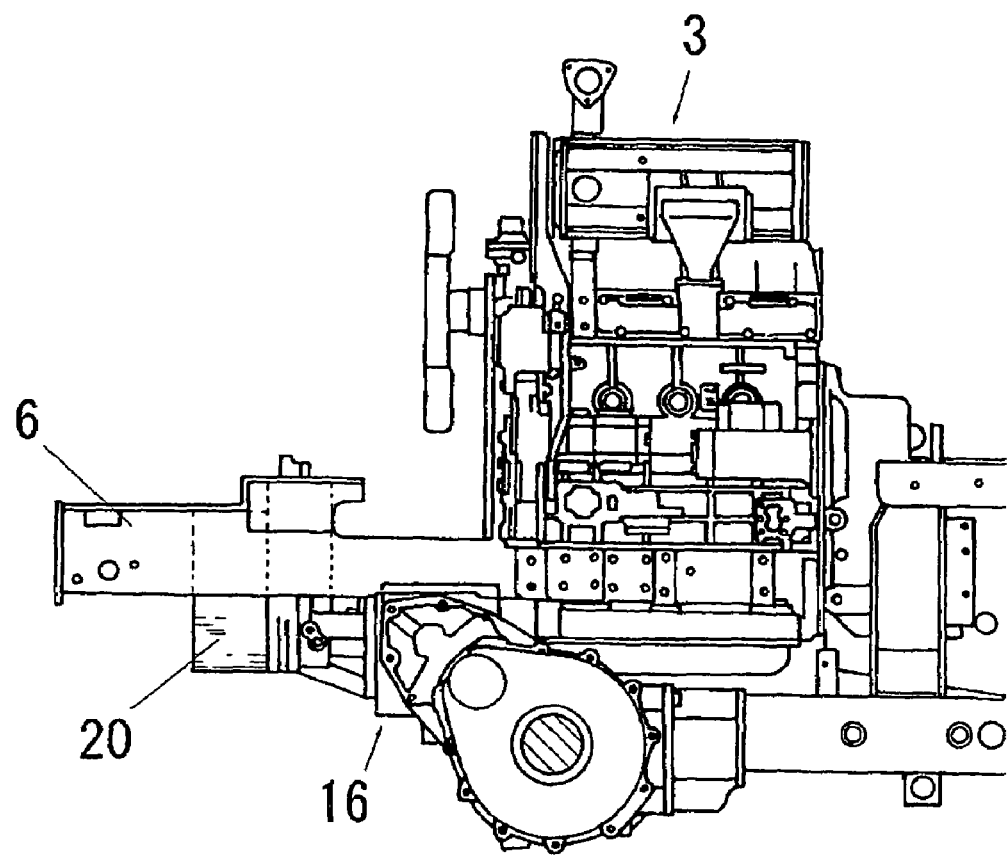
FIG. 32 is a side view showing a construction of a front part of the crawler tractor.
Figure 33:
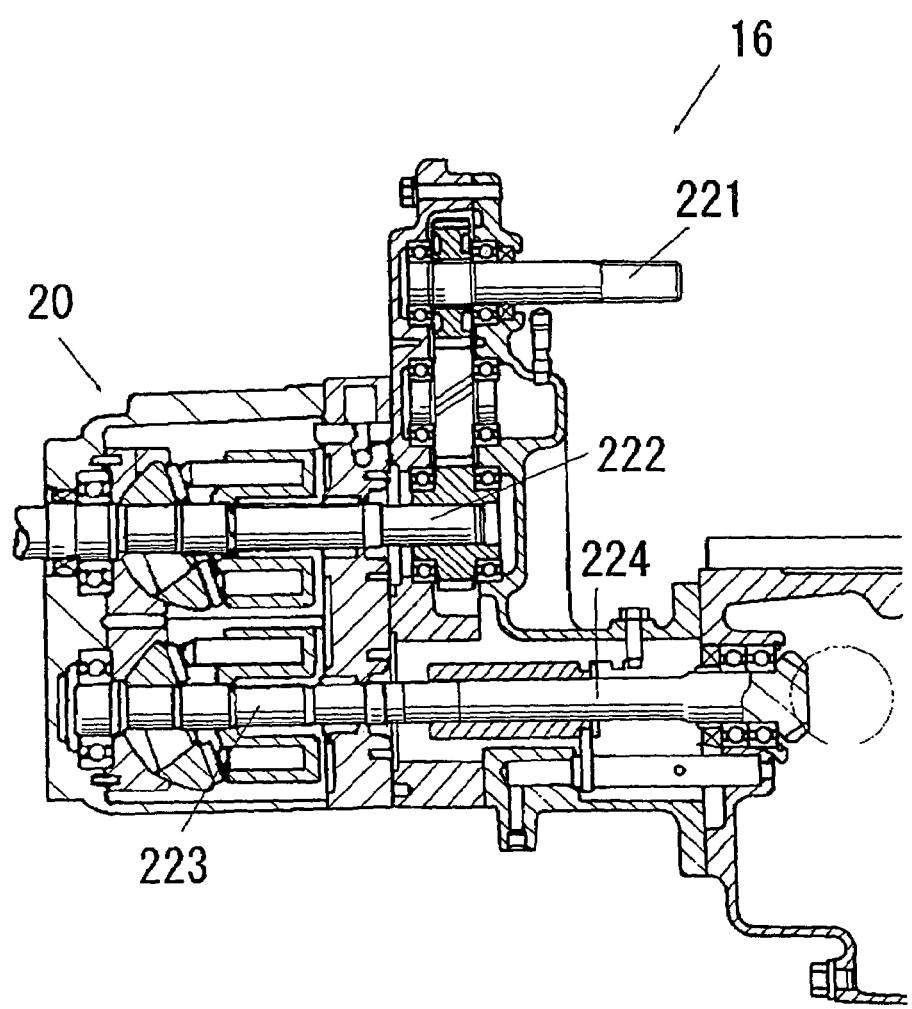
FIG. 33 is a sectional side view showing a construction of a HST for turning.
Figure 34:
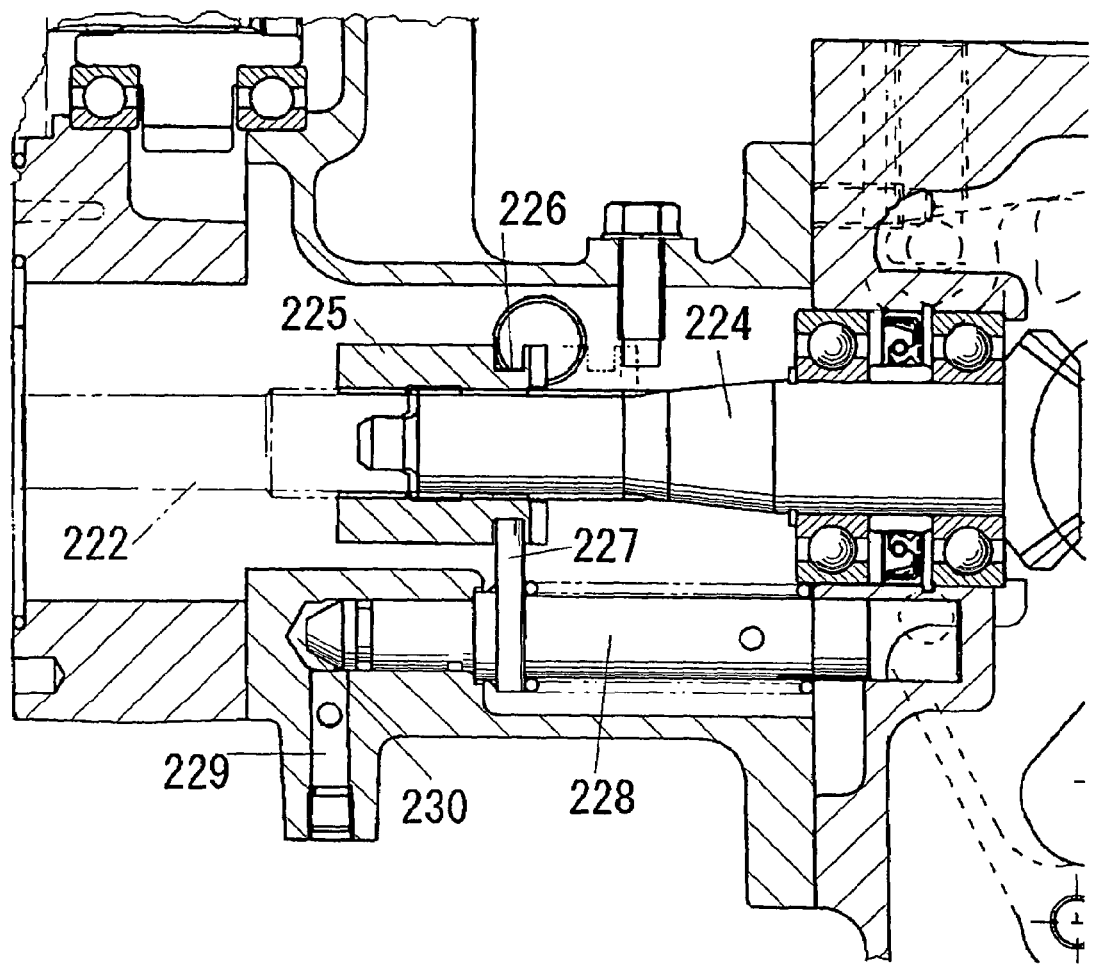
FIG. 34 is a sectional side view showing a construction between the HST for turning and a differential mechanism.

Description will now be given on the connection construction between the HST for turning and the front transmission casing according to FIGS. 32 to 34.

The engine 3 is laid on the main frames 6. An input shaft 221 of the front transmission casing 16 is disposed in front of the engine 3. The HST for turning 20 is disposed in front of the front transmission casing 16.

Driving force of the engine 3 is inputted into the front transmission casing 16 through the input shaft 221, and transferred to the differential gear mechanism in the front transmission casing 16 again through the HST for turning 20.

The driving force inputted to the input shaft 221 is transmitted to an input shaft 222 of the HST for turning 20 through the transmission in the front transmission casing 16. The input shaft 222 drives a hydraulic pump of the HST for turning 20, and an output shaft 223 is driven by a hydraulic motor of the HST for turning 20.

The output shaft 223 of the HST for turning 20 is connected to the differential transmission shaft 224, which transfers driving force to the left and right planetary gear mechanisms 340L and 340R constituting the differential gear unit in the front transmission casing 16.

Spline grooves are formed on the rear end of the output shaft 223 and the front end of the differential transmission shaft 224, so that a boss 225 may be fitted on the output shaft 223 and the differential transmission shaft 224.

The boss 225 is slidable longitudinally on the rear end of the output shaft 223 and the front end of the differential transmission shaft 224. In the case that the boss 225 is engaged with both the output shaft 223 and the differential transmission shaft 224, driving force of the output shaft 223 is transferred to the differential transmission shaft 224. In the state that the boss 225 is engaged with only the differential transmission shaft 224, output of the output shaft 223 is not transferred to the differential transmission shaft 224.

On the rear peripheral portion of the boss 225 is formed a recess 226. A fork 227 fixed to a piston 228 is engaged at one end thereof in the recess 226.

The piston 228 is disposed in the longitudinal direction of the vehicle body, and inserted at one end thereof into a cylinder part 230 provided in the front transmission casing 16. A spring is engaged with the piston 228, and abuts against the fork 227 and the front transmission casing 16 so as to bias the piston 228 forward.

The piston 228 is inserted at a front end thereof into the cylinder part 230, to which an oil passage 229 is connected, so that charge pressure is transferred to the cylinder part 230 through the oil passage 229.

When oil pressure in the cylinder part 230 increases and the force applied to the piston 228 becomes larger than the bias force of the spring, the piston is slid backward. Then, the fork 227 connected to the piston 228 makes the boss 225 slide backward, thereby shutting off the transfer of driving force from the output shaft 223 to the differential transmission shaft 224.

When oil pressure in the cylinder part 230 decreases, the fork 227 connected to the piston 228 makes the boss 225 slide forward, thereby transferring driving force from the output shaft 223 to the differential transmission shaft 224.

Since the clutch mechanism which performs on-off operation of transfer of driving force is provided between the HST for turning 20 and the actuation mechanism, and the fork connected to the clutch is slid by oil pressure, the on-off operation of driving force of the HST for turning 20 can be performed with simple construction. Furthermore, since the fork 227 is slid by the piston using charge pressure, the slide mechanism for the fork can be constructed easily. In addition, charge pressure can be used easily by connecting the hydraulic passage 229 to a hydraulic circuit supplied with charge pressure.

Next, description will be given of the construction for driving a front PTO shaft.

Figure 35:
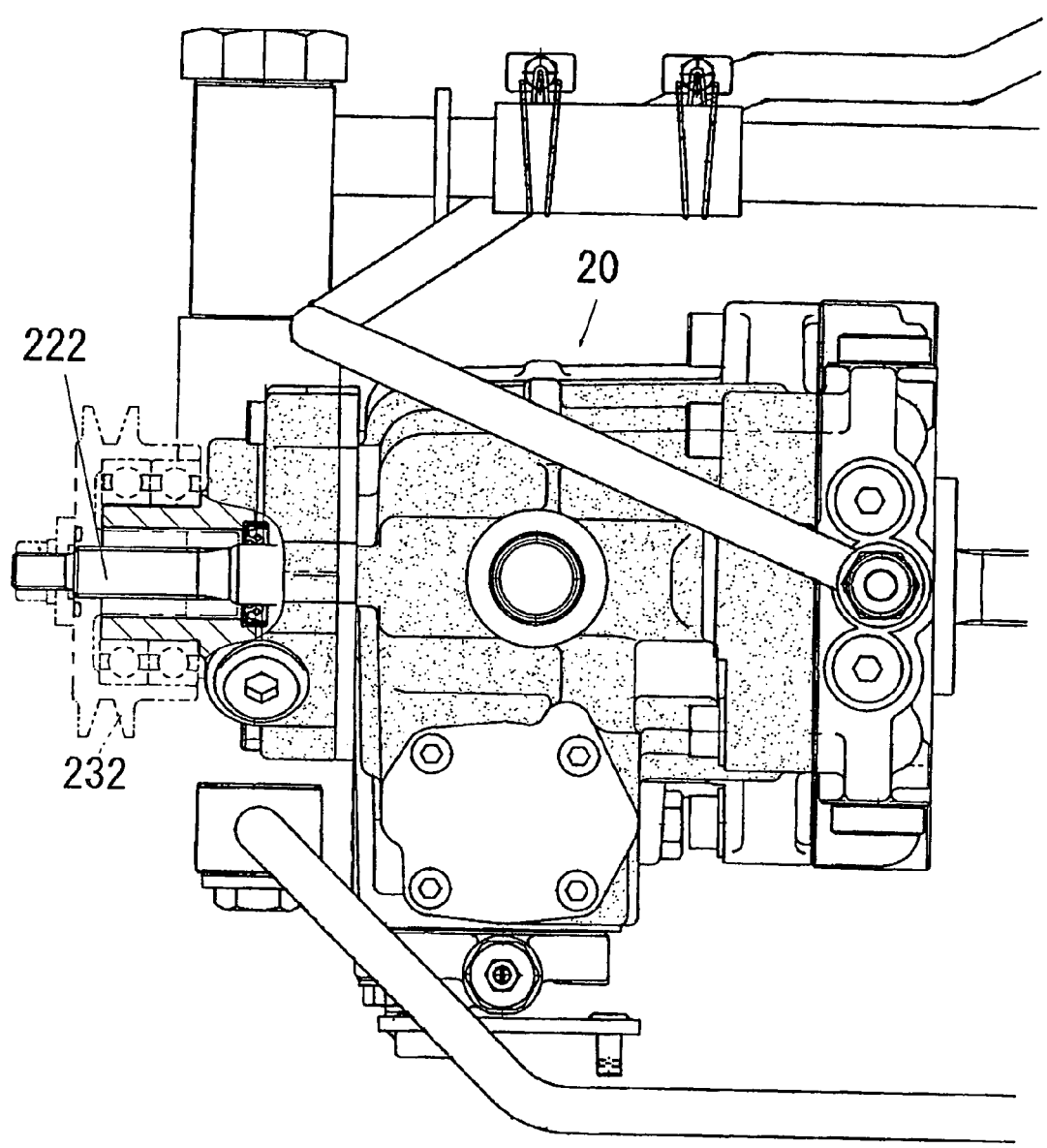
FIG. 35 is a plan view showing a construction of the HST for turning.
Figure 36:
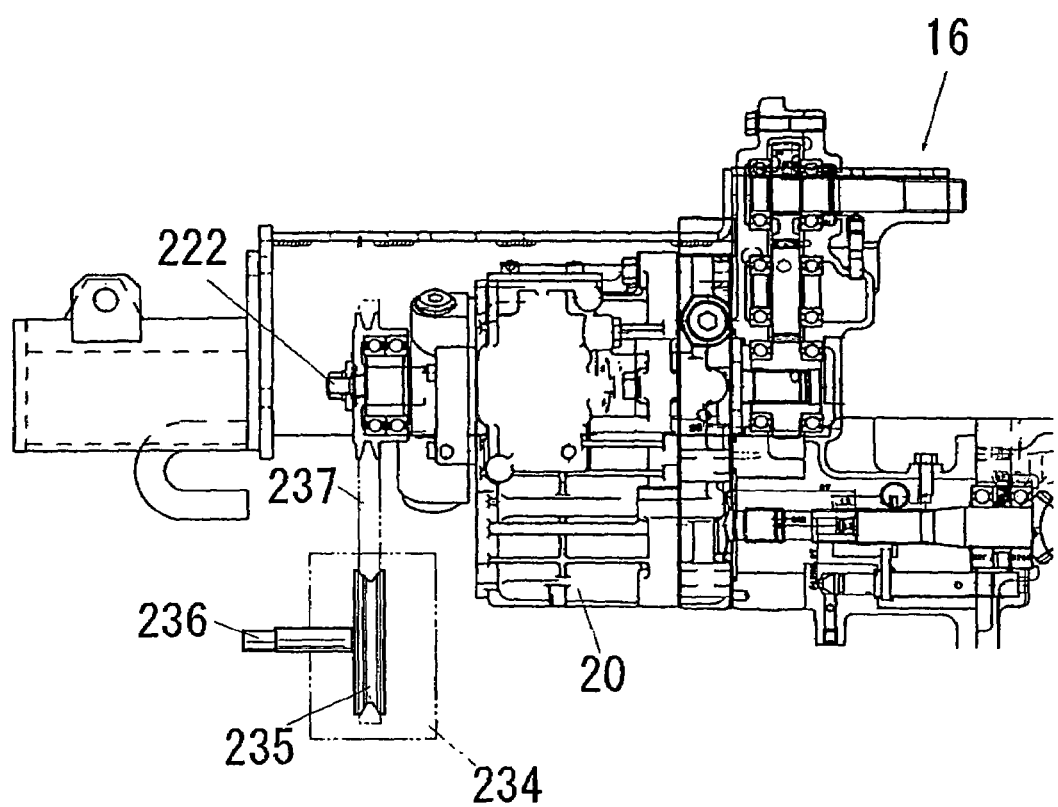
FIG. 36 is a side view showing a construction of a front PTO section.

As shown in FIGS. 35 and 36, the input shaft 222 of the HST for turning 20 is inserted into a pulley 232 so that the pulley 232 is rotated integrally with the input shaft 222. A casing of the HST for turning 20 is projected in the extension direction of the input shaft 222 around the input shaft 222. The pulley 232 is fitted to the projecting part of the casing of the HST for turning 20 through a bearing. Namely, the pulley 232 is supported by the casing of the HST for turning 20 so as not to stress the input shaft 222.

A belt 237 is looped over the pulley 232 so as to transfer driving force of the pulley 232 to a front PTO mechanism 234. In the front PTO mechanism 234, the belt 237 is looped over a pulley 235. The pulley 235 is connected to a front PTO shaft 236 so as to construct the front PTO shaft 236 to be rotated integrally with the pulley 235. The construction for transferring driving force to the front PTO mechanism 234 through the belt 237 is simple, and flexibility of its design is improved.

The front PTO mechanism 234 is arranged under the input shaft 222 so as to bypass the frames 6, thereby being connected to the PTO shaft 236.

In this regard, the input shaft 222 of the HST for turning 20 projects so as to be attached to the pulley 232, thereby taking off power for driving a working machine equipped on a front portion of the working vehicle.

According to the above-mentioned construction, a PTO section with a simple construction is provided at the front portion of the vehicle body, thereby facilitating maintainability and assembly thereof.

Next, description will be given of operative construction for turning, main speed change, and brake.

Figure 37:
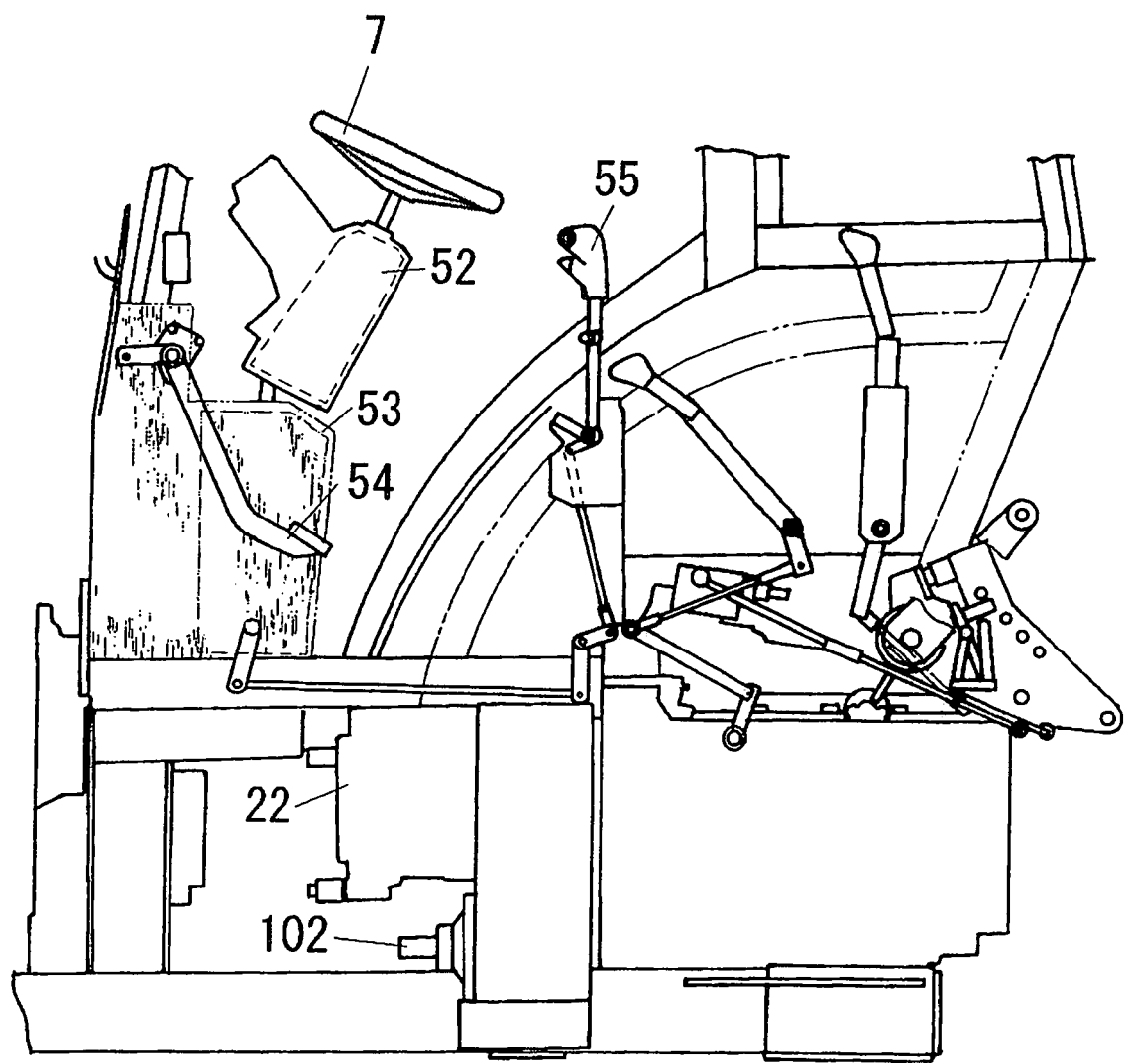
FIG. 37 is a side view showing control devices of the crawler tractor.

Referring to FIG. 37, the steering wheel 7 is connected to a steering box 52, so that operation of the steering wheel 7 is transferred to a conic linkage 53 through the steering box 52. Also, a main speed change lever 55 is connected to the conic linkage 53 through another linkage. A brake pedal 54 is disposed in the vicinity of the conic linkage 53.

Operation of the steering wheel 7 and operation of the main speed change lever 55 are inputted into the conic linkage 53.

In the conic linkage 53, joint portions are moved along a bottom surface and side surfaces of conic shapes.

A rod for straight traveling and a rod for turning are located at one ends thereof to serve as respective peaks of two large and small conic shapes while they are located at the other ends thereof on the common bottom circle of the conic shapes with the phase difference of 90 degrees. Therefore, the peaks of the conic shapes for straight traveling and for turning are moved in association with location of arms for operating the HST for traveling 22 and the HST for turning 20.

It is constructed so that the rotational angle of the main speed change lever 55 is proportional to the inclination of the bottom surface of the conic shapes and the rotational angle of the steering wheel 7 is proportional to the rotational angle of the bottom surface of the conic shapes.

In a stationary state, even if the steering wheel 7 is rotated left or right, constant distances from the peaks to the bottom circle of the conic shapes are kept so as to prevent the operation arms of the HST for traveling 22 and the HST for turning 20 from moving. Accordingly, the hydraulic motors of the HST for traveling 22 and the HST for turning 20 are not driven, so that the vehicle remains stationary.

Next, when the main speed change lever 55 is pushed down to its advancing direction, the operation arm of the HST for traveling is rotated to its advancing side. However, since the end of the rod for turning is located on the rotational center line of the bottom surface of the conic shape, the operation arm of the HST for turning 20 remains stationary regardless of the inclination of the bottom surface, whereby the vehicle travels straight.

If the steering wheel 7 is turned from this state, the operation arm of the HST for traveling 22 is moved to its slowing down direction, and the operation arm of the HST for turning 20 is moved. Namely, as the steering wheel 7 is turned, the crawler tractor turns while being automatically decelerated.

In the backing state, when the steering wheel 7 is turned, the operation arm of the HST for turning 20 is moved to the direction opposite to that in advancing. The operation of the HST for turning 20 is reversed depending on whether it is done in advancing or backing, thereby canceling the reverse steering phenomenon.

As mentioned above, operation of the steering wheel 7 and operation of the main speed change lever 55 are linked mutually by the conic linkage 53. In this embodiment, furthermore, operation of the brake pedal 54 is linked with operation of the main speed change lever 55 or rotation of the operation arm of the HST for traveling 22.

Figure 38:
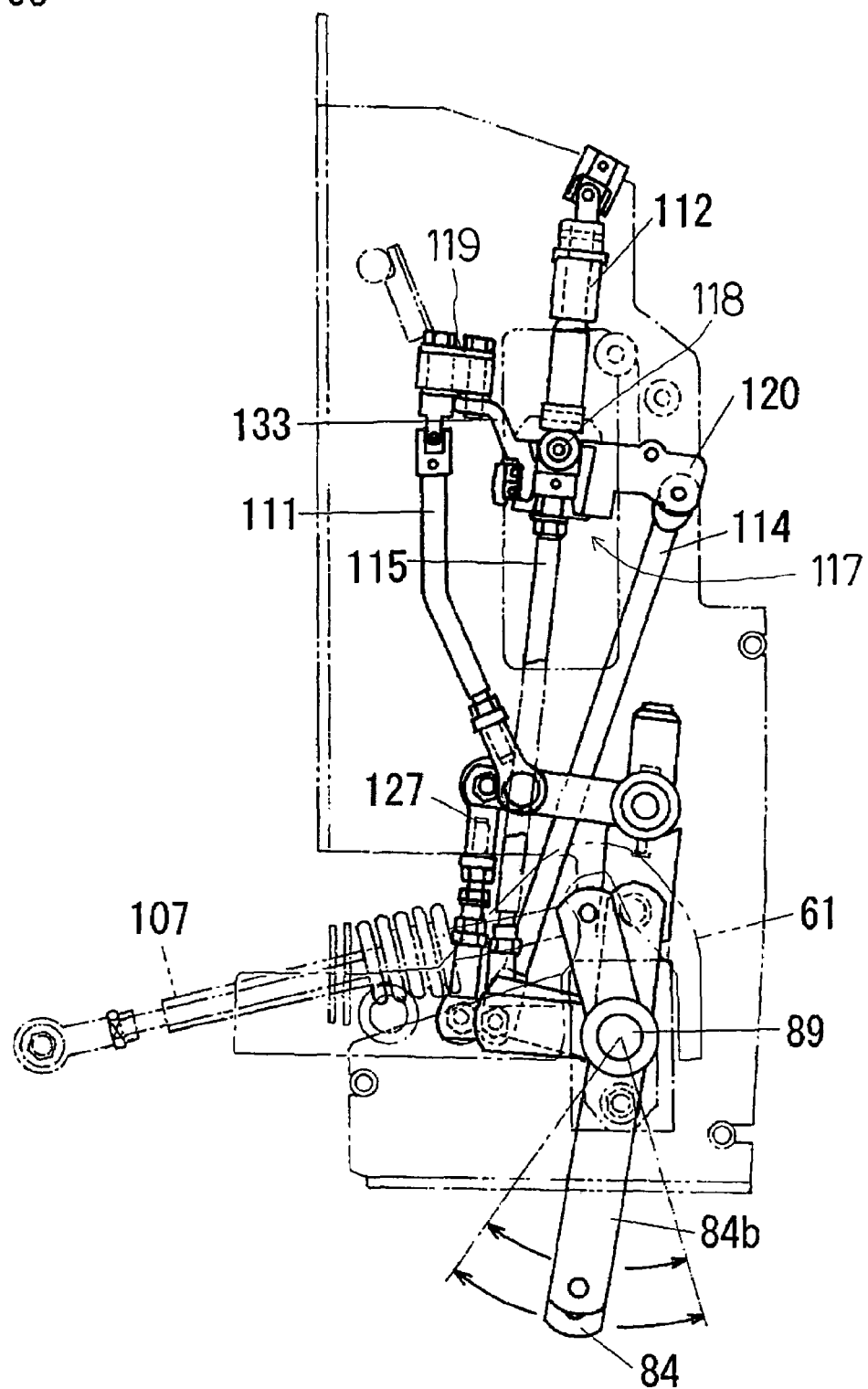
FIG. 38 is a side view showing a construction of a conic linkage.

Description will now be given of the conic linkage 53 according to FIGS. 38 and 39.

A steering input shaft 112 is connected to the above-mentioned steering wheel 7 through a universal joint, so that the steering input shaft 112 is connected at a lower end thereof through the universal joint to a rocking member 117 of a converting mechanism for bringing the turning direction of the vehicle into correspondence to speed change in advancing and backing.

The rocking member 117 is formed in a substantially conic shape, and is supported at a middle portion thereof by a bracket provided on an end of a rocking shaft 118 through a bearing. The rocking member 117 is rotated around the steering input shaft 112 and tilted around the rocking shaft 118 in connection with the rotation of the above-mentioned steering wheel 7. The rocking shaft 118 is rotatably supported by an inner surface of a column through a bearing so as to arrange the axis of the rocking shaft 118 laterally horizontally.

An arm part 133 is extended laterally from the rocking member 117 so as to be connected at an end thereof to a connection member 119. A steering link 115 is connected to one end of the connection member 119 through a universal joint or the like, and a traveling link 111 is connected to the other end of the connection member 119 through a joint.

When the steering wheel 7 is positioned in its straight traveling position, the joint for connecting the steering link 115 with the connection member 119 is positioned on extension of the axial center of a bracket provided on an end of the above-mentioned rocking member 117. The rocking shaft 118 is arranged in the lateral direction to intersect extension of the above-mentioned axial center of the bracket when it is set in neutral.

Also, the steering link 115 is connected at a lower end thereof to an arm engaged with a shaft 89, so that, by rotating the arm, a rod 106 is operated so as to operate the speed change arm of the HST for turning 20.

The travel link 111 is connected to the other end of the connection member 119 disposed on the rocking member 117 through a joint. This joint is arranged in the position at an angle of 90 degrees from the above-mentioned joint connecting the steering link 115 with the connection member 119 with respect to the axial center of the bracket 147 on the end of the above-mentioned rocking member 117.

Then, the lower end of the travel link 111 is connected to an arm engaging at one end thereof with a shaft 116. A rod 127 is connected at one end thereof to an arm connected to the shaft 116, and at the other end thereof to one end of an arm fitted on the shaft 89.

The lower end of the above-mentioned steering link 115 and the lower end of the travel link 111 are arranged on extension of the axial center of the bracket 147 on the end of the rocking member 117.

An arm 120 is projected backward from the bracket 147 of the above-mentioned rocking shaft 118. A main speed change link 114 is connected at an upper end thereof to an end of the arm 120, and at a lower end thereof to the arm engaged on the shaft 89. Accordingly, the main speed change link 114 is connected to the HST for traveling 22.

Figure 40:
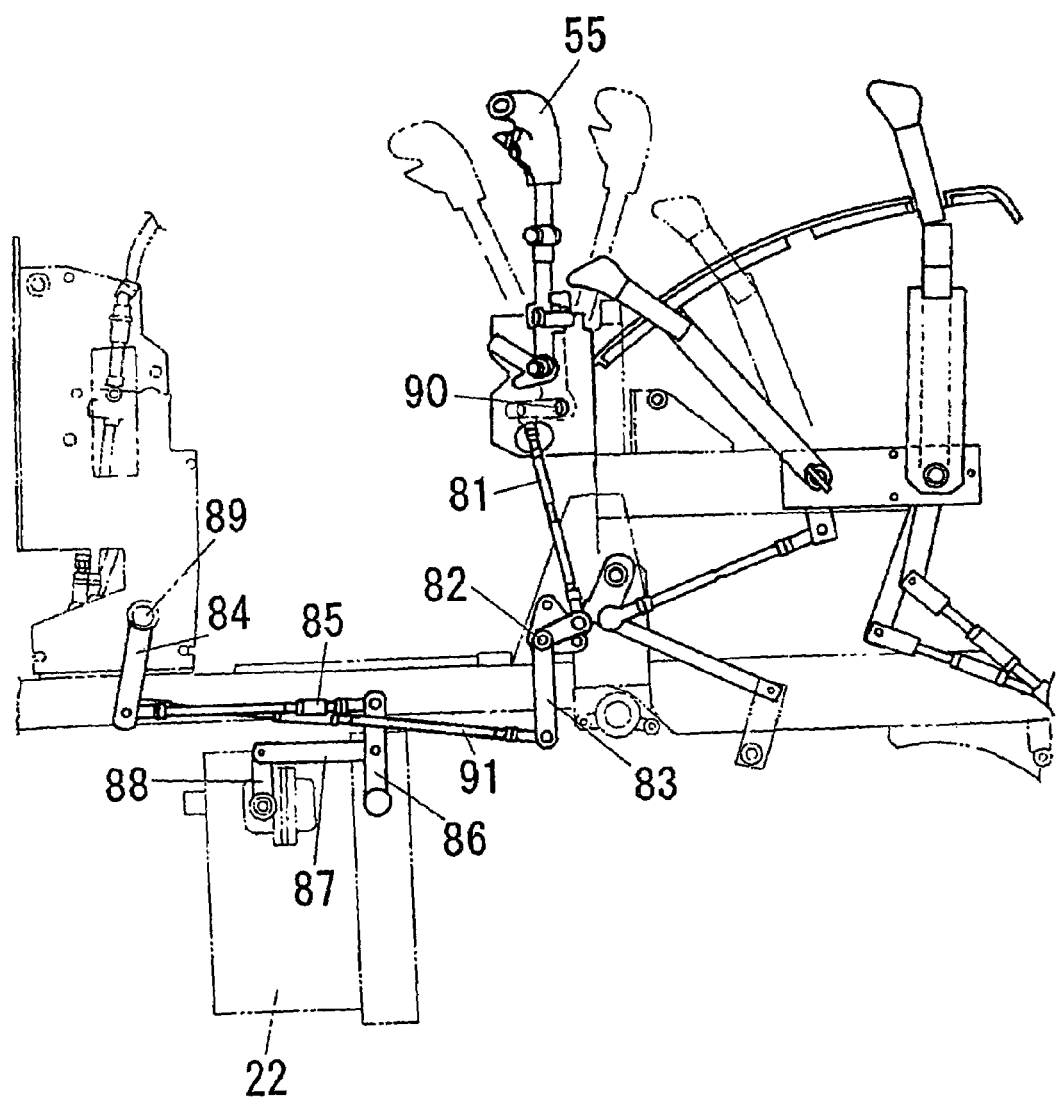
FIG. 40 is a side view showing an actuation construction of a main speed change lever.

Next, description will be given of a linkage of the main speed change lever 55 according to FIG. 40.

The main speed change lever 55 is rotatably pivotally provided at a lower end thereof on a pivot 90, and a forwardly projecting arm is fixed to the lower end of the main speed change lever 55. The arm is connected at an end thereof with an upper end of a rod 81. The rod 81 is connected at a lower end thereof with an arm rotatably supported on a shaft 82.

The arm supported by the shaft 82 is rotated integrally with an arm 83. Accordingly, by rotating the main speed lever 55, the arm 83 is rotated longitudinally.

A rod 91 is connected at a rear end thereof to the lower end of the arm 83, and at a front end thereof to an arm 84 fixed to the shaft 89. The arm 84 is rotatable longitudinally around the shaft 89, and is rotated integrally with an arm 84b whose one end is engaged on the shaft 89 similarly. An arm 85 is connected to the arm 84b. The shaft 89 is connected to the above-mentioned conic linkage 53.

The rod 85 connects an arm 86 with the arm 84b, so that the arm 86 is rotatably supported at the lower end thereof. A plate 87 is disposed longitudinally and is connected to the arm 86. An arm 88 of the HST 22 is connected to an end of the plate 87.

Due to such a linkage, the HST for traveling 22 is operated by operating the main speed change lever 55.

Next, description will be given of a linkage mechanism of the brake according to FIGS. 41 and 42.

The brake pedal 54 is connected to the above-mentioned brake mechanism 74 through a linkage so that the brake mechanism 74 is operated by the brake pedal 54, whereby a parking brake is actuated.

The brake pedal 54 is fixed on a pivot 62, and the pivot 62 is rotatably supported on an upper portion of a front column. The pivot 62 is constructed to be rotated together with the brake pedal 54 by depressing the brake pedal 54. Arms 63 and 64 are fixed to the pivot 62, and rods 65 and 66 are fixed to ends of the arms 63 and 64, respectively.

The rods 65 and 66 are disposed longitudinally, and a cam lever 61 is connected to the lower end of the rod 66. The cam lever 61 is rotatably supported on a pivot fixed on a side surface of a box which contains the conic linkage 53, and is rotated by vertical sliding of the rod 66.

An arm 68 is connected to a lower end of the above-mentioned rod 65, and the arm 68 is rotatably supported on a pivot 67. An arm 69 rotated integrally with the arm 68 is fixed on the arm 68, and a rod 70 is connected to an end of the arm 69.

The rod 70 is disposed in the longitudinal direction of the vehicle body, and an L-like shaped arm 72 rotatably supported on a pivot 71 is connected at one end thereof to the rear end of the rod 70.

A vertical rod 73 is connected to the other end of the L-like shaped arm 72, and an actuation arm 113 of the brake mechanism 74 is connected to the lower end of the rod 73.

Accordingly, by depressing the brake pedal 54, the actuation arm 113 is rotated, thereby actuating the brake mechanism 74.

At this time, since the brake mechanism 74 is located near the brake pedal 54 (namely, around the output shaft 102 projected from the rear transmission casing 5 under the cabin 9), the link for the brake is shortened in its full length. As a result, the linkage mechanism of the brake mechanism 74 may be designed simply, and operativity of the brake mechanism 74 is improved.

In addition, a parking brake lever 75 is provided on the inside of the brake pedal 54 so as to anchor the depressed brake pedal 54 (in the state for applying brake).

By depressing the brake pedal 54 and rotating the parking brake lever 75 upward, the brake pedal 54 is kept in its depressed state, thereby applying the parking brake. The parking brake is released by rotating the parking brake lever 75 downward.

Next, description will be given of the linkage between the brake pedal 54 and the main speed change lever 55 according to FIG. 40.

As mentioned above, the shaft 89 connected to the conic linkage 53 is rotated integrally with the main speed change lever 55. An arm 92 is fixed at one end thereof to the shaft 89. By rotating the main speed change lever 55, the arm 92 is rotated, and in connection with it, the main speed change lever 55 is rotated.

A projection 93 is provided on a tip of the arm 92 so as to project in the direction of the rotational axis of the arm 92.

The projection 93 is positioned on the inside of a cam part of the above-mentioned cam lever 61 so that the projection 93 may abut against the inner surface of the cam part of the cam lever 61 by rotating the cam lever 61.

By depressing the brake pedal 54, the cam lever 61 is rotated, and the arm 92 is returned to its predetermined position by the cam lever 61. The predetermined position where the arm 92 is returned by the cam lever 61 corresponds to the neutral position of the main speed change lever 55. Therefore, by depressing the brake pedal 54, the main speed change lever 55 is returned to its neutral position, and the brake mechanism 74 is actuated.

For stopping a crawler tractor without applying too much load onto driving parts and brakes, it is desirable that a main speed change lever is moved to its neutral position and then the brake is actuated. However, according to this embodiment, by only depressing the braking pedal 54, the HST for traveling 22 returns to its neutral position and the brake mechanism 74 is actuated.

Also, both braking force of the HST for traveling 22 (engine brake) and braking force of the brake mechanism 74 are available as braking force for stopping the vehicle. The brake mechanism 74 is so constructed as to apply braking force after the HST for traveling 22 is braked, thereby being smaller than the conventional brake mechanism.

Furthermore, by adjusting actuation timings of the two brakes, abrasion of the parking brake in the brake mechanism 74 can be prevented.

Figure 39:
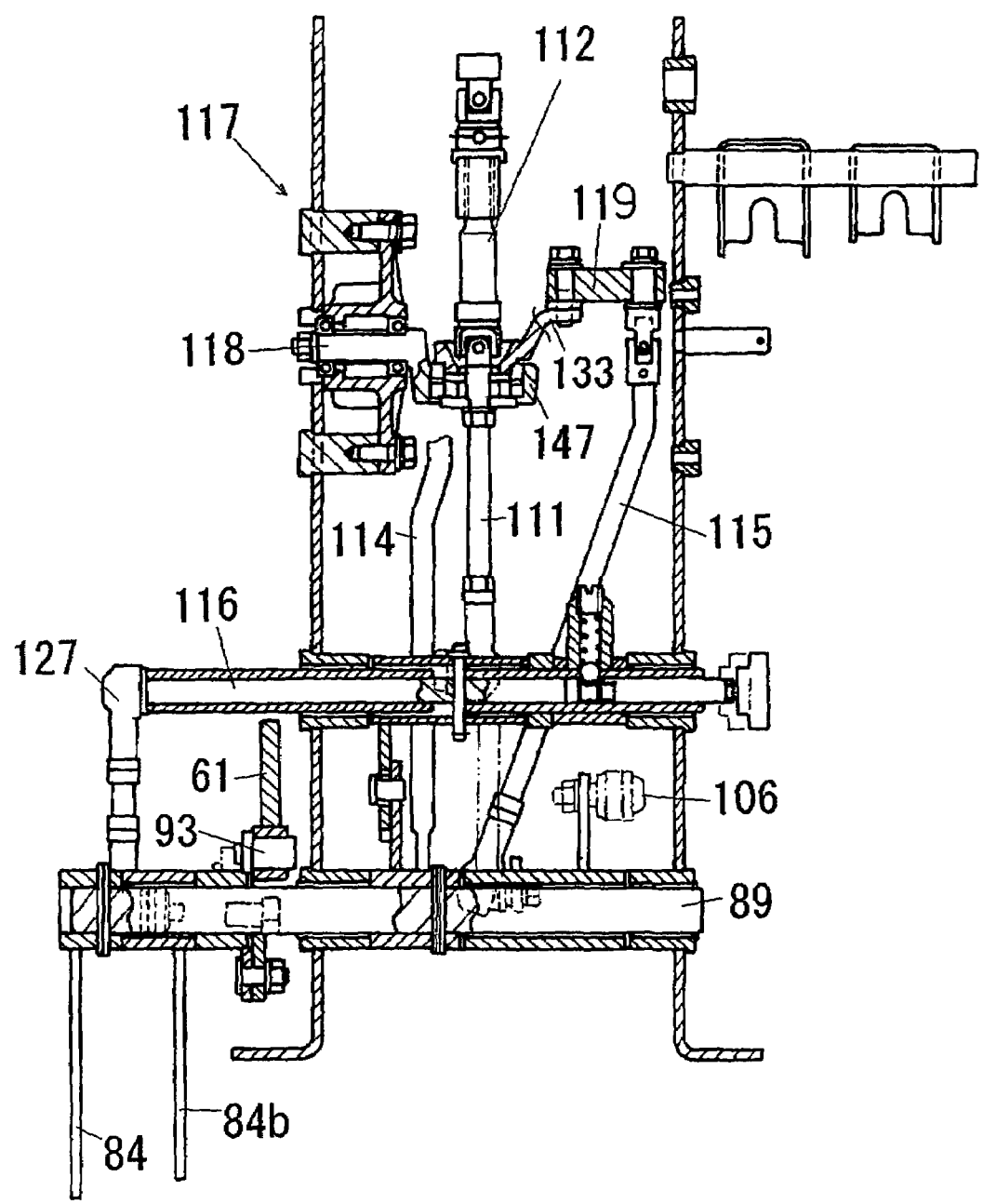
FIG. 39 is a sectional rear view showing a construction of the conic linkage.
Figure 41:
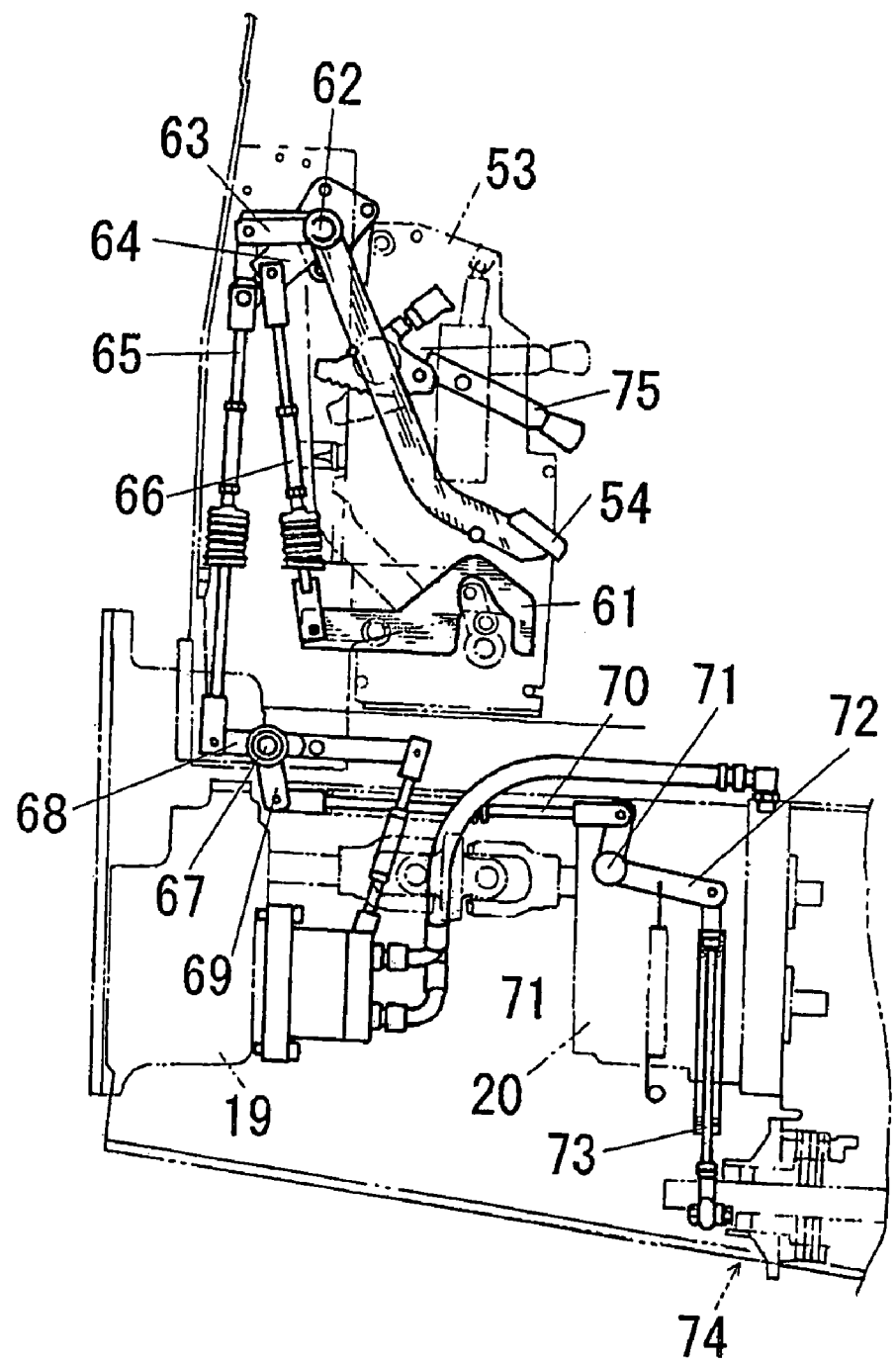
FIG. 41 is a side view showing an actuation construction of a brake pedal.
Figure 42:
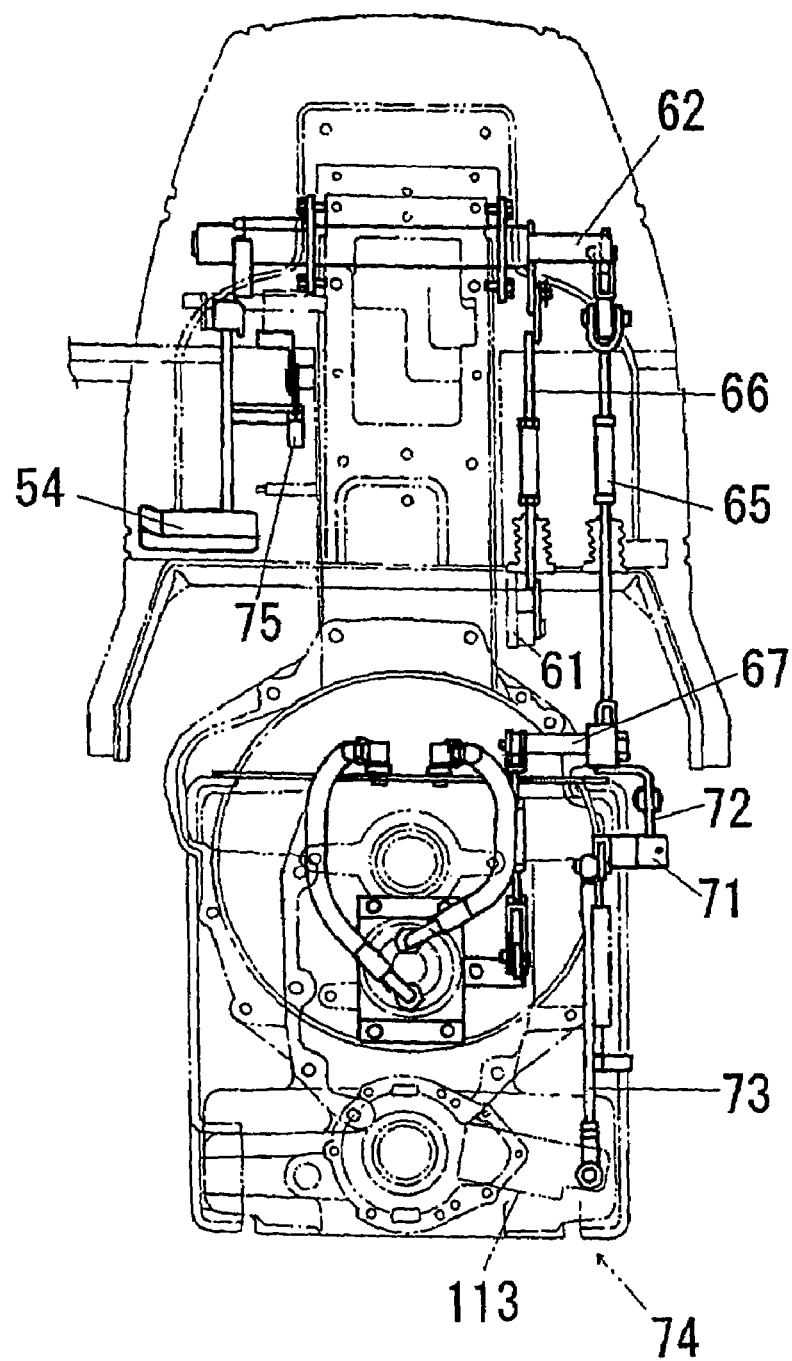
FIG. 42 is a front view showing the actuation construction of the brake pedal.

The shaft 89 is connected to the main speed change link 114 and the steering rod 115 in the conic linkage 53, as shown in FIGS. 39 and 41. The shaft 89 is a member to which main speed change operation and steering operation are transferred. A mechanism for keeping the HST for turning 20 and the HST for traveling 22 in neutral is provided on the shaft 89. Namely, by returning an arm connected to the shaft 89 to its neutral position, the conic linkage 53 is returned to its neutral position.

Figure 43:
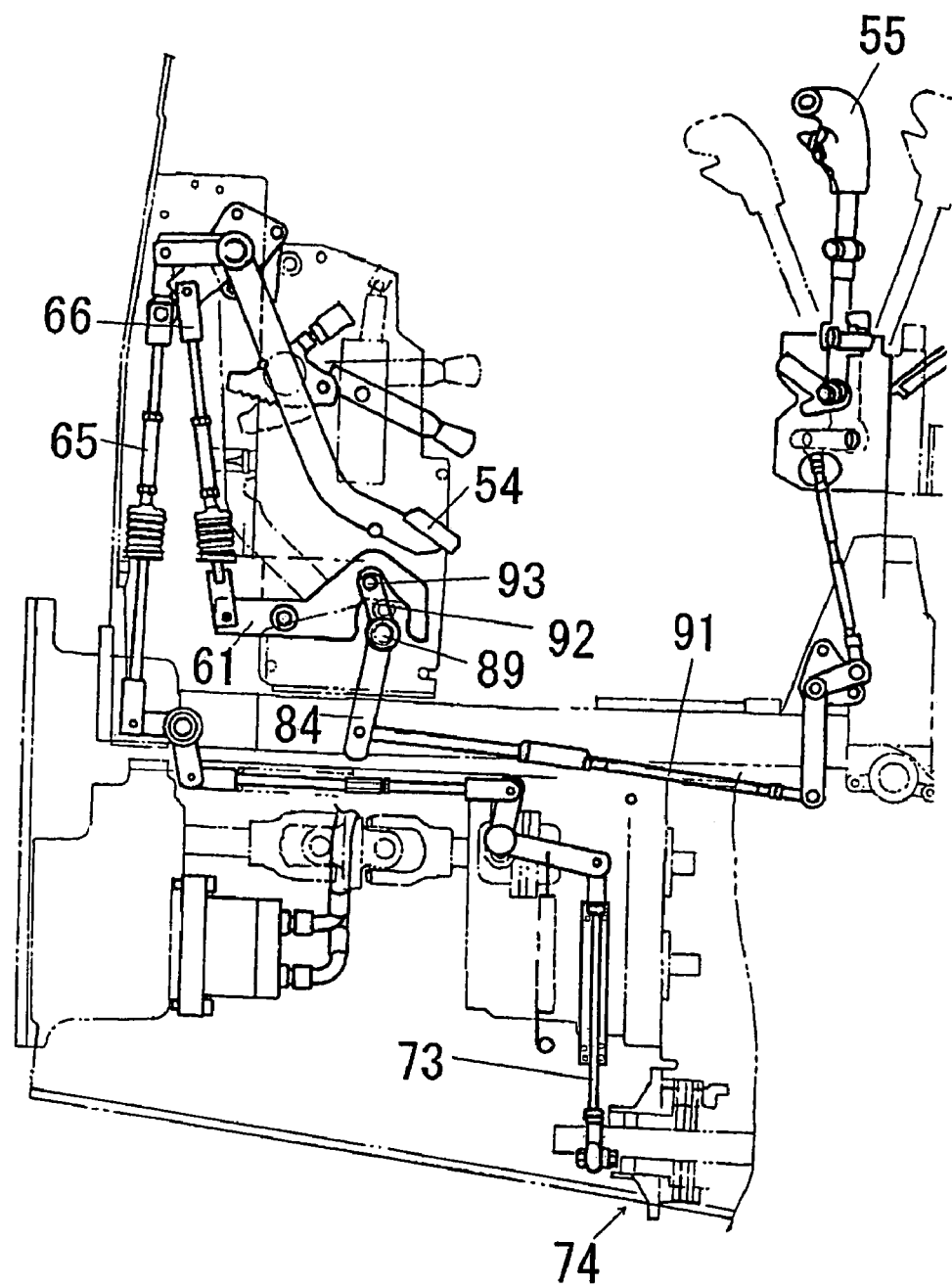
FIG. 43 is a drawing showing an interlocking construction of the brake pedal and the main speed change lever.

Also, as shown in FIG. 43, a mechanism for neutral-setting of the operation linkage comprising the cam lever 61 and the arm 92 is arranged in a lower portion of a chamber containing the conic linkage 53, and is positioned in the middle of the linkage connecting the main speed change lever 55 with the steering wheel 7. Accordingly, the main speed change lever 55 can be connected with the steering wheel 7 easily, and plays of the main speed change lever 55 and the steering wheel 7 can be adjusted easily.

Figure 44:
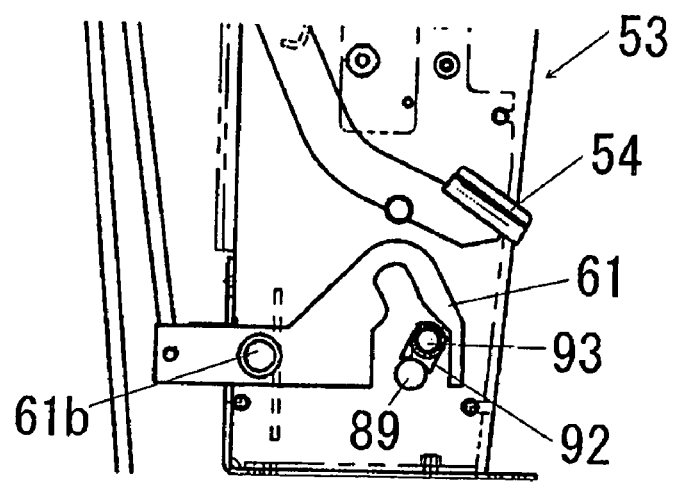
FIG. 44 is a side view showing a construction of the brake pedal and a cam lever.
Figure 44:
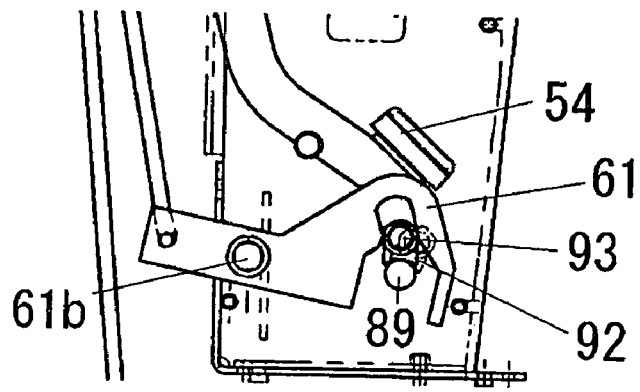
Figure 44:
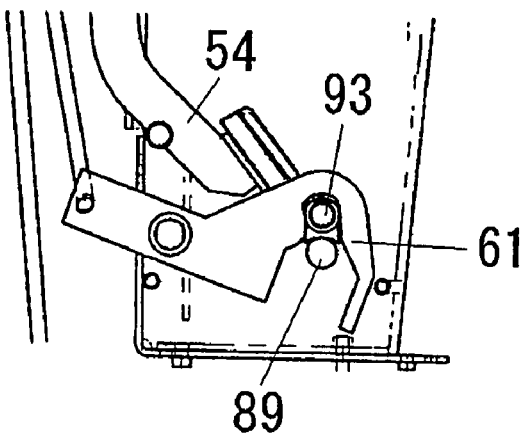
Figure 45:
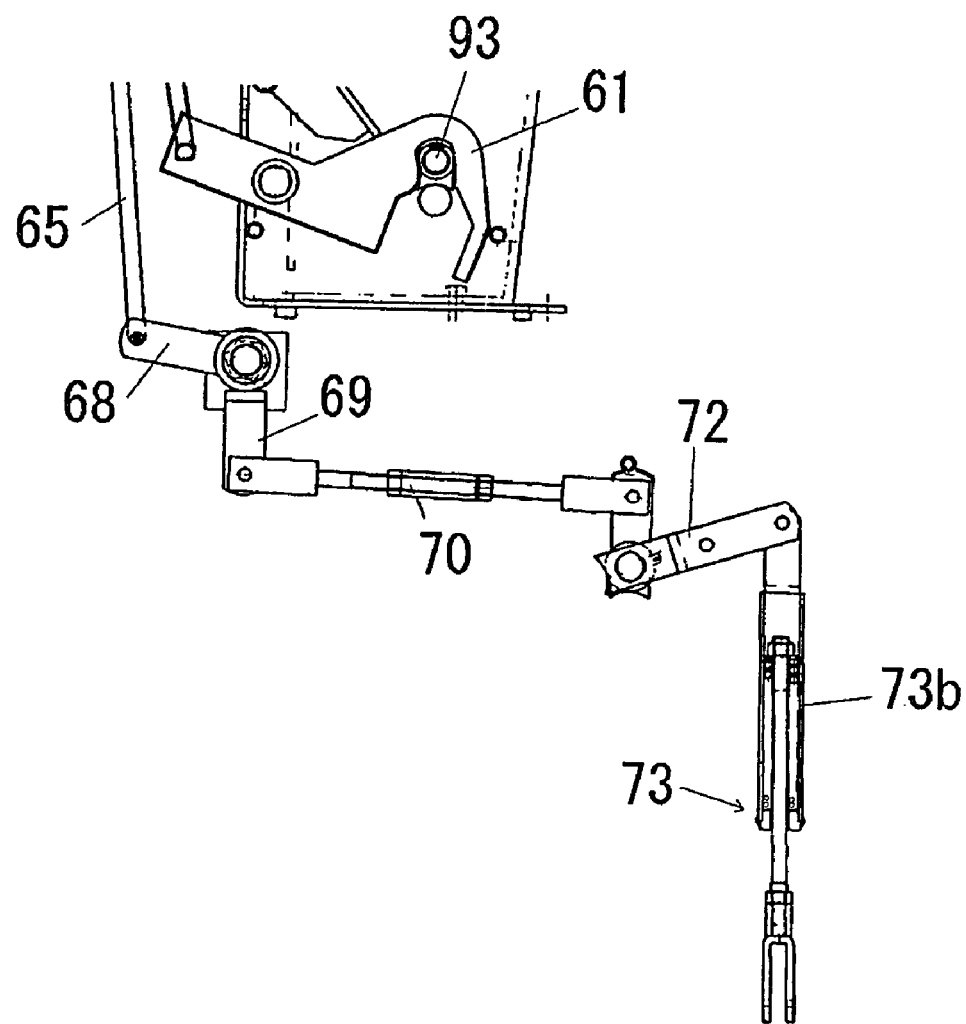
FIG. 45 is a side view showing a construction of a rod connected to the brake mechanism.

More detailed description will be given of the mechanism for neutral-setting of the operation linkage comprising the cam lever 61 and the arm 92 according to FIGS. 44 and 45.

The cam lever 61 is formed in a hook-like shape, and a cam is formed in the hook. The cam shape formed in the cam lever 61 is broad in its lower portion and narrow in its upper portion.

FIG. 44(a) illustrates the cam lever 61 and the arm 92 in the neutral state of the brake pedal 54; FIG. 44(b) illustrates the same in the state that the brake pedal is depressed half, and FIG. 44(c) illustrates the same in the state that the parking brake is applied.

As shown in FIG. 44(a), when the brake pedal 54 is in its neutral state, the projection 93 does not abut against the cam lever 61, so that the arm 92 is free from motion of the cam lever 61. Accordingly, the actuation state of the conic linkage 53 is not restricted.

Then, as shown in FIG. 44(b), when the brake pedal 54 is depressed half, the arm 92 is returned to its neutral position according to the cam shape of the cam lever 61, and the conic linkage 53 is also put into its neutral state. However, at this time, the brake mechanism 74 as the parking brake remains actuation-free.

By further depressing the brake pedal 54, as shown in FIG. 44(c), the brake mechanism 74 actuates.

A portion of cam groove in the cam lever 61 for neutral location of the arm 92 is elongated so that the brake pedal 54 can be depressed while the projection 93 is located in its neutral position.

Next, description will be given of a construction of the rod 73 for connecting the brake mechanism 74 with the brake pedal 54.

By depressing the brake pedal 54, the rod 65 is slid upward so as to rotate the arms 68 and 69. Accordingly, the rod 70 is slid forwardly so as to rotate the arm 72 and slide the rod 73 upward.

A shock absorbing mechanism 73b is provided on the rod 73. The shock absorbing mechanism 73b is constructed by connecting upper and lower portions of the rod 73 through an elastic member such as a spring. According to an example shown in FIG. 45, a spring is wound around a lower portion of the rod 73, and a spring is inserted into an upper cylindrical portion the rod 73.

The springs are contracted when the upper portion of the rod 73 is slid upward. When contraction of the springs reaches a fixed degree, the lower portion of the rod 73 is raised upward, thereby actuating the braking mechanism 74.

Accordingly, the brake is actuated after the conic linkage 53 is returned to neutral, so that load applied to the brake mechanism 74 is reduced, thereby improving the durability of the brake mechanism 74.

Since the shock absorbing mechanism 73b is provided on the rod 73, when the actuation arm 113 of the brake mechanism 74 are raised upward completely, the brake mechanism 74 can be actuated by a substantially constant force without raising the actuation arm 113 any more. In addition, by providing the shock absorbing mechanism 73b on the rod 73, it is not necessary to provide another shock absorbing mechanism on the rod 65 or the like, and the arm 68 and the brake pedal 54 can be connected mutually through a simple rod.

Next, description will be given of the construction for avoiding harsh brake according to an example shown in FIG. 46.

Figure 46:
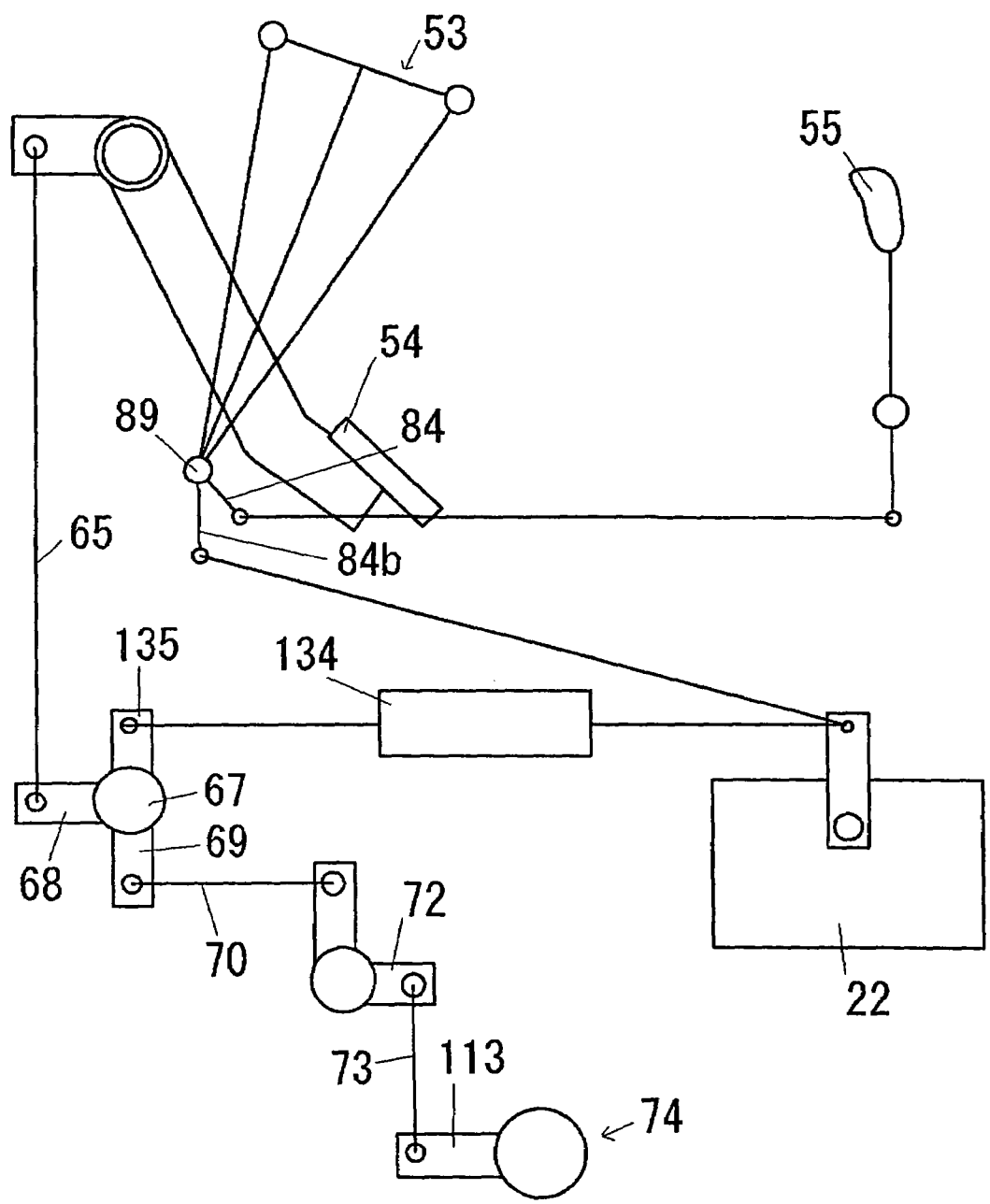
FIG. 46 is a schematic diagram showing a brake mechanism using a servo valve.
Figure 47:
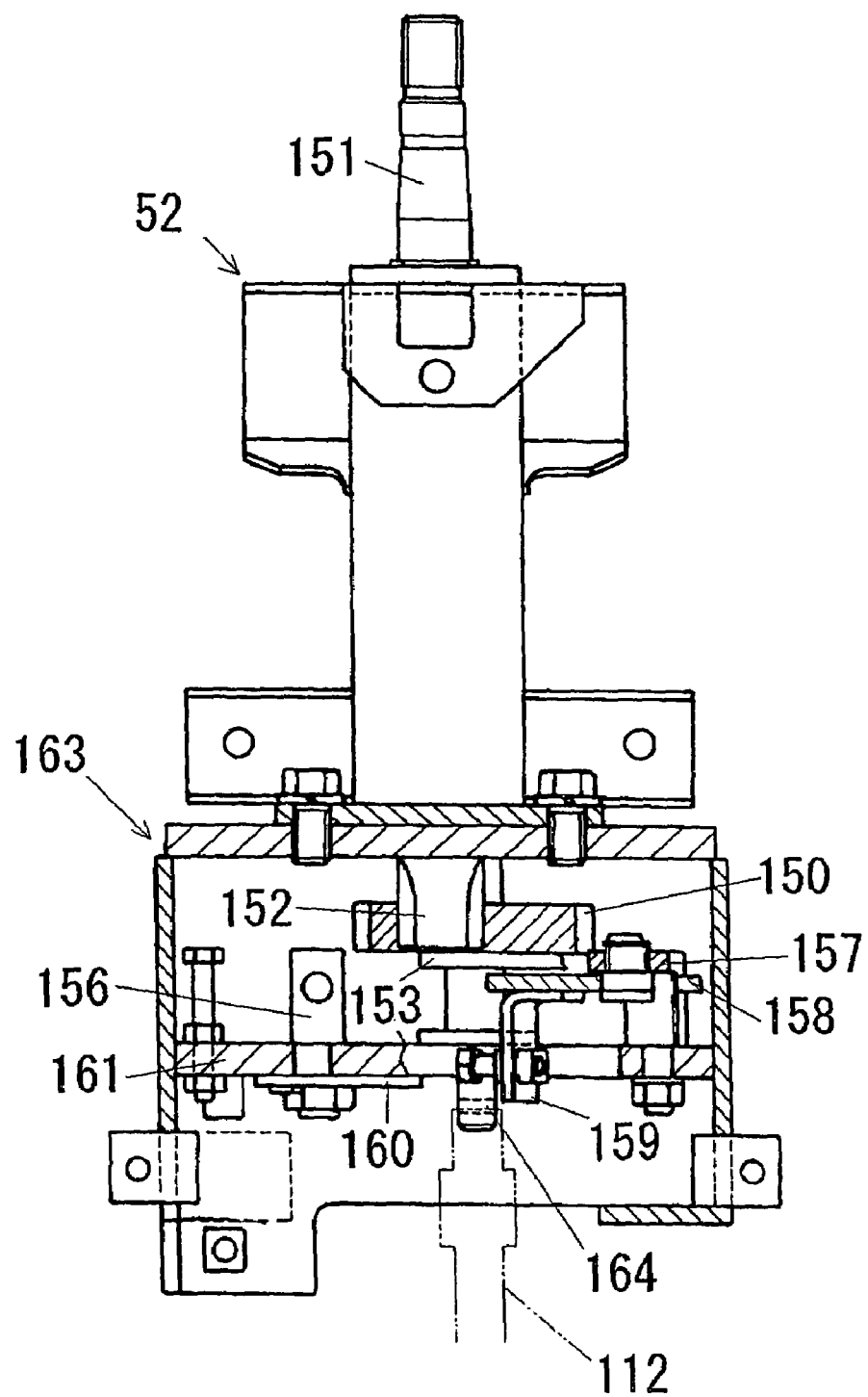
FIG. 47 is a front view showing a construction of a steering box.
Figure 48:
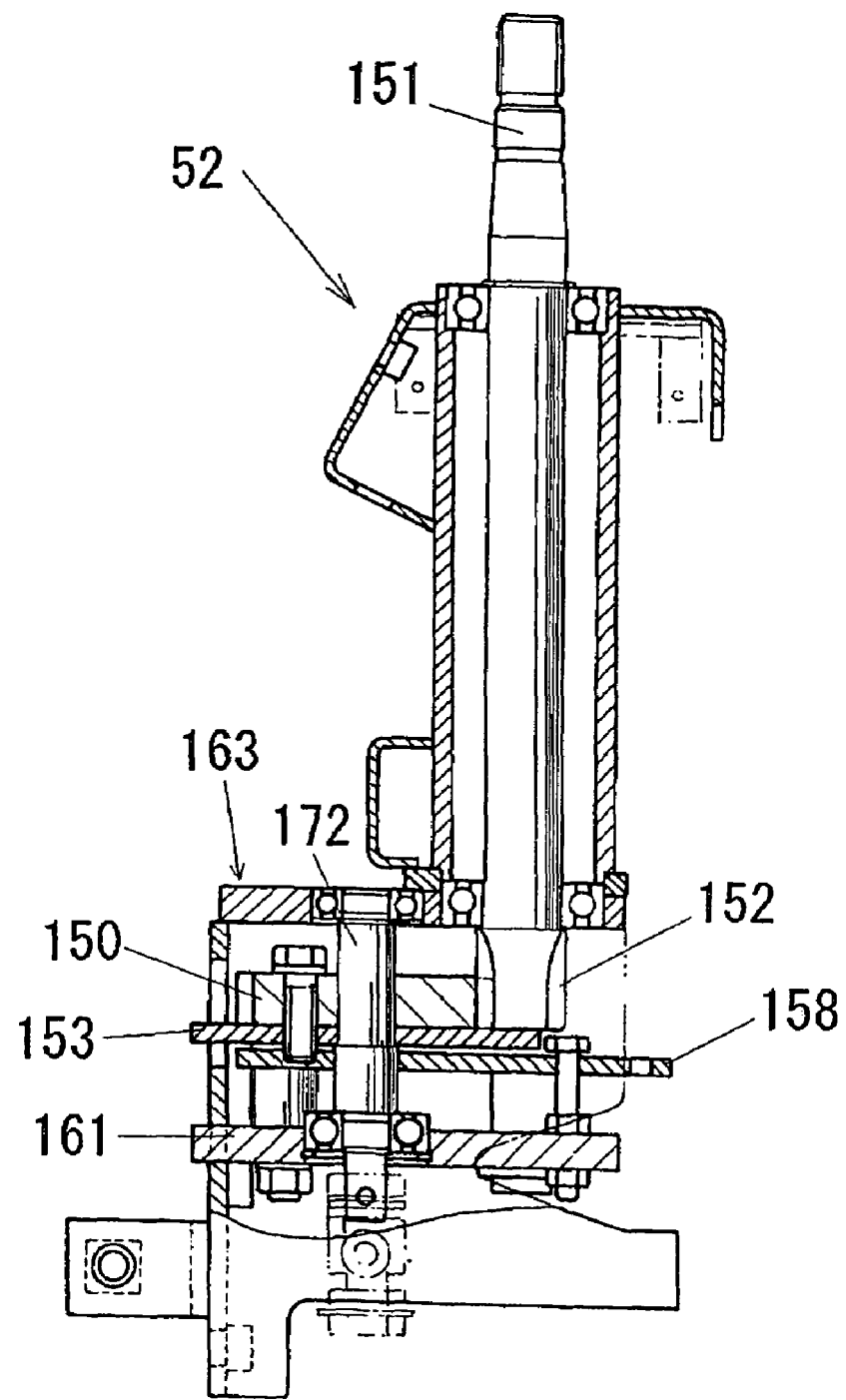
FIG. 48 is a sectional side view showing a construction of the steering box.
Figure 49:
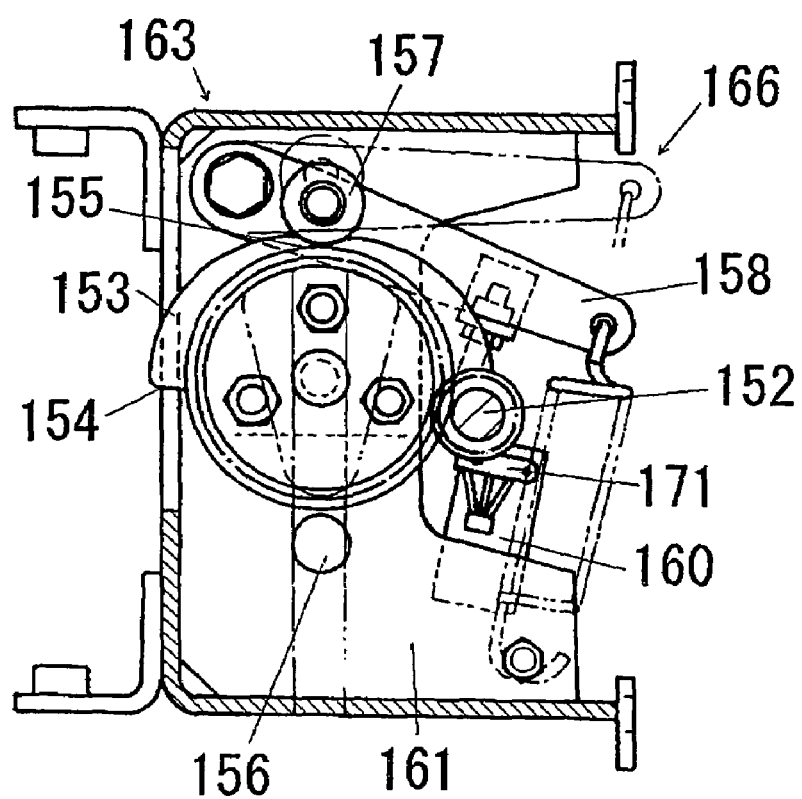
FIG. 49 is a plan view showing a construction of a neutral return mechanism of steering.
Figure 50:
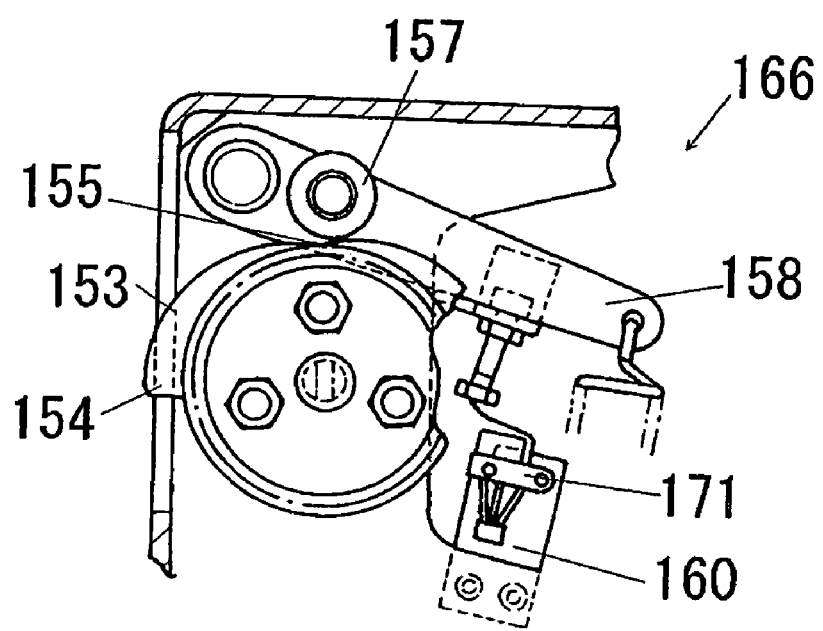
FIG. 50 is a plan view showing a construction of a switch disposed in a cam box.
Figure 51:
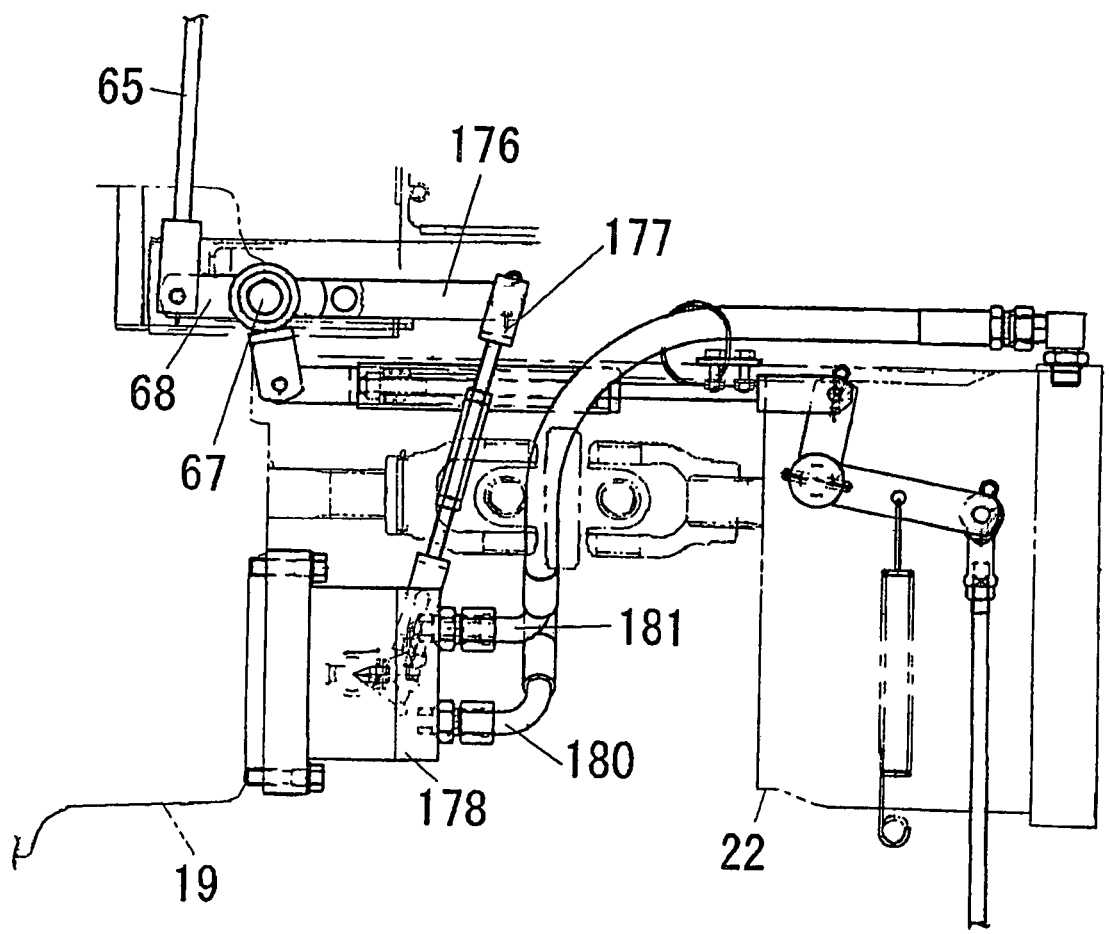
FIG. 51 is a side view showing an arrangement of a residual pressure release valve.
Figure 52:
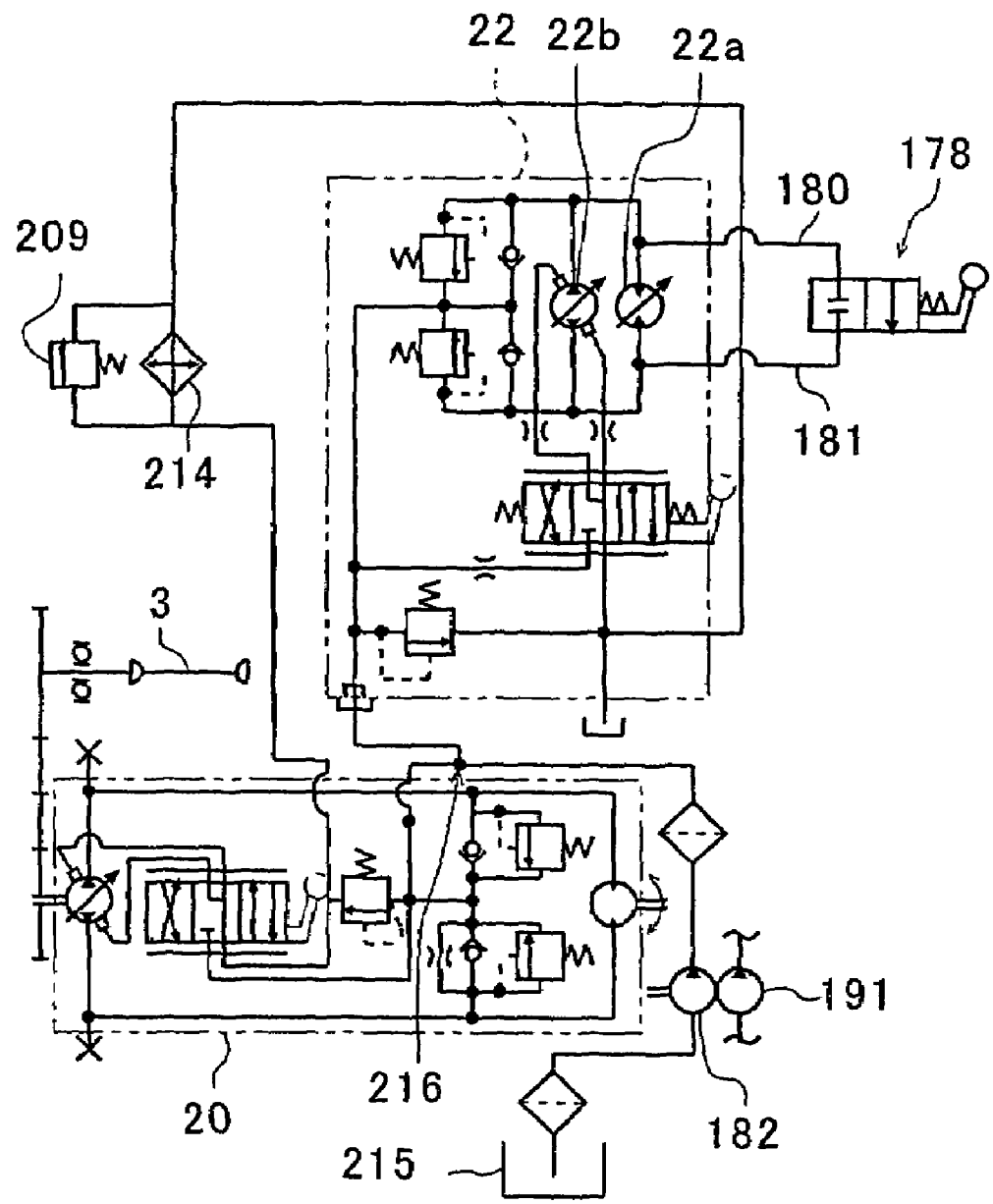
FIG. 52 is a hydraulic circuit diagram showing a connection construction of the residual pressure release valve.

According to the example shown in FIG. 46, a swash plate control arm of the HST for traveling 22 is connected to the brake pedal 54 through a servo valve 134. Accordingly, the brake works gradually when the brake pedal 54 is operated. Therefore, the operativity is improved and hard brake is prevented.

The brake pedal 54 is connected to the arm 68 through the rod 65. The arm 68 is rotated integrally with the arm 69 and an arm 135.

The arm 69 is connected with the brake mechanism 74 as mentioned above, and the arm 135 is connected with the arm of the HST for traveling 22 through the servo valve 134. Also, the arm of the HST for traveling 22 is connected to the arm 84b, and the arm 84b is rotated with rotation of the main speed change lever 55.

When the brake pedal 54 is depressed, the servo valve 134 is pulled forward by the arm 135. As mentioned above, the brake mechanism 74 does not cause braking force unless the brake pedal 54 is depressed to some degree, and the servo valve 134 is actuated when the arm of the HST for traveling 22 is returned to its neutral position. Accordingly, when the arm of the HST for traveling 22 is returned to its neutral position gradually by the servo valve 134, the conic linkage 53 and the main speed change lever 55 are returned to their neutral positions along with the arm.

Then, the arm of the HST for traveling 22 is set in its neutral position so as to apply an engine brake, thereby braking the crawler tractor to some degree, and then, the brake mechanism 74 is actuated so as to apply a sure parking brake to the crawler tractor.

Accordingly, harsh brake is prevented so as to improve operativity of the crawler tractor.

Next, description will be given of a construction of the steering box 52 according to FIGS. 47 to 50.

The steering box 52 is disposed between the steering wheel 7 and the conic linkage 53 so as to transmit operation of the steering wheel 7 to the conic linkage 53.

A steering shaft 151 is rotatably disposed in the steering box 52, and a cam box 163 is provided on the lower part of the steering box 52. The steering shaft 151 projects at an upper portion thereof upward from the steering box 52 and connected to the steering wheel 7. The steering shaft 151 projects at a lower portion of the steering shaft 151 into the cam box 163.

A gear 152 is formed on a lower end of the steering shaft 151 so as to engage with a cam gear 150.

A steering transmission shaft 164 is fixed on the rotation center of the cam gear 150, and connected at a lower end thereof to the steering input shaft 112 of the conic linkage 53 through a universal joint or the like.

According to the above-mentioned construction, when the steering wheel 7 is rotated, the steering shaft 151 is rotated, and then the steering transmission shaft 164 is rotated with the cam gear 150. Therefore, the steering input shaft 112 connected to the steering transmission shaft 164 is rotated.

A cam mechanism for restricting rotation of the steering wheel 7 and returning the steering wheel 7 to the neutral position is built in the cam box 163.

A cam 153 is equipped on a lower surface of the cam gear 150 fixed to the steering transmission shaft 164 so as to be rotated integrally with the cam gear 150. A support base 161 is provided in the lower part of the cam box 163, and a stopper 156 for restricting rotation of the cam 153 is provided upright on the support base 161.

A neutral return mechanism 166 is provided symmetrically with the stopper 156 with respect to the rotational center of the cam 153. The neutral return mechanism 166 comprises a roller 157, an arm 158 and a spring for biasing the arm 158 toward the cam 153.

The arm 158 is rotatably supported at one end thereof by an upright shaft provided on the support base 161, and the roller 157 is rotatably supported on the arm 158. Since the arm 158 is biased toward the cam 153, the roller 157 is pressed against the cam 153. The stopper 156 and the roller 157 as a neutral returning member are disposed symmetrically with respect to the axial center of the cam 153.

The cam 153 is provided with a contact portion 154 for abutting against the stopper 156 and with a neutral portion 155 for abutting against the roller 157 in neutral. The contact portion 154 is formed on a side surface of the cam 153 furthest apart from the rotational center of the cam 153, and the neutral portion 155 nearest to the rotational center of the cam 153. The contact portion 154 and the neutral portion 155 are connected mutually through a smooth curve line, so that the cam 153 is formed symmetrically with respect to a line joining the rotational center of the cam 153 and the neutral portion 155. The cam 153 is formed to gradually expand in its radial direction as it goes apart from its neutral position, and the cam 153 is formed at one end thereof with the contact portion 154 for abutting against the stopper for restricting rotation thereof.

When the cam 153 constructed as mentioned above is rotated from its neutral position, the cam 153 pushes away the roller 157 against biasing force of the spring. Since the roller 157 is biased toward the cam 153, when the steering wheel 7 is released from an operator's hands, the cam 153 is rotated so as to return to its neutral position.

The cam 153 is rotatable unless the contact portion 154 abuts against the stopper 156, so that rotation of the cam 153 is restricted based on the positions of the stopper 156 and the contact portion 154.

A plate 159 is fixed at one end thereof on a lower surface of the arm 158. The plate 159 is extended downward, and a bolt and a nut are equipped on the lower end of the plate 159 in the rotation direction of the arm 158.

A switch base 160 is attached to the support base 161 toward the above-mentioned plate 159. On an end of the switch base 160 is disposed a switch 171, which is brought into contact with the bolt on the plate 159 so as to be turned on or off.

Namely, by rotating the steering wheel 7, the cam 153 is rotated, and the arm 153 is rotated so as to change a distance between the switch 171 and the above-mentioned bolt. The distance between the switch 171 and the bolt becomes the shortest when the cam 153 is in its neutral position, and becomes the longest when the contact portion 154 of the cam 153 abuts against the stopper 156. According to this construction, the switch 171 detects the neutral location of the cam 153.

Next, description will be given of a mechanism for releasing residual pressure of the HST for traveling according to FIGS. 41, 42 and 51 to 53.

By depressing the clutch pedal 54, as mentioned above, the arm of the HST for traveling 22 is set in its neutral position, and the brake mechanism 74 is actuated after the crawler tractor is braked to some degree by engine brake of the neutral HST for traveling 22. At this time, the HST for traveling 22 is stopped when one of a pair of passages which mutually connect a motor 22a and a variable type pump 22b in the HST for traveling 22 is hydraulically pressured higher than the other. Namely, each plunger of the motor 22a and the variable type pump 22b is stressed at one end in its sliding direction by an oil pressure difference (residual pressure) between the above-mentioned pair of passages so as to cause a load at the time of starting the engine. Therefore, it is desirable to release the residual pressure in the pair of passages connecting the motor 22a to the variable type pump 22b (namely, to cancel the pressure difference therebetween).

When the brake pedal 54 is depressed, the arm 63 is rotated integrally with the brake pedal 54 around the pivot 62, and the rod 65 pivotally attached to an end of the arm 63 is moved upward. At this time, the arm 68 pivotally connected at an end thereof to the lower end of the rod 65 is rotated together with an arm 176 around the pivot 67, and a rod 177 pivotally connected to a rear end of the arm 176 is moved downward. By moving the rod 177 downward, a solenoid in a residual pressure release valve 178 is pushed in against biasing force of the spring, so as to bring pipings 180 and 181 into mutual fluidal communication for releasing the residual pressure.

The residual pressure release valve 178 is disposed on a rear surface of the clutch casing 19 and in front of the HST for traveling 22, and the pipings 180 and 181 are respectively connected to the pair of passages which mutually connect the motor 22a and the variable type pump 22b in the HST for traveling 22.

Due to the above construction, by depressing the brake pedal 54, the pair of passages which connect the motor 22a and the variable type pump 22b are connected mutually so as to cancel the oil pressure difference (release the residual pressure). When the depressed brake pedal 54 is released, the above-mentioned members from the brake pedal 54 to the solenoid in the residual pressure release valve 178 are operated in the opposite direction so as to cut off the connection of the pipings 180 and 181 for releasing residual pressure, so that the main circuit of the HST for traveling 22 may be actuated.

Next, description will be given of another valve for releasing the residual pressure.

Figure 53:
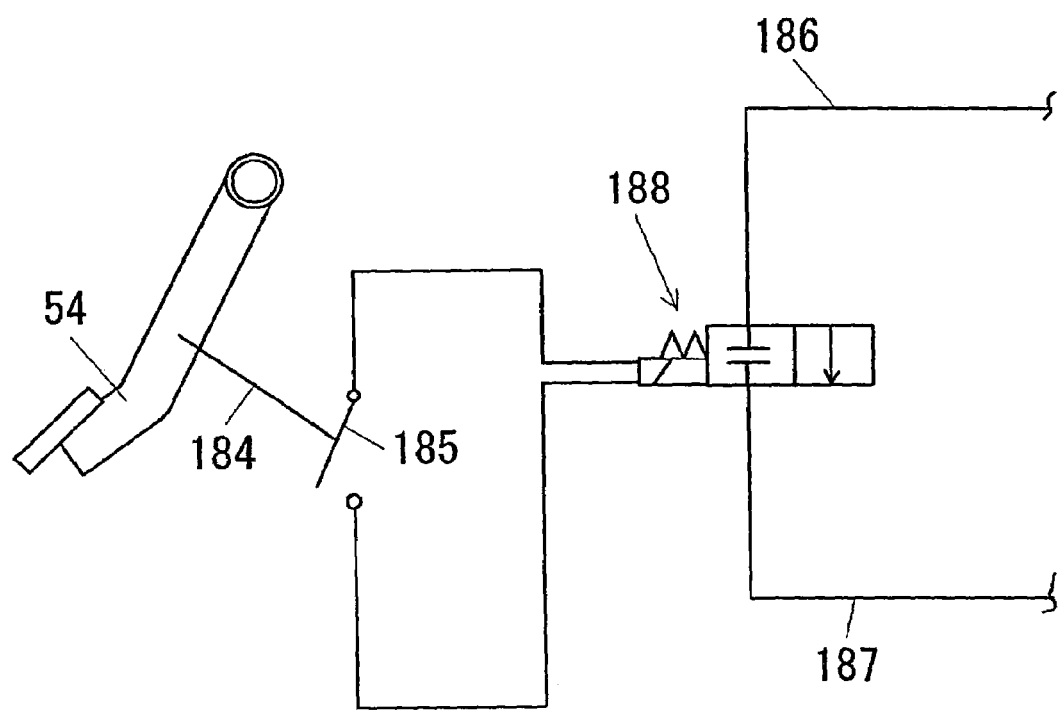
FIG. 53 is a schematic diagram showing an example of the actuation construction of the residual pressure release valve.

With regard to an example shown in FIG. 53, an electromagnetic valve 188 serving as a residual pressure release valve is operated by the brake pedal 54.

A linkage 184 is connected to the brake pedal 54 so as to put on/off a switch 185 connected to the electromagnetic valve 188. When the switch 185 is turned on, the electromagnetic valve 188 is slid so as to mutually connect a pair of bypassing passages 186 and 187 connected to the motor 22a and the variable type pump 22b.

When the switch 185 is turned off, the electromagnetic valve 188 cuts off the connection between the passages 186 and 187. Accordingly, when the brake pedal 54 is not depressed, the main circuit of the HST for traveling 22 is not bypassed.

The linkage 184 connected to the brake pedal 54 for releasing residual pressure in the HST for traveling 22 has such a simple structure as to operate the switch 185.

Therefore, the start of the engine is facilitated because the brake pedal is always depressed in starting operation of the engine, and residual pressure is released with an easy construction.

Figure 54:
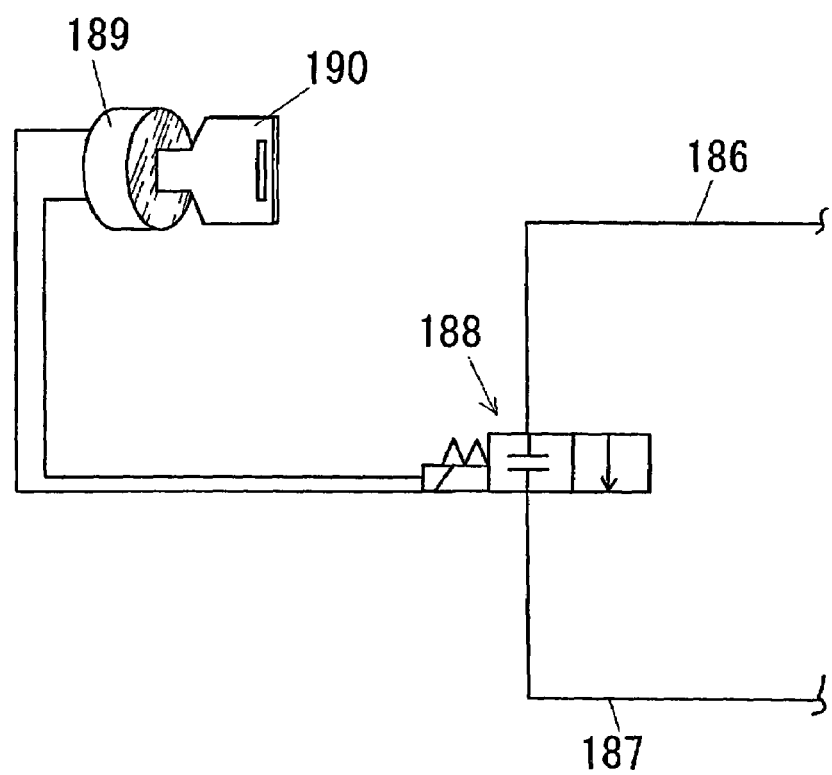
FIG. 54 is a schematic diagram showing a construction of the residual pressure release valve.

Alternatively, as shown in FIG. 54, the residual pressure release valve may be operated by a key switch.

A key switch 189 has an electric circuit, which is turned on/off by a key 190 inserted thereinto and rotated.

The electromagnetic valve 188 serving as a residual pressure release valve is connected to the key switch 189. The key 190 is inserted into the key switch 189 and rotated so as to connect the key switch 189 to the electromagnetic valve 188.

The key switch 189 serves as a starter switch of the crawler tractor, so that, when the starter switch is actuated, the electromagnetic valve 188 is operated.

Accordingly, when the starter is actuated, the pressures in the HST for traveling 22 and the HST for turning 20 are always low so as to facilitate for start of the engine. Also, hard actuation for releasing residual pressure becomes unnecessary.

The above-mentioned residual pressure release valve 178, which is connected to the main circuits of the HST for traveling 22 and the HST for turning 20, may be disposed in a housing integrally with the HSTs. Due to this, the residual pressure of the HST for traveling 22 and the HST for turning 20 is released so as to easily rotate the output shaft for traveling, thereby facilitating for restarting of the engine.

INDUSTRIAL APPLICABILITY

As mentioned above, the crawler tractor according to the invention is suitable to be used as an agricultural working machine. Especially, it is usable in such a case as to travel on a muddy or hilly ground, that is hard for a tractor having normal drive wheels to work, or as to require a large driving force for using working machines.

What is claimed is:

1. A vehicle comprising:
   a hydrostatic stepless transmission for traveling of the vehicle, the hydrostatic stepless transmission being provided with output control means for controlling output rotation of the hydrostatic stepless transmission;
   a speed change device for operation of shifting the output control means;
   a steering device for operation of steering the vehicle;
   a conic linkage linking the steering device with the speed change device, the conic linkage having a rotary portion linked to the output control means;
   a parking brake for braking output rotation of the hydrostatic stepless transmission;
   a brake pedal for controlling the parking brake;
   an operation link connecting the brake pedal with the conic linkage; and
   a neutral return mechanism for returning the output control means to a neutral position in response to depression of the brake pedal, the neutral return mechanism being provided in the operation link, the neutral return mechanism including a hook-shaped cam and an engaging member fixed on the rotary portion of the conic linkage, wherein, when the brake pedal is not depressed, the engaging member is disposed out of a groove of the hook-shaped cam, and wherein, by depressing the brake pedal, the hook-shaped cam rotates so as to forcibly insert the engaging member into the groove of the hook-shaped cam so as to return the rotary portion of the conic linkage and the output control means to the neutral position.

2. The vehicle according to claim 1, wherein the neutral return mechanism is disposed in a lower portion of a section incorporating the conic linkage.

3. The vehicle according to claim 1, wherein the hook-shaped earn is arranged on a link between the conic linkage and the speed change device.

4. The vehicle according to claim 1, further comprising: a residual pressure releasing mechanism including a valve for releasing residual pressure from a hydraulic circuit of the hydrostatic stepless transmission.

5. The vehicle according to claim 4, wherein the residual pressure releasing mechanism is operatively connected to the brake pedal so as to open the valve in response to depression of the brake pedal.

6. The vehicle according to claim 4, wherein the valve is an electro magnetic valve, and wherein the releasing mechanism is operatively connected to a key switch so as to open the valve in response to switching the key switch.

7. The vehicle according to claim 1, wherein in response to depression of the brake pedal, the parking brake begins to act for braking after the output control means comes into the vicinity of the neutral position.

8. The vehicle according to claim 1, further comprising: a servo valve interposed between the brake pedal and the output control means so as to gradually transmit depression of the brake pedal to the output control means.

9. vehicle according to claim 1, further comprising: an auxiliary speed change transmission driven by the hydrostatic stepless transmission engine;
   a transmission casing incorporating the auxiliary speed change transmission; and
   a traveling power take-off section disposed at a lower portion of the transmission casing so as to take off power from the auxiliary speed change transmission, wherein the parking brake is provided in the traveling power take-off section.

10. The vehicle according to claim 9, further comprising: a differential mechanism for traveling and steering drive of the vehicle; and a second hydrostatic stepless transmission for steering the vehicle, wherein output of the traveling power take-off section and output of the second hydrostatic stepless transmission are combined in the differential mechanism.

11. A vehicle comprising:
a speed change device for traveling speed change operation of the vehicle;
a steering device for steering operation of the vehicle;
a conic linkage linking the steering device with the speed change device;
a neutral-return cam interposed between the steering device and the conic linkage;
a neutral-returning member moved by the neutral-return cam so as to return the steering device to a neutral position; and
a stopper for stopping rotation of the neutral-return cam, wherein the stopper and the neutral-returning member are arranged symmetrically with respect to a rotary center axis of the neutral-return cam.

12. The vehicle according to claim 11,
wherein the neutral-return cam is formed with a cam portion for abutting against the neutral-returning member and with a stopping portion for abutting against the stopper.

13. The vehicle according to claim 12, wherein the cam portion of the neutral-return cam gradually expands in the radial direction of the neutral-return cam as the cam portion shifts from a neutral position to an end, and wherein the stopping portion is provided at the radially largest end of the cam portion.

14. A vehicle comprising:
a traveling hydrostatic stepless transmission for traveling drive of the vehicle driven by engine power;
a steering hydrostatic stepless transmission for steering drive of the vehicle driven by engine power;
a differential mechanism including a pair of differential output portions, wherein the differential mechanism has a traveling input portion through which output rotation of the traveling hydrostatic stepless transmission is distributed between the pair of differential output portions in the same direction and in the same speed, wherein the differential mechanism has a steering input portion through which output rotation of the steering hydrostatic stepless transmission is distributed between the pair of differential output portions in opposite directions and in the same speed, and wherein the steering input portion is divided into coaxial first and second shaft portion; and
a clutch interposed between the first and second shaft portions.

15. A vehicle comprising:
a traveling hydrostatic stepless transmission for traveling drive of the vehicle driven by engine power;
a steering hydrostatic step less transmission for steering drive of the vehicle drive, including an input shaft for receiving engine power;
a casing incorporating the steering hydrostatic stepless transmission, wherein a part of the input shaft of the steering hydrostatic stepless transmission projecting outward from the casing;
a power take-off device; and
a pulley provided on the projecting part of the input shaft so as to transmit power to a power take-off device.

* * * * *